United States Patent [19]

Goto et al.

[11] Patent Number: 5,151,830

[45] Date of Patent: * Sep. 29, 1992

[54] MAGNETIC RECORDING AND REPRODUCING APPARATUS AND METHOD OF RECORDING AND REPRODUCING

[75] Inventors: Kenji Goto; Manabu Tsukamoto; Masayuki Ishida; Yoshinobu Ishida, all of Kyoto, Japan

[73] Assignee: Mitsubishi Denki Kabushiki Kaisha, Tokyo, Japan

[ * ] Notice: The portion of the term of this patent subsequent to Mar. 17, 2009 has been disclaimed.

[21] Appl. No.: 773,832

[22] Filed: Oct. 9, 1991

Related U.S. Application Data

[63] Continuation of Ser. No. 448,722, Dec. 11, 1989, Pat. No. 5,097,364.

[30] Foreign Application Priority Data

Dec. 12, 1988 [JP] Japan ............... 63-314232
Dec. 22, 1988 [JP] Japan ............... 63-327035
Mar. 22, 1989 [JP] Japan ............... 1-71090
Mar. 23, 1989 [JP] Japan ............... 1-73129
Mar. 23, 1989 [JP] Japan ............... 1-73130
Mar. 24, 1989 [JP] Japan ............... 1-72625
Apr. 4, 1989 [JP] Japan ............... 1-86028
Apr. 14, 1989 [JP] Japan ............... 1-95682
May 12, 1989 [JP] Japan ............... 1-119248
Dec. 7, 1989 [JP] Japan ............... 1-318522

[51] Int. Cl.5 .................................. G11B 5/09
[52] U.S. Cl. ................................... 360/32
[58] Field of Search ................. 360/32, 36.2; 358/320

[56] References Cited

U.S. PATENT DOCUMENTS 4,675,424 6/1987 Wagner .
4,709,278 11/1987 Legadec .
4,733,311 3/1988 Yoshinaka .

FOREIGN PATENT DOCUMENTS 0175941 4/1986 European Pat. Off. .
254279 1/1988 European Pat. Off. .
63-29391 2/1988 Japan .
1-091389 7/1989 Japan .
1-138658 8/1989 Japan .
1-201887 11/1989 Japan .

OTHER PUBLICATIONS

H. Yamazaki et al. "Time code in sub data area of R-DAT" Audio Engineering Society Preprint from Journal of Audio Engineering Society (Mar. 1–4, 1980), pp. 1–18.

R. Iwashita, "The outline of DAT Standardization" Journal of Institute of Electronics, Information and Communication Engineers of Japan (Jan. 198), pp. 63–66.

Primary Examiner—Vincent P. Canney
Attorney, Agent, or Firm—Lowe, Price, LeBlanc & Becker

[57] ABSTRACT

A magnetic recording and reproducing apparatus records audio signals digitized by rotary heads (9, 10) on a magnetic tape (12), and reproduces the recorded audio signals. Clock signals and time code data are extracted from externally inputted time code signals by means of a demodulating circuit (72), and phase difference between the frame clock signals and the reference signal is detected by a phase difference detecting circuit (74). A microcomputer (23) assigns the phase difference information and the time code data to sub code packs and stores the same in the memory circuit (4). The stored phase difference information and the time code data are recorded on the magnetic tape. In reproduction, the microcomputer outputs the original time code signals responsive to the reproduced phase difference information and the time code data.

2 Claims, 61 Drawing Sheets

FIG. 4

|     | B7 | B6 | B5 | B4 | B3 | B2 | B1 | B0 |
|-----|----|----|----|----|----|----|----|----|
| PC1 | 1  | 0  | 0  | 1  | 0  | $\tau_{10}$ | $\tau_9$ | $\tau_8$ |
| PC2 | $\tau_7$ | $\tau_6$ | $\tau_5$ | $\tau_4$ | $\tau_3$ | $\tau_2$ | $\tau_1$ | $\tau_0$ |
| PC3 | 0  | 0  | T5 | T4 | T3 | T2 | T1 | SD |
| PC4 | TC HOUR ||||||||
| PC5 | TC MINUTE ||||||||
| PC6 | TC SECOND ||||||||
| PC7 | TC FRAME ||||||||
| PC8 | PACK PARITY ||||||||

PC1  B7~B4    : PACK ITEM = 1001
     B3      : Zero
PC1  B2~B0   : $\tau_{10}$~$\tau_0$ (PHASE DIFFERENCE $\tau_i$)
PC2  B7~B0    (Binary 11bits $\tau_{10}$:MSB $\tau_0$:LSB )
PC3  B7 B6   : ALL Zeros
     B5  B1  : T5~T1 (TC ID FLAG)
          T5 = 1 ⇒ SMPTE TC
          T4 = 1 ⇒ SMPTE DROP FRAME
          T3 = 1 ⇒ SMPTE 29.97Hz
          T2 = 1 ⇒ EBU TC
          T1 = 1 ⇒ FILM TC
     B0      : SD (TC FRAME FLAG)
          SD =1 ⇒ SAME TC FRAME No. AS
               PRECEDING DAT FRAME IS
               RECORDED
PC4  B7~B0   : TC HOUR
PC5  B7~B0   : TC MINUTE
PC6  B7~B0   : TC SECOND
PC7  B7~B0   : TC FRAME

FIG.5

|     | B7 | B6 | B5 | B4 | B3 | B2 | B1 | B0 |
|-----|----|----|----|----|----|----|----|----|
| PC1 | 1  | 0  | 1  | 0  | 0  | 0  | 0  | SD |
| PC2 | TC FRAME |||||||| 
| PC3 | 0  | 0  | TC5 | TC4 | TC3 | TC2 | TC1 | TC0 |
| PC4 | User Group 1 |||| User Group 2 ||||
| PC5 | User Group 3 |||| User Group 4 ||||
| PC6 | User Group 5 |||| User Group 6 ||||
| PC7 | User Group 7 |||| User Group 8 ||||
| PC8 | PACK PARITY ||||||||

PC1   B7 ~ B4 : PACK ITEM = 1010
        B3 ~ B1 : ALL Zeros
        B0       : SD (TC FRAME FLAG)
                    SD=1 ⇨ THE SAME TC FRAME No
                            AS PRECEDING DAT
                            FRAME IS RECORDED PC2   B7 ~ B0 : TC FRAME ( BCD 2 digits)
PC3   B7, B6  : ALL Zeros
        B5 ~ B0 : TC5 ~ TC0 (TC BIT FLAG)
                  TC5   ⇦ TC BIT No 10
                  TC4   ⇦ TC BIT No 11
                  TC3   ⇦ TC BIT No 27
                  TC2   ⇦ TC BIT N   43
                  TC1   ⇦ TC BIT No 58
                  TC0   ⇦ TC BIT No 59

PC4 ~ PC7
      B7 ~ B0 : User group 1 ~ 8

FIG.6

|     | B7 | B6 | B5 | B4 | B3 | B2 | B1 | B0 |
|-----|----|----|----|----|----|----|----|----|
| PC1 | 1  | 0  | 0  | 1  | 1  | 0  | 0  | SD |
| PC2 | TC FRAME |||||||| 
| PC3 | 0  | 0  | TC5 | TC4 | TC3 | TC2 | TC1 | TC0 |
| PC4 | User Group 1 |||| User Group 2 ||||
| PC5 | User Group 3 |||| User Group 4 ||||
| PC6 | User Group 5 |||| User Group 6 ||||
| PC7 | User Group 7 |||| User Group 8 ||||
| PC8 | PACK PARITY ||||||||

PC1   B7 ~ B4 : PACK ITEM = 1001
      B3      : B3 = 1 ⇒ 2nd. page of PACK "1001"
      B2, B1  : ALL Zeros
      B0      : SD (TC FRAME FLAG)
                SD = 1 ⇒ THE SAME TC FRAME No.
                        AS PRECEDING DAT FRAME
                        IS RECORDED PC2   B7 ~ B0 : TC FRAME ( BCD 2digits)
PC3   B7, B6  : ALL Zeros
      B5 ~ B0 : TC5 ~ TC0 (TC BIT FLAG)
                TC5 ⇔ TC BIT No 10
                TC4 ⇔ TC BIT No 11
                TC3 ⇔ TC BIT No 27
                TC2 ⇔ TC BIT No 43
                TC1 ⇔ TC BIT No 58
                TC0 ⇔ TC BIT No 59

PC4 ~ PC7
      B7 ~ B0 : User group 1 ~ 8

FIG. 8

|     | B7 | B6 | B5 | B4 | B3 | B2 | B1 | B0 |
|-----|----|----|----|----|----|----|----|----|
| PC1 | 0  | 0  | 1  | 1  | 0  | P-No. 1 |||
| PC2 | P-No. 2 |||| P-No. 3 ||||
| PC3 | INDEX No. ||||||||
| PC4 | HOUR ||||||||
| PC5 | MINUTE ||||||||
| PC6 | SECOND ||||||||
| PC7 | FRAME No. ||||||||
| PC8 | PACK PARITY ||||||||

```
PC1  B7~B4  : PACK ITEM = 0011
     B3     : Zero
PC1  B2~B0  : Program No. 3digit
PC2  B7~B0  :
PC3  B7~B0  : INDEX No.
PC4  B7~B0  : DAT TC HOUR      (00~23)
PC5  B7~B0  : DAT TC MINUTE    (00~59)
PC6  B7~B0  : DAT TC SECOND    (00~59)
PC7  B7~B0  : DAT TC FRAME No.
               ( 00~32, 00~32, 00~33 (repeated) )
               (|←—— 3 seconds ——→|             )
```

FIG.9

| | B7 | B6 | B5 | B4 | B3 | B2 | B1 | B0 |
|---|---|---|---|---|---|---|---|---|
| PC1 | 1 | 0 | 0 | 1 | T2 | T1 | T0 | b10 |
| PC2 | b9 | b8 | b7 | b6 | b5 | b4 | b3 | b2 |
| PC3 | b1 | b0 | TC5 | TC4 | TC3 | TC2 | TC1 | TC0 |
| PC4 | User Group 1 | | | | User Group 2 | | | |
| PC5 | User Group 3 | | | | User Group 4 | | | |
| PC6 | User Group 5 | | | | User Group 6 | | | |
| PC7 | User Group 7 | | | | User Group 8 | | | |
| PC8 | PACK PARITY | | | | | | | |

PC1  B7  B4  : PACK ITEM = 1001
     B3  B1  : T2, T1, T0 (TC ID DATA)
              0 0 0 ⇨ SMPTE 30Hz
              0 0 1 ⇨ SMPTE 29.97Hz
              0 1 0 ⇨ SMPTE 29.97Hz DROP FRAME
              0 1 1 ⇨ EBU 25Hz
              1 0 0 ⇨ FILM 24Hz

PC1 B0, PC2 B7~B0, PC3 B7·B6
              : b10~b0 (PHASE DIFFERENCE Io)
              (Binary 11bit b10 MSB. b0:LSB)

PC3  B5~B0  : TC5~TC0 (TC BIT FLAG)
              TC5 ⇦ TC BIT No. 10
              TC4 ⇦ TC BIT No. 11
              TC3 ⇦ TC BIT No. 27
              TC2 ⇦ TC BIT No. 43
              TC1 ⇦ TC BIT No. 58
              TC0 ⇦ TC BIT No. 59

PC4~7. B7~B0
              : User Group 1~8

FIG.10

|     | B7 | B6 | B5 | B4 | B3 | B2 | B1 | B0 |
|-----|----|----|----|----|----|----|----|----|
| PC1 | 0  | 0  | 1  | 1  | 1  | b10| b9 | b8 |
| PC2 | b7 | b6 | b5 | b4 | b3 | b2 | b1 | b0 |
| PC3 | T3 | T2 | T1 | T0 | 0  | 0  | 0  | 0  |
| PC5 | HOUR ||||||||
| PC5 | MINUTE ||||||||
| PC6 | SECOND ||||||||
| PC7 | FRAME No ||||||||
| PC8 | PACK PARITY ||||||||

PC1 B7~B4 : PACK ITEM = 0011
    B3     : B3 = 1
PC1 B2~B0 ⎫ : b10~b0 (PHASE DIFFERENCE Io)
PC2 B7~B0 ⎭   (Binary 11bit, b10:MSB, b0:LSB)
PC3 B7~B4 : T3~T0 (TC ID DATA)

| T3 | T2 | T1 | T0 | Contents |
|----|----|----|----|----------|
| 0  | 1  | 0  | 0  | EBU 25Hz |
| 1  | 0  | 0  | 0  | SMPTE 29.97Hz Non-drop frame |
| 1  | 0  | 0  | 1  | SMPTE 29.97Hz Drop frame |
| 1  | 0  | 1  | 0  | SMPTE 30Hz Non-drop frame |
| 1  | 1  | 0  | 0  | FILM 24Hz |
| Others |||| Reserved |

PC3 B3~B0 : B3~B0 = "0000" (All zero)

PC4 B7~B0 : DAT TC HOUR    (00 ~ 99)
PC5 B7~B0 : DAT TC MINUTE  (00 ~ 59)
PC6 B7~B0 : DAT TC SECOND (00 ~ 59)
PC7 B7~B0 : DAT TC FRAME No.
          (00~32 00~32 00~33 ·· (repeated))
          |← 3 seconds →|

FIG. 11

|     | B7 | B6 | B5 | B4 | B3 | B2 | B1 | B0 |
|-----|----|----|----|----|----|----|----|----|
| PC1 | 1  | 0  | 0  | 1  | 0  | 0  | 0  | 0  |
| PC2 | FRAME No. ||||||||
| PC3 | 0  | SD | TC5 | TC4 | TC3 | TC2 | TC1 | TC0 |
| PC4 | User Group 1 |||| User Group 2 ||||
| PC5 | User Group 3 |||| User Group 4 ||||
| PC6 | User Group 5 |||| User Group 6 ||||
| PC7 | User Group 7 |||| User Group 8 ||||
| PC8 | PACK PARITY ||||||||

PC1   B7~B4 : PACK ITEM = 1001
        B3~B0 : All zero

PC2   B7~B0 : DAT TC FRAME No. (BCD 2 digits)

PC3   B7 : Zero
        B6 : SD  SD=1 ⇒ {SAME CONTENT DATA AS PRECEDING DAT FRAME ARE RECORDED, EXCEPT FRAME No.

PC3   B5~B0 : TC5~TC0 (TC BIT FLAG)
            TC5 ⇔ TC BIT No. 10
            TC4 ⇔ TC BIT No. 11
            TC3 ⇔ TC BIT No. 27
            TC2 ⇔ TC BIT No. 43
            TC1 ⇔ TC BIT No. 58
            TC0 ⇔ TC BIT No. 59

PC4~7  B7~B0 : User Group 1~8

FIG.13

|     | B7 | B6 | B5 | B4 | B3 | B2 | B1 | B0 |
|-----|----|----|----|----|----|----|----|----|
| PC1 | 0  | 0  | 1  | 1  | 1  | b10| b9 | b8 |
| PC2 | b7 | b6 | b5 | b4 | b3 | b2 | b1 | b0 |
| PC3 | T3 | T2 | T1 | T0 | 0  | 0  | F1 | F0 |
| PC4 | HOUR ||||||||
| PC5 | MINUTE ||||||||
| PC6 | SECOND ||||||||
| PC7 | FRAME No. ||||||||
| PC8 | PACK PARITY ||||||||

PC1 B7~B4 : PACK ITEM = 0011
     B3    : B3 = 1

PC1 B2~B0 ) : b10~b0 (PHASE DIFFERENCE Io)
PC2 B7~B0 )   (Binary 11bit. b10:MSB. b0:LSB)

PC3 B7~B4 : T3~T0 (TC ID DATA)

| T3 | T2 | T1 | T0 | Contents |
|----|----|----|----|----------|
| 0  | 1  | 0  | 0  | EBU 25Hz |
| 1  | 0  | 0  | 0  | SMPTE 29.97Hz Non-drop frame |
| 1  | 0  | 0  | 1  | SMPTE 29.97Hz Drop frame |
| 1  | 0  | 1  | 0  | SMPTE 30Hz Non-drop frame |
| 1  | 1  | 0  | 0  | FILM 24Hz |
| Others |||| Reserved |

PC3 B3.B2 : B3.B2 = 00
PC3 B1.B0 : F1.F0 (COUNT CLOCK FREQUENCY)
         0   0 ⇔ 48 KHz
         0   1 ⇔ 44.1KHz
         1   0 ⇔ 32 KHz
         1   1 ⇔ Reserved PC4 B7~B0 : DAT TC HOUR (00~99)
PC5 B7~B0 : DAT TC MINUTE (00~59)
PC6 B7~B0 : DAT TC SECOND (00~59)
PC7 B7~B0 : DAT TC FRAME No.
         (00~32, 00~32, 00~33 · (repeated))
         |⟵ 3 seconds ⟶|

FIG.16

| | B7 | B6 | B5 | B4 | B3 | B2 | B1 | B0 |
|---|---|---|---|---|---|---|---|---|
| PC1 | 1 | 0 | 0 | 0 | F | S2 | S1 | S0 |
| PC2 | ID CODE (BYTE 4) OR All zero ||||||||
| PC3 | ID CODE (BYTE 5) OR All zero ||||||||
| PC4 | CHANNEL STATUS DATA ||||||||
| PC5 | ||||||||
| PC6 | ||||||||
| PC7 | ||||||||
| PC8 | PACK PARITY ||||||||

PC1 B7~B4 : PACK ITEM = 1000
    B3     : F   RELIABILITY FLAG (PRESCRIBED BIT IN BYTE 22)
    B2~B0 : S2~S0 (SUB PACK ITEM)

| B2 | B1 | B0 | Contents |
|---|---|---|---|
| 0 | 0 | 1 | ID CODE |
| 0 | 1 | 0 | ALPHNUMERIC CHANNEL ORIGIN DATA |
| 0 | 1 | 1 | ALPHNUMERIC CHANNEL DESTINATION DATA |
| 1 | 0 | 0 | LOCAL SAMPLE ADDRESS CODE |
| 1 | 0 | 1 | TIME OF DAY CODE |
| Others ||| Reserved |

PC2 B7~B0 ) IF SUB PACK ITEM 001 THEN ID CODE
PC3 B7~B0 ) BYTE 4, 5 ELSE All zero PC4 B7~B0 \
PC5 B7~B0  \
PC6 B7~B0  / : CHANNEL STATUS DATA (4 BYTES)
PC7 B7~B0 /

PC8 B7~B0 : PACK PARITY

FIG.17

|     | B7 | B6 | B5 | B4 | B3 | B2 | B1 | B0 |
|-----|----|----|----|----|----|----|----|----|
| PC1 | 1  | 0  | 0  | 0  | F  | 0  | 0  | 1  |
| PC2 | ID CODE (BYTE 4) |||||||||
| PC3 | ID CODE (BYTE 5) |||||||||
| PC4 | ID CODE (BYTE 0) |||||||||
| PC5 | ID CODE (BYTE 1) |||||||||
| PC6 | ID CODE (BYTE 2) |||||||||
| PC7 | ID CODE (BYTE 3) |||||||||
| PC  | PACK PARITY |||||||||

PC1   B7~B4 : PACK ITEM = 1000
       B3     : F (RELIABILITY FLAG (BYTE.22, BIT 4))
       B2~B0 : SUB PACK ITEM = 001

PC2   B7~B0
PC3   B7~B0
PC4   B7~B0     : ID CODES ( BYTES 0~5 )
PC5   B7~B0
PC6   B7~B0
PC7   B7~B0

PC8   B7~B0 : PACK PARITY

FIG.18

|      | B7 | B6 | B5 | B4 | B3 | B2 | B1 | B0 |
|------|----|----|----|----|----|----|----|----|
| PC1  | 1  | 0  | 0  | 0  | F  | 0  | 1  | 0  |
| PC2  | 0  | 0  | 0  | 0  | 0  | 0  | 0  | 0  |
| PC3  | 0  | 0  | 0  | 0  | 0  | 0  | 0  | 0  |
| PC4  | \multicolumn{8}{l}{ALPHNUMERIC CHANNEL ORIGIN DATA (BYTE 6)} |
| PC5  | \multicolumn{8}{l}{ALPHNUMERIC CHANNEL ORIGIN DATA (BYTE 7)} |
| PC6  | \multicolumn{8}{l}{ALPHNUMERIC CHANNEL ORIGIN DATA (BYTE 8)} |
| PC7  | \multicolumn{8}{l}{ALPHNUMERIC CHANNEL ORIGIN DATA (BYTE 9)} |
| PC8  | \multicolumn{8}{l}{PACK PARITY} |

PC1 B7~B4 : PACK ITEM = 1000
    B3     : F (RELIABILITY FLAG(BYTE 22 BIT 5))
    B2~B0 : SUB PACK ITEM = 010

PC2 B7~B0 )
PC3 B7~B0 ) : All zero

PC4 B7~B0 \
PC5 B7~B0  : ALPHNUMERIC CHANNEL
PC6 B7~B0 /   ORIGIN DATA (BYTEs 6~9)
PC7 B7~B0 /

PC8 B7~B0 : PACK PARITY

FIG.19

|     | B7 | B6 | B5 | B4 | B3 | B2 | B1 | B0 |
|-----|----|----|----|----|----|----|----|----|
| PC1 | 1  | 0  | 0  | 0  | F  | 0  | 1  | 1  |
| PC2 | 0  | 0  | 0  | 0  | 0  | 0  | 0  | 0  |
| PC3 | 0  | 0  | 0  | 0  | 0  | 0  | 0  | 0  |
| PC4 | ALPHNUMERIC CHANNEL DESTINATION DATA (BYTE 10) ||||||||
| PC5 | ALPHNUMERIC CHANNEL DESTINATION DATA (BYTE 11) ||||||||
| PC6 | ALPHNUMERIC CHANNEL DESTINATION DATA (BYTE 12) ||||||||
| PC7 | ALPHNUMERIC CHANNEL DESTINATION DATA (BYTE 13) ||||||||
| PC8 | PACK PARITY ||||||||

PC1 B7~B4 : PACK ITEM = 1000
     B3     : F (RELIABILITY FLAG (BYTE 22 BIT 5))
     B2~B0 : SUB PACK ITEM = 011

PC2 B7~B0 ⎫
PC3 B7~B0 ⎭ : All zero

PC4 B7~B0 ⎫
PC5 B7~B0 ⎬ ALPHNUMERIC CHANNEL
PC6 B7~B0 ⎪ DESTINATION DATA (BYTEs 10~13)
PC7 B7~B0 ⎭

PC8 B7~B0 : PACK PARITY

FIG.20

|     | B7 | B6 | B5 | B4 | B3 | B2 | B1 | B0 |
|-----|----|----|----|----|----|----|----|----|
| PC1 | 1  | 0  | 0  | 0  | F  | 1  | 0  | 0  |
| PC2 | 0  | 0  | 0  | 0  | 0  | 0  | 0  | 0  |
| PC3 | 0  | 0  | 0  | 0  | 0  | 0  | 0  | 0  |
| PC4 | LOCAL SAMPLE ADDRESS CODE ||||||||
| PC5 | LOCAL SAMPLE ADDRESS CODE ||||||||
| PC6 | LOCAL SAMPLE ADDRESS CODE ||||||||
| PC7 | LOCAL SAMPLE ADDRESS CODE ||||||||
| PC8 | PACK PARITY ||||||||

PC1 B7~B4 : PACK ITEM = 1000
　　 B3　　 : F (RELIABILITY FLAG (BYTE 22 BIT 6))
　　 B2~B0 : SUB PACK ITEM = 100

PC2 B7~B0 ⎫
PC3 B7~B0 ⎭ : All zero

PC4 B7~B0 ⎫
PC5 B7~B0 ⎬ LOCAL SAMPLE ADDRESS CODE FOR
PC6 B7~B0 ⎪ : SAMPLE AT THE HEAD OF DAT FRAME
PC7 B7~B0 ⎭ 　　(32 bit binary code)

PC8 B7~B0 　: PACK PARITY

FIG.21

|     | B7 | B6 | B5 | B4 | B3 | B2 | B1 | B0 |
|-----|----|----|----|----|----|----|----|----|
| PC1 | 1  | 0  | 0  | 0  | F  | 1  | 0  | 1  |
| PC2 | 0  | 0  | 0  | 0  | 0  | 0  | 0  | 0  |
| PC3 | 0  | 0  | 0  | 0  | 0  | 0  | 0  | 0  |
| PC4 | TIME OF DAY CODE ||||||||
| PC5 | TIME OF DAY CODE ||||||||
| PC6 | TIME OF DAY CODE ||||||||
| PC7 | TIME OF DAY CODE ||||||||
| PC8 | PACK PARITY ||||||||

PC1  B7~B4 : PACK ITEM = 1000
     B3    : F (RELIABILITY FLAG (BYTE 22 BIT 7))
     B2~B0 : SUB PACK ITEM = 101

PC2  B7~B0 ⎫
PC3  B7~B0 ⎭ : All zero

PC4  B7~B0 ⎫  TIME
PC5  B7~B0 ⎟  OF DAY CODE FOR SAMPLE AT THE
PC6  B7~B0 ⎟  HEAD OF DAT FRAME (32bit binary code)
PC7  B7~B0 ⎭

PC8  B7  B0 : PACK PARITY

FIG.22

|      | B7 | B6 | B5 | B4 | B3 | B2 | B1 | B0 |
|------|----|----|----|----|----|----|----|----|
| PC1  | 1  | 0  | 0  | 0  | 0  | 0  | 0  | 1  |
| PC2  |    |    |    |    |    |    |    |    |
| PC3  |    |    |    |    |    |    |    |    |
| PC4  | ID CODE (6 BYTEs) | | | | | | | |
| PC5  |    |    |    |    |    |    |    |    |
| PC6  |    |    |    |    |    |    |    |    |
| PC7  |    |    |    |    |    |    |    |    |
| PC8  | PACK PARITY | | | | | | | |

PC1　B7~B4　:PACK ITEM=1000

B3~B0　:SUB PACK ITEM=0001

PC2　B7~B0  
PC3　B7~B0  
PC4　B7~B0  
PC5　B7~B0　} : ID CODE  
PC6　B7~B0  
PC7　B7~B0

PC8　B7~B0　:PACK PARITY

FIG.23

|     | B7 | B6 | B5 | B4 | B3 | B2 | B1 | B0 |
|-----|----|----|----|----|----|----|----|----|
| PC1 | 1  | 0  | 0  | 0  | 0  | 0  | 1  | 0  |
| PC2 | \multicolumn{8}{c|}{} |
| PC3 | \multicolumn{8}{c|}{ALPHNUMERIC CHANNEL ORIGIN DATA ( 4 BYTEs )} |
| PC4 | | | | | | | | |
| PC5 | | | | | | | | |
| PC6 | \multicolumn{8}{c|}{ALPHNUMERIC CHANNEL DISTINATION DATA ( LOWER 2 BYTEs )} |
| PC7 | | | | | | | | |
| PC8 | \multicolumn{8}{c|}{PACK PARITY} |

PC1   B7~B4 : PACK ITEM = 1000

B3~B0 : SUB PACK ITEM = 0010

PC2   B7   B0  
PC3   B7   B0  } : ALPHNUMERIC CHANNEL  
PC4   B7   B0  /   ORIGIN DATA ( 4 BYTEs )

PC5   B7   B0  
PC6   B7   B0  } : ALPHNUMERIC CHANNEL  
PC7   B7   B0  /   DESTINATION DATA ( LOWER 2 BYTEs )

PC8   B7   B0  : PACK PARITY

FIG. 24

|     | B7 | B6 | B5 | B4 | B3 | B2 | B1 | B0 |
|-----|----|----|----|----|----|----|----|----|
| PC1 | 1  | 0  | 0  | 0  | 0  | 0  | 1  | 1  |
| PC2 | ALPHNUMERIC CHANNEL DESTINATION DATA (UPPER 2 BYTEs) ||||||||
| PC3 |  ||||||||
| PC4 | LOCAL SAMPLE ADDRESS CODE (4 BYTEs) ||||||||
| PC5 |  ||||||||
| PC6 |  ||||||||
| PC7 |  ||||||||
| PC8 | PACK PARITY ||||||||

PC1   B7~B4 : PACK ITEM = 1000

B3~B0 : SUB PACK ITEM = 0011

PC2   B7~B0 ⎫ .ALPHNUMERIC CHANNEL
PC3   B7~B0 ⎭ ·DESTINATION DATA(UPPER 2 BYTEs)

PC4   B7~B0 ⎫
PC5   B7~B0 ⎪
PC6   B7~B0 ⎬ :LOCAL SAMPLE ADDRESS CODE
PC7   B7~B0 ⎭ (4 BYTEs)

PC8   B7~B0 : PACK PARITY

FIG.25

| | B7 | B6 | B5 | B4 | B3 | B2 | B1 | B0 |
|---|---|---|---|---|---|---|---|---|
| PC1 | 1 | 0 | 0 | 0 | 0 | 1 | 0 | 0 |
| PC2 | TIME OF DAY CODE (4 BYTEs) ||||||||
| PC3 | ||||||||
| PC4 | ||||||||
| PC5 | ||||||||
| PC6 | RELIABILITY FLAG (1 BYTE) ||||||||
| PC7 | CRCC (1 BYTE) ||||||||
| PC8 | PACK PARITY ||||||||

PC1   B7~B4 : PACK ITEM = 1000

B3~B0 : SUB PACK ITEM = 0100

PC2   B7~B0  
PC3   B7~B0  : TIME OF DAY CODE (4 BYTEs)  
PC4   B7~B0  
PC5   B7~B0

PC6   B7~B0 : RELIABILITY FLAG (1 BYTE)  
PC7   B7~B0 : CRCC (1 BYTE)  
PC8   B7~B0 : PACK PARITY

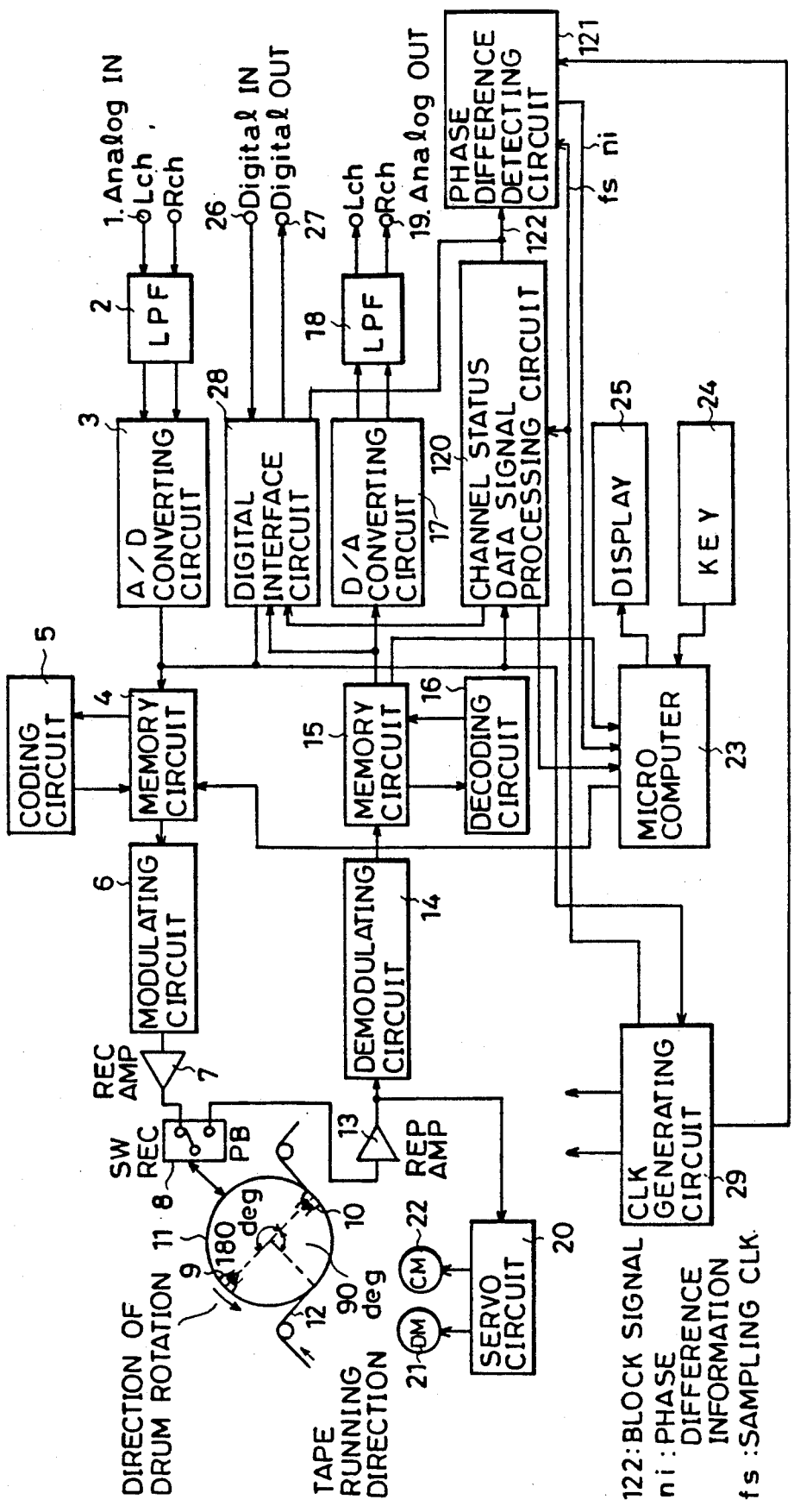

FIG.28

|     | B7 | B6 | B5 | B4 | B3 | B2  | B1 | B0 |
|-----|----|----|----|----|----|-----|----|----|
| PC1 | 0  | 0  | 1  | 1  | 1  | S10 | S9 | S8 |
| PC2 | S7 | S6 | S5 | S4 | S3 | S2  | S1 | S0 |
| PC3 | T3 | T2 | T1 | T0 | 0  | 0   | 0  | 0  |
| PC4 | HOUR ||||||||
| PC5 | MINUTE ||||||||
| PC6 | SECOND ||||||||
| PC7 | FRAME No. ||||||||
| PC8 | PACK PARITY ||||||||

PC1  B7~B4 : PACK ITEM = 0011
     B3     : B3 = 1

PC1  B2~B0 ) : S10~S0 (SAMPLE No.)
PC2  B7~B0 )  (Binary 11bits, S10: MSB, S0: LSB)

PC3  B7~B4 : T3~T0 (TC ID DATA)

T3 T2 T1 T0
  0  0  0  0   DIGITAL I/O TIME OF  fs=48KHz
  0  0  0  1   DAY CODE ↵         fs=44.1KHz
  0  0  1  0           ↵               fs=32 KHz
    Others      Reserved PC3  B3~B0 : All zeros
PC4  B7~B0 : DAT TC HOUR   (00~99)
PC5  B7~B0 : DAT TC MINUTE (00~59)
PC6  B7~B0 : DAT TC SECOND (00~59)
PC7  B7~B0 : DAT TC FRAME No.
               (00~32, 00~32 00~33 ··· (repeated))
               |←——— 3 seconds ———→|

FIG.29

|     | B7 | B6 | B5 | B4 | B3 | B2  | B1 | B0 |
|-----|----|----|----|----|----|-----|----|----|
| PC1 | 0  | 0  | 0  | 1  | 1  | S10 | S9 | S8 |
| PC2 | S7 | S6 | S5 | S4 | S3 | S2  | S1 | S0 |
| PC3 | T3 | T2 | T1 | T0 | 0  | 0   | 0  | 0  |
| PC4 | HOUR ||||||||
| PC5 | MINUTE ||||||||
| PC6 | SECOND ||||||||
| PC7 | FRAME No. ||||||||
| PC8 | PACK PARITY ||||||||

PC1 B7~B4 : PACK ITEM = 0001
    B3     : B3 = 1

PC1 B2~B0 ⎫
PC2 B7~B0 ⎭ : S10~S0 (SAMPLE No.)
    (Binary 11bits, S10: MSB S0: LSB)

PC3 B7~B4 : T3~T0 (TC ID DATA)

T3 T2 T1 T0
  0  0  0  0  LOCAL SAMPLE ADDRESS CODE    fs = 48KHz
  0  0  0  1  "    fs = 44.1KHz
  0  0  1  0  "    fs = 32KHz
  Other    Reserved PC3 B3~B0 : All zeros
PC4 B7~B0 : DAT TC HOUR (00~99)
PC5 B7~B0 : DAT TC MINUTE (00~59)
PC6 B7~B0 : DAT TC SECOND (00~59)
PC7 B7~B0 : DAT TC FRAME No.
        00~32, 00~32, 00~33 ··· (repeated)
        |⎯ 3 seconds ⎯|

FIG.30

|     | B7 | B6 | B5 | B4 | B3 | B2  | B1 | B0 |
|-----|----|----|----|----|----|-----|----|----|
| PC1 | 0  | 0  | 1  | 1  | 1  | S10 | S9 | S8 |
| PC2 | S7 | S6 | S5 | S4 | S3 | S2  | S1 | S0 |
| PC3 | T3 | T2 | T1 | T0 | 0  | 0   | 0  | MS |
| PC4 | HOUR ||||||||
| PC5 | MINUTE ||||||||
| PC6 | SECOND ||||||||
| PC7 | FRAME No. ||||||||
| PC8 | PACK PARITY ||||||||

PC1 B7~B4 : PACK ITEM = 0011
    B3 : B3 = 1

PC1 B2~B0 ⎫ : S10~S0 (SAMPLE No)
PC2 B7~B0 ⎭ (Binary 11bit, S10:MSB, S0:LSB)

PC3 B7~B4 : T3~T0 (TC ID DATA)

T3 T2 T1 T0
  0  0  0  0   DIGITAL I/O TIME OF DAY CODE  fs=48 KHz
  0  0  0  1                     "                                fs=44.1 KHz
  0  0  1  0                     "                                fs=32 KHz
  Others  Reserved PC3 B3~B1 : All zeros
    B0    : MS (M/S̄ ID flag) MS=0 ⇒ SAMPLE No. IS RECORDED
                                                        MS=1 ⇒ ni (M7~M0) IS RECORDED PC4 B7~B0 : DAT TC HOUR (00~99)
PC5 B7~B0 : DAT TC MINUTE (00~59)
PC6 B7~B0 : DAT TC SECOND (00~59)
PC7 B7~B0 : DAT TC FRAME No.
               (00~32, 00~32, 00~33 ··· (repeated))
               |← 3 seconds →|

FIG.31

|     | B7 | B6 | B5 | B4 | B3 | B2 | B1 | B0 |
|-----|----|----|----|----|----|----|----|----|
| PC1 | 0  | 0  | 1  | 1  | 1  | 0  | 0  | 0  |
| PC2 | M7 | M6 | M5 | M4 | M3 | M2 | M1 | M0 |
| PC3 | T3 | T2 | T1 | T0 | 0  | 0  | 0  | MS |
| PC4 | HOUR |||||||| 
| PC5 | MINUTE ||||||||
| PC6 | SECOND ||||||||
| PC7 | FRAME No. ||||||||
| PC8 | PACK PARITY ||||||||

PC1 B7~B0 : PACK ITEM = 0011
    B3        : B3 = 1
    B2~B0 : All zeros
PC2 B7~B0 : M7~M0 (PHASE DIFFERENCE ni)
           (Binary 8bit, M7: MSB, M0: LSB)
PC3 B7~B4 : T3~T0 (TC ID DATA)

T3 T2 T1 T0
   0   0   0   0   DIGITAL I/O TIME OF DAY CODE  fs 48KHz
   0   0   0   1                  ″                            fs=44.1KHz
   0   0   1   0                  ″                            fs=32KHz
  Others   Reserved PC3 B3~B1 : All zeros
    B0      : MS (M/S ID flag) MS=0 ⇒ SAMPLE No. IS RECORDED
                                       MS=1 ⇒ ni (M7~M0) IS RECORDED
PC4 B7~B0 : DAT TC HOUR (00~99)
PC5 B7~B0 : DAT TC MINUTE (00~59)
PC6 B7~B0 : DAT TC SECOND (00~59)
PC7 B7~B0 : DAT TC FRAME No.
            (00~32, 00~32, 00~33,···(repeated))
            |←——3 seconds——→|

FIG.32

|     | B7 | B6 | B5 | B4 | B3 | B2  | B1 | B0 |
|-----|----|----|----|----|----|-----|----|----|
| PC1 | 0  | 0  | 0  | 1  | 1  | S10 | S9 | S8 |
| PC2 | S7 | S6 | S5 | S4 | S3 | S2  | S1 | S0 |
| PC3 | T3 | T2 | T1 | T0 | 0  | 0   | 0  | MS |
| PC4 | HOUR |||||||||
| PC5 | MINUTE |||||||||
| PC6 | SECOND |||||||||
| PC7 | FRAME No. |||||||||
| PC8 | PACK PARITY |||||||||

PC1 B7~B4 : PACK ITEM = 0001
    B3    : B3 = 1

PC1 B2~B0 ⎫ :S10~S0 (SAMPLE No.)
PC2 B7~B0 ⎭ ( Binary 11bits, S10:MSB, S0:LSB )

PC3 B7~B4 : T3~T0 (TC ID DATA)

T3 T2 T1 T0
    0  0  0  0   LOCAL SAMPLE ADDRESS CODE  fs=48KHz
    0  0  0  1           ″                  fs=44.1KHz
    0  0  1  0           ″                  fs=32KHz
       Others  Reserved PC3 B3~B1 : All zeros
    B0    : MS(M/S ID flag) MS=0 ⇒ SAMPLE No. IS RECORDED
                            MS=1 ⇒ ni(M7~M0) IS RECORDED PC4 B7~B0 : DAT TC HOUR (00~99)
PC5 B7~B0 : DAT TC MINUTE (00~59)
PC6 B7~B0 : DAT TC SECOND (00~59)
PC7 B7~B0 : DAT TC FRAME No.
            00~32, 00~32, 00~33 ··· (repeated)
            |←— 3 seconds —→|

FIG.33

|     | B7 | B6 | B5 | B4 | B3 | B2 | B1 | B0 |
|-----|----|----|----|----|----|----|----|----|
| PC1 | 0  | 0  | 0  | 1  | 1  | 0  | 0  | 0  |
| PC2 | M7 | M6 | M5 | M4 | M3 | M2 | M1 | M0 |
| PC3 | T3 | T2 | T1 | T0 | 0  | 0  | 0  | MS |
| PC4 | HOUR ||||||||
| PC5 | MINUTE ||||||||
| PC6 | SECOND ||||||||
| PC7 | FRAME No. ||||||||
| PC  | PACK PARITY ||||||||

PC1   B7~B4 : PACK ITEM = 0001
       B3      : B3 = 1
       B2~B0 : All zeros

PC2   B7~B0 : M7~M0 (PHASE DIFFERENCE ni)
               (Binary 8bits, M7: MSB, M0: LSB)

PC3   B7~B4 : T3~T0 (TC ID DATA)

T3 T2 T1 T0
      0   0   0   0    LOCAL SAMPLE ADDRESS CODE   fs = 48 KHz
      0   0   0   1                  "                       fs = 44.1 KHz
      0   0   1   0                  "                       fs = 32 KHz
      Others    Reserved PC3   B3~B1 : All zeros
       B0      : MS (M/S ID flag) MS = 0 ⇒ RECORD SAMPLE No. IS RECORDED
                                           MS = 1 ⇒ RECORD ni (M7~M0) IS RECORDED PC4   B7~B0 : DAT TC HOUR (00~99)
PC5   B7~B0 : DAT TC MINUTE (00~59)
PC6   B7~B0 : DAT TC SECOND (00~59)
PC7   B7~B0 : DAT TC FRAME No.
                       (00~32, 00~32, 00~33 ··· (repeated))
                       |←    3 seconds   →|

FIG.35

|     | B7 | B6 | B5 | B4 | B3 | B2 | B1 | B0 |
|-----|----|----|----|----|----|----|----|----|
| PC1 | 1 | 0 | 0 | 0 | F | 0 | 1 | 0 |
| PC2 | F1 | F0 | BN2 | BN1 | BN0 | 0 | 0 | 0 |
| PC3 | N7 | N6 | N5 | N4 | N3 | N2 | N1 | N0 |
| PC4 | ALPHNUMERIC CHANNEL ORIGIN DATA (BYTE 6) | | | | | | | |
| PC5 | ALPHNUMERIC CHANNEL ORIGIN DATA (BYTE 7) | | | | | | | |
| PC6 | ALPHNUMERIC CHANNEL ORIGIN DATA (BYTE 8) | | | | | | | |
| PC7 | ALPHNUMERIC CHANNEL ORIGIN DATA (BYTE 9) | | | | | | | |
| PC8 | PACK PARITY | | | | | | | |

PC1 B7–B4 : PACK ITEM = 1000
    B3    : IF F (RELIABILITY FLAG) IS "1", UNRELIABLE
    B2–B0 : SUB PACK ITEM = 010

PC2 B7,B6 : F1, F0 (INFORMATION FOR IDENTIFYING SAMPLING FREQUENCY IN RECORDING)
      "00" → 48 KHz   "01" → 44.1 KHz
      "10" → 32 KHz

B5–B3 : BN2–BN0 (BLOCK No. OF CHANNEL STATUS DATA CORRESPONDING TO DAT FRAME)
      No. OF BLOCK AT CHANGING POINT OF DAT FRAME IS SET TO "000" No. SUCCESSIVELY CHANGES "001" ~ "111" (MAX)

PC2 B2–B0 : All zeros
PC3 B7–B0 : N7–N0 (PHASE DIFFERENCE INFORMATION ni)
    (Binary 8bits, N7: MSB, N0: LSB)

PC4 B7–B0 : ALPHNUMERIC CHANNEL ORIGIN DATA (BYTE 6)
PC5 B7–B0 : ALPHNUMERIC CHANNEL ORIGIN DATA (BYTE 7)
PC6 B7–B0 : ALPHNUMERIC CHANNEL ORIGIN DATA (BYTE 8)
PC7 B7–B0 : ALPHNUMERIC CHANNEL ORIGIN DATA (BYTE 9)

PC8 B7–B0 : PACK PARITY

FIG.36

|     | B7 | B6 | B5 | B4 | B3 | B2 | B1 | B0 |
|-----|----|----|----|----|----|----|----|----|
| PC1 | 1  | 0  | 0  | 0  | F  | 0  | 1  | 1  |
| PC2 | F1 | F0 | BN2| BN1| BN0| 0  | 0  | 0  |
| PC3 | N7 | N6 | N5 | N4 | N3 | N2 | N1 | N0 |
| PC4 | ALPHNUMERIC CHANNEL DESTINATION DATA (BYTE 10) ||||||||
| PC5 | ALPHNUMERIC CHANNEL DESTINATION DATA (BYTE 11) ||||||||
| PC6 | ALPHNUMERIC CHANNEL DESTINATION DATA (BYTE 12) ||||||||
| PC7 | ALPHNUMERIC CHANNEL DESTINATION DATA (BYTE 13) ||||||||
| PC8 | PACK PARITY ||||||||

PC1 B7~B4 : PACK ITEM = 1000
　　B3　　: IF F (RELIABILITY FLAG) IS "1", UNRELIABLE
　　B2~B0 : SUB PACK ITEM = 011

PC2 B7,B6 : F1, F0 (INFORMATION FOR IDENTIFYING SAMPLING
　　　　　　　　　　FREQUENCY AT RECORDING)
　　　　　　"00" → 48 KHz, "01" → 44.1 KHz
　　　　　　"10" → 32 KHz

B5~B3 : BN2~BN0 (BLOCK No. OF CHANNEL STATUS DATA
　　　　　　　　　　　CORRESPONDING TO DAT FRAME)
　　　　　　No. OF BLOCK AT CHANGING POINT OF DAT
　　　　　　FRAME IS SET TO "00" No. CHANGES to
　　　　　　"001" ~ "111" (MAX).

PC2 B2~B0 : All zeros

PC3 B7~B0 : N7~ N0 (PHASE DIFFERENCE INFORMATION ni)
　　　　　　(Binary 8bits, N7: NSB, N0: LSB)

PC4 B7~B0: ALPHNUMERIC CHANNEL DESTINATION DATA
　　　　　　(BYTE 10)
PC5 B7~B0: ALPHNUMERIC CHANNEL DESTINATION DATA
　　　　　　(BYTE 11)
PC6 B7~B0: ALPHNUMERIC CHANNEL DESTINATION DATA
　　　　　　(BYTE 12)
PC7 B7~B0: ALPHNUMERIC CHANNEL DESTINATION DATA
　　　　　　(BYTE 13)
PC8 B7~B0: PACK PARITY

FIG. 37

|     | B7 | B6 | B5 | B4 | B3 | B2 | B1 | B0 |
|-----|----|----|----|----|----|----|----|----|
| PC1 | 1  | 0  | 0  | 0  | F  | 0  | 1  | 0  |
| PC2 | F1 | F0 | BN2 | BN1 | BN0 | M10 | M9 | M8 |
| PC3 | M7 | M6 | M5 | M4 | M3 | M2 | M1 | M0 |
| PC4 | ALPHNUMERIC CHANNEL ORIGIN DATA (BYTE 6) ||||||||
| PC5 | ALPHNUMERIC CHANNEL ORIGIN DATA (BYTE 7) ||||||||
| PC6 | ALPHNUMERIC CHANNEL ORIGIN DATA (BYTE 8) ||||||||
| PC7 | ALPHNUMERIC CHANNEL ORIGIN DATA (BYTE 9) ||||||||
| PC8 | PACK PARITY ||||||||

PC1   B7~B4   PACK ITEM = 1000
       B3      IF F (RELIABILITY FLAG) IS "1" UNRELIABLE
       B2~B0   SUB PACK ITEM = 010

PC2   B7, B6   F1, F0 (INFORMATION FOR IDENTIFYING SAMPLING
                         FREQUENCY AT RECORDING)
                    "00" → 48KHz , "01" → 44.1KHz
                    "10" → 32KHz

B5~B3 : BN2~BN0 (BLOCK No. OF CHANNEL STATUS DATA
                           BLOCK CORRESPONDING TO DAT FRAME)
           No. OF BLOCK AT CHANGING POINT OF DAT
           FRAME IS SET TO "000"; No. CHANGES to "001"~
           111 (MAX)

PC2   B2~B0 )   M10~M0 (PHASE INFORMATION m FROM
PC3   B7~B0 ) :               CHANGING POINT OF DAT FRAME TO
                          EACH CHANNEL STATUS DATA BLOCK)

BN2~BN0 "000" → VALUES M10~M0 = ni

PC4   B7~B0 : ALPHNUMERIC CHANNEL ORIGIN DATA (BYTE 6)
PC5   B7~B0 : ALPHNUMERIC CHANNEL ORIGIN DATA (BYTE 7)
PC6   B7~B0 : ALPHNUMERIC CHANNEL ORIGIN DATA (BYTE 8)
PC7   B7~B0 : ALPHNUMERIC CHANNEL ORIGIN DATA (BYTE 9)

PC8   B7~B0 : PACK PARITY

FIG.38

|     | B7 | B6 | B5 | B4 | B3 | B2 | B1 | B0 |
|-----|----|----|----|----|----|----|----|----|
| PC1 | 1  | 0  | 0  | 0  | F  | 0  | 1  | 1  |
| PC2 | F1 | F0 | BN2| BN1| BN0| M10| M9 | M8 |
| PC3 | M7 | M6 | M5 | M4 | M3 | M2 | M1 | M0 |
| PC4 | ALPHNUMERIC CHANNEL DESTINATION DATA (BYTE 10) | | | | | | | |
| PC5 | ALPHNUMERIC CHANNEL DESTINATION DATA (BYTE 11) | | | | | | | |
| PC6 | ALPHNUMERIC CHANNEL DESTINATION DATA (BYTE 12) | | | | | | | |
| PC7 | ALPHNUMERIC CHANNEL DESTINATION DATA (BYTE 13) | | | | | | | |
| PC8 | PACK PARITY | | | | | | | |

PC1   B7 B4 : PACK ITEM = 1000
        B3     : IF F (RELIABILITY FLAG) IS "1", UNRELIABLE
        B2~B0 : SUB PACK ITEM = 011

PC2   B7, B6 : F1, F0 (INFORMATION FOR IDENTIFYING SAMPLING FREQUENCY AT RECORDING)
               "00" → 48 KHz, "01" → 44.1 KHz
               10 → 32 KHz

B5~B3 : BN2~BN0 (BLOCK No. OF CHANNEL STATUS DATA CORRESPONDING TO DAT FRAME)

No. OF BLOCK AT CHANGING POINT OF DAT FRAME IS SET TO "000", No. CHANGES TO "001"···"111" (MAX)

PC2   B2~B0 ⎫  M10~M0 (PHASE INFORMATION m FROM CHANGING
PC3   B7~B0 ⎭  POINT OF DAT FRAME TO HEAD OF EACH CHANNEL STATUS DATA BLOCK)

BN2~BN0 "000" → VALUES M10~M0 = ni

PC4   B7~B0 : ALPHNUMERIC CHANNEL DESTINATION DATA (BYTE 10)
PC5   B7~B0 : ALPHNUMERIC CHANNEL DESTINATION DATA (BYTE 11)
PC6   B7~B0 : ALPHNUMERIC CHANNEL DESTINATION DATA (BYTE 12)
PC7   B7~B0 : ALPHNUMERIC CHANNEL DESTINATION DATA (BYTE 13)
PC8   B7~B0 : PACK PARITY

FIG. 39

|      | B7 | B6 | B5 | B4 | B3 | B2 | B1 | B0 |
|------|----|----|----|----|----|----|----|----|
| PC1  | PACK ITEM 0 | 0 | 1 | 1 | 1 | 0 | SPI1 | SPI0 |
| PC2  | F1 | F0 | T2 | T1 | T0 | (MSB) | | |
| PC3  | 11 BIT BINARY DATA | | | | | | | (LSB) |
| PC4  | HOUR (RH) | | | | | | | |
| PC5  | MINUTE (RM) | | | | | | | |
| PC6  | SECOND (RS) | | | | | | | |
| PC7  | FRAME (RF) | | | | | | | |
| PC8  | PACK PARITY | | | | | | | |

FIG. 40

|      | B7 | B6 | B5 | B4 | B3 | B2 | B1 | B0 |
|------|----|----|----|----|----|----|----|----|
| PC1  | 1 | 0 | 0 | 0 | 0 | 0 | SPI1 | SPI0 |
| PC2  | SUB DATA FIELD | | | | | | | |
| PC3  | | | | | | | | |
| PC4  | | | | | | | | |
| PC5  | | | | | | | | |
| PC6  | | | | | | | | |
| PC7  | | | | | | | | |
| PC8  | PACK PARITY | | | | | | | |

FIG.41

|      | B7 | B6 | B5 | B4 | B3 | B2 | B1 | B0 |
|------|----|----|----|----|----|----|----|----|
| PC1  | 1  | 0  | 0  | 0  | 0  | 0  | 0  | 0  |
| PC2  | 0  | 0  | 0  | 0  | 0  | 0  | 0  | 0  |
| PC3  | 0  | 0  | TB5 | TB4 | TB3 | TB2 | TB1 | TB0 |
| PC4  | 8th BINARY GROUP |||| 7th BINARY GROUP ||||
| PC5  | 6th BINARY GROUP |||| 5th BINARY GROUP ||||
| PC6  | 4th BINARY GROUP |||| 3th BINARY GROUP ||||
| PC7  | 2th BINARY GROUP |||| 1th BINARY GROUP ||||
| PC8  | PACK PARITY ||||||||

FIG.42

|      | B7 | B6 | B5 | B4 | B3 | B2 | B1 | B0 |
|------|----|----|----|----|----|----|----|----|
| PC1  | 1  | 0  | 0  | 0  | 0  | 0  | 0  | 1  |
| PC2  | a  | b  | c  | c  | c  | d  | e  | e  |
| PC3  | f  | f  | f  | f  | g  | g  | g  | g  |
| PC4  | h  | h  | h  | h  | i  | i  | i  | i  |
| PC5  | j  | j  | j  | j  | j  | j  | j  | j  |
| PC6  | BITYE 4 ||||||||
| PC7  | BITYE 5 ||||||||
| PC8  | PACK PARITY ||||||||

PC2–PC5: ID CODE

PC2 B7~B0 : CHANNEL STATUSDATA BLOCK BYTE 0
PC3 B7~B0 : CHANNEL STATUSDATA BLOCK BYTE 1
PC4 B7~B0 : CHANNEL STATUSDATA BLOCK BYTE 2
PC5 B7~B0 : CHANNEL STATUSDATA BLOCK BYTE 3
PC6 B7~B0 : CHANNEL STATUSDATA BLOCK BYTE 4
PC7 B7~B0 : CHANNEL STATUSDATA BLOCK BYTE 5

FIG.43

|     | B7 | B6 | B5 | B4 | B3 | B2 | B1 | B0 |
|-----|----|----|----|----|----|----|----|----|
| PC1 | 1  | 0  | 0  | 0  | 0  | 0  | 1  | 0  |
| PC2 | 0  | 0  | 0  | 0  | 0  | 0  | 0  | 0  |
| PC3 | 0  | 0  | 0  | 0  | 0  | 0  | 0  | 0  |
| PC4 | ALPHNUMERIC CHANNEL ORIGIN DATA ||||||||
| PC5 | ||||||||
| PC6 | ||||||||
| PC7 | ||||||||
| PC8 | PACK PARITY ||||||||

FIG.44

|     | B7 | B6 | B5 | B4 | B3 | B2 | B1 | B0 |
|-----|----|----|----|----|----|----|----|----|
| PC1 | 1  | 0  | 0  | 0  | 0  | 0  | 1  | 1  |
| PC2 | 0  | 0  | 0  | 0  | 0  | 0  | 0  | 0  |
| PC3 | RELIABILITY FLAG ||||||||
| PC4 | ALPHNUMERIC CHANNEL ORIGIN DATA ||||||||
| PC5 | ||||||||
| PC6 | ||||||||
| PC7 | ||||||||
| PC8 | PACK PARITY ||||||||

FIG.47

| Tfr \ FS | 48KHz | 44.1KHz | 32KHz |
|---|---|---|---|
| 30 Hz | 1 | 1 | 3 |
| 25 Hz | 1 | 1 | 1 |
| 24 Hz | 1 | 2 | 3 |

FIG.48

| Tfr \ FS | 48KHz | 44.1KHz | 32KHz |
|---|---|---|---|
| 30 Hz | 1600 | 1470 | 1066.6 |
| 29.97Hz | 1601.601 | 1471.471 | 1067.73... |
| 25 Hz | 1920 | 1764 | 1280 |
| 24 Hz | 2000 | 1837.5 | 1333.3 |

FIG.55

|      | B7 | B6 | B5 | B4 | B3 | B2 | B1 | B0 |
|------|----|----|----|----|----|----|----|----|
| PC1  | 1  | 1  | 1  | 0  |    |    |    |    |
| PC2  | PACK No. | | | | | | | |
| PC3  | USER DATA | | | | | | | |
| PC4  | | | | | | | | |
| PC5  | | | | | | | | |
| PC6  | | | | | | | | |
| PC7  | | | | | | | | |
| PC8  | PACK PARITY | | | | | | | |

FIG.61  PRIOR ART

Bit assignment of ID1 to ID7

| | Usage | Bitassignment |
|---|---|---|
| ID1 | Emphasis | $B_5, B_4$<br>0  0 : Off<br>0  1 : 50/15 μsec<br>1  0 : Reserved<br>1  1 : Reserved |
| ID2 | Sampling frequency | $B_7, B_6$<br>0  0 : 48 KHz<br>0  1 : 44.1 KHz<br>1  0 : 32 KHz<br>1  1 : Reserved |
| ID3 | Number of channel | $B_5, B_4$<br>0  0 : 2 channels<br>0  1 : 4 channels<br>1  0 : Reserved<br>1  1 : Reserved |
| ID4 | Quantization | $B_7, B_6$<br>0  0 : 16bits linear<br>0  1 : 12bits non liner<br>1  0 : Reserved<br>1  1 : Reserved |
| ID5 | Track pitch | $B_5, B_4$<br>0  0 : NORMAL track mode<br>0  1 : Wide track mode<br>1  0 : Reserved<br>1  1 : Reserved |
| ID6 | Digital copy | $B_7, B_6$<br>0  0 : Permitted<br>0  1 : Reserved<br>1  0 : Prohibited<br>1  1 : Reserved |
| ID7 | Pack | $B_5, B_4$<br>Pack Contents |

FIG.65  PRIOR ART

| PACK ITEM | CONTENTS | REMARKS |
|---|---|---|
| 0000 | No information | PC1 ~ PC8 All are "0" |
| 0001 | Program time | PNO, Index number and continuous time code with a Program |
| 0010 | Absolute time | PNO, Index number and continuous time code on a tape. |
| 0011 | Running time | PNO, Index number and continuous time code within one recording |
| 0100 | TOC | The Table of contents. |
| 0101 | Date | Year, Month Day. The day of the week Hour Minute Second. |
| 0110 | Catalog | The Catalog number of the Cassette. |
| 0111 | ISRC | The International Standard Recording Code. |
| 1000 | Reserved | |
| 1001 | Reserved | |
| 1010 | Reserved | |
| 1011 | Reserved | |
| 1100 | Reserved | |
| 1101 | Reserved | |
| 1110 | Reserved | |
| 1111 | Reserved | to be defind |

FIG. 66 PRIOR ART

| | B7 | B6 | B5 | B4 | B3 | B2 | B1 | B0 |
|---|---|---|---|---|---|---|---|---|
| PC1 | 0 | 0 | 0 | 1 | 0 | \multicolumn{3}{c|}{P-No. 1} |
| PC2 | \multicolumn{4}{c|}{P-No. 2} | \multicolumn{4}{c|}{P-No. 3} |
| PC3 | \multicolumn{8}{c|}{INDEX No.} |
| PC4 | \multicolumn{8}{c|}{HOUR} |
| PC5 | \multicolumn{8}{c|}{MINUTE} |
| PC6 | \multicolumn{8}{c|}{SECOND} |
| PC7 | \multicolumn{8}{c|}{FRAME No.} |
| PC8 | \multicolumn{8}{c|}{PACK PARITY} |

FIG. 67 PRIOR ART

| | B7 | B6 | B5 | B4 | B3 | B2 | B1 | B0 |
|---|---|---|---|---|---|---|---|---|
| PC1 | 0 | 0 | 1 | 1 | 0 | \multicolumn{3}{c|}{P-No. 1} |
| PC2 | \multicolumn{4}{c|}{P-No. 2} | \multicolumn{4}{c|}{P-No. 3} |
| PC3 | \multicolumn{8}{c|}{INDEX No.} |
| PC4 | \multicolumn{8}{c|}{HOUR} |
| PC5 | \multicolumn{8}{c|}{MINUTE} |
| PC6 | \multicolumn{8}{c|}{SECOND} |
| PC7 | \multicolumn{8}{c|}{FRAME No.} |
| PC8 | \multicolumn{8}{c|}{PACK PARITY} | a : USE OF CHANNEL STATUS BLOCK
b : IDENTIFY AUDIO/NON AUDIO MODE
c : EMPHASIS
d : SOURCE SAMPLING FREQUENCY LOCKED
e : SAMPLING FREQUENCY
f : CHANNEL MODE
g : USER BIT MANAGEMENT
h : USE OF AUX. SAMPLE BIT
i : SOURCE WORD LENGTH & HISTORY OF SOURCE ENCODING
j : FOR MULTI CHANNEL APPLICATION

FROM FIG. 72A

| | | |
|---|---|---|
| Minute Tens | 1 | 40 |
| | 2 | 41 |
| | 4 | 42 |
| | | 43 | Unassigned bit |
| | | 44 |
| | | 45 |
| | | 46 | User Group #6 |
| | | 47 |
| Hour Units | 1 | 48 |
| | 2 | 49 |
| | 4 | 50 |
| | 8 | 51 |
| | | 52 |
| | | 53 |
| | | 54 | User Group #7 |
| | | 55 |
| Hour Tens | 1 | 56 |
| | 2 | 57 |
| | | 58 | Unassigned bit |
| | | 59 | Unassigned bit |
| | | 60 |
| | | 61 |
| | | 62 | User Group #8 |
| | | 63 |
| | | 64 | 0 |
| | | 65 | 0 |
| | | 66 | 1 |
| | | 67 | 1 |
| | | 68 | 1 |
| | | 69 | 1 |
| | | 70 | 1 | Sync Word |
| | | 71 | 1 |
| | | 72 | 1 |
| | | 73 | 1 |
| | | 74 | 1 |
| | | 75 | 1 |
| | | 76 | 1 |
| | | 77 | 1 |
| | | 78 | 0 |
| | | 79 | 1 |

FIG.73      PRIOR ART

| SMPTE | NON DROP FRAME | 30 Hz |
|---|---|---|
| | DROP FRAME | 29.97 Hz |
| E B U | | 25 Hz |
| F I L M | | 24 Hz |
| D A T | | 33.3 Hz |

MAGNETIC RECORDING AND REPRODUCING APPARATUS AND METHOD OF RECORDING AND REPRODUCING

This application is a continuation of application Ser. No. 07/448,722 filed Dec. 11, 1989 now U.S. Pat. No. 5,097,364.

BACKGROUND OF THE INVENTION

1. Field of the Invention

The present invention relates to a magnetic recording and reproducing apparatus and to a method of recording and reproducing. More specifically, the present invention relates to a magnetic recording and reproducing apparatus such as a digital audio tape recorder (hereinafter referred to as DAT) having rotary heads and recording audio signals and the like on a magnetic tape by converting the audio signals into successive digital signals and reproducing the recorded digital signals, and to a method of recording and reproducing.

2. Description of the Background Art

A DAT is disclosed in, for example, "The Outline of DAT standardization", Journal of Institute of Electronics, Information and Communication Engineers of Japan, January, 1987.

FIG. 56 is a schematic block diagram showing a whole structure of such a conventional DAT. The structure of the DAT will be described with reference to FIG. 56. Analog audio signals of left and right channels are inputted to an analog signal input terminal 1, and the inputted analog audio signals are applied to a low pass filter (LPF) 2 to restrict the bandwidth of the signals. The analog audio signals whose bandwidth is restricted are applied to an analog/digital converting circuit (hereinafter referred to as an A/D converting circuit) 3 to be converted into digital audio signals. The digital audio signals are stored in a memory circuit 4. A coding circuit 5 is connected to the memory circuit 4. The coding circuit 5 generates codes for detecting or correcting errors of the digital audio signals stored in the memory circuit 4.

The digital audio signals read from the memory circuit 4 are applied to a modulating circuit 6 and modulated. The modulated digital audio signals are amplified by a recording amplifier 7 and applied to rotary heads 9 and 10 through a switching circuit 8 for switching between recording and reproducing. The rotary heads 9 and 10 are arranged on a rotary drum 11 having a diameter of 30 mm, and spaced from each other by 180 deg. A magnetic tape 12 is wound around the rotary drum 11 at the angle of 90 deg. The magnetic tape runs as a capstan (not shown) is rotated, and signals are recorded or reproduced by means of the rotary heads 9 and 10.

The digital signals reproduced by the rotary heads 9 and 10 are applied to a reproducing amplifier 13 through the switching circuit 8. The reproducing amplifier 13 amplifies the reproduced digital audio signals and applies the same to a demodulating circuit 14. The demodulating circuit 14 is used to demodulate the reproduced digital signals and applies the demodulated output to a memory circuit 15. A decoding circuit 16 is connected to the memory circuit 15. The decoding circuit 16 carries out error correction and error detection of the reproduced digital audio signals. The reproduced digital audio signals read from the memory circuit 15 are applied to a digital/analog converting circuit (hereinafter referred to as a D/A converting circuit) 17 to be converted into analog audio signals. The converted analog audio signals are outputted to analog signal output terminals 19 of left and right channels.

A drum motor 21 is provided for rotating the rotary drum 11 and a capstan motor 22 is provided for rotating the capstan (not shown). Drum motor 21 and the capstan motor 22 have their speed of rotation controlled by a servo circuit 20. A microcomputer for processing sub code signals (hereinafter referred to as a microcomputer) 23 is provided for processing sub code signals which are related to the main audio signals. In relation to the microcomputer 23, input keys 24 for setting input data or instructions and a display 25 for displaying the contents of the sub code signals outputted from the microcomputer 23 are provided.

The DAT further comprises a digital input terminal through which digital audio data (which will be described later) are inputted directly from external sources, and a digital output terminal 27 for directly outputting the digital audio data to external devices. The digital input terminal 26 and the digital output terminal 27 are connected to a digital interface circuit 28. A clock generating circuit 29 is further provided, which supplies clock signals necessary for respective circuits.

FIG. 57 schematically shows signals recorded on the magnetic tape 12 and FIG. 58 schematically shows signals recorded on 1 track.

A helical track pattern 30 is recorded on the magnetic tape 12 by the rotary head (9) shown in FIG. 56, and a helical track pattern 31 is recorded by the rotary head 10. Linear track patterns 32 and 33 are recorded on both ends of the magnetic tape 12. The helical track patterns 30 and 31 comprise, as shown in FIG. 58, a PCM signal area 36 on which the digital audio signals as main signals and testing signals for error correction are recorded, sub code signal areas 34 and 38 on which sub code signals related to the main signals are recorded, and servo signal areas 35 and 37 on which servo controlling signals are recorded. Areas for recording signals of a prescribed frequency are provided between respective areas and on both ends of the track, so that the helical track is constituted by a total of 196 blocks.

The head width of the two rotary heads 9 and 10 is about 20 $\mu$, and the azimuth angle between each other is 20 deg In normal recording and reproducing, the rotary drum 11 is rotated constantly at 2000 rpm and the tape running speed is 8.15 mm/sec. Consequently, the pitch of the helical tracks becomes 13.6 $\mu$. The helical track patterns 30 and 31 of FIG. 57 schematically show signals in the PCM signal area 36, which include a testing signal Q for error correction and sampled Odd data and Even data of the left and right channels L and R of stereo signals. When the error correction code is completed in 1 track, and interleaving of the audio signals is adapted to be completed in 2 tracks.

FIG. 59 shows a block format of the PCM signal area 36 shown in FIG. 58, and FIG. 60 show structures of ID codes stored in the PCM signal block shown in FIG. 59.

The block format of the PCM signal area 36 is described with reference to FIG. 59. In 1 block of the PCM signal area 36, a synchronization signal 39, an ID code 40, a block address 41 and a parity signal 42 for detecting errors in the ID code 40 and the block address 41 are recorded, each consisting of 8 bits. The block of the PCM signal area 36 further comprises an area 43 in which PCM data and a checking signal for error correction are recorded, which area 43 comprises 256 bits. Therefore, 1 block of the PCM signal area 36 comprises 288 bits. In the recording area of the ID code 40, important information such as the sampling frequency of the system is recorded.

The format of recording such information is described with reference to FIG. 60. As shown in FIG. 60, 4 PCM signal blocks are used for recording various ID codes. The 4 PCM signal blocks include frame addresses 44 consisting of 4 bits. In Format ID 45, "00" is recorded when digital audio signals are to be recorded. Important information such as the sampling frequency of the system is recorded in the data recording area in 2 bits in each of areas ID 1 to ID7.

FIG. 61 shows bit assignment of the ID1 to ID7 shown in FIG. 60. As shown in FIG. 61, the sampling frequency of the system is determined in accordance with the information of ID2. The DAT corresponds to three different sampling frequencies, that is, 48 kHz, 44.1 kHz and 32 kHz.

FIG. 62 shows a block format of the sub code signal areas 34 and 38 shown in FIG. 58. As shown in FIG. 62, in 1 block of the sub code signal area, a synchronization signal 46, SUB ID code 47, a parity signal 48 for detecting errors in the SUB ID code 47, sub code data and a checking signal 49 for error correction are recorded. The areas of the synchronization signal 46 to the parity signal 48 consist of 32 bits, and the area in which the sub code data and the checking signal 49 for error correction are recorded consist of 256 bits. Therefore, the block of the sub code signal areas 34 and 38 comprises 288 bits, as is the case of the PCM signal area 36.

In the sub code signal areas 34 and 38 program start signals (signal indicative of the starting point of program), are recorded and program number information, time information and so on related to the audio signals are recorded in the PCM signal area 36.

FIG. 63 shows a signal format in which the program start signal, program number information and the like are recorded. In FIG. 63, the synchronization signal 46, the SUB ID code 47, the parity signal 48, the sub code data and the checking signal 49 for error correction are the same as those shown in FIG. 62, so that the description thereof is not repeated. Various sub code signals are recorded using 2 blocks of the sub code signal areas 34 and 38. In an area 50, a control ID is recorded, in which the program start signal (defined as a start ID signal) and the like are recorded. In an area 51, a data ID is recorded, and when digital audio signals are to be recorded, "0000" is recorded. In an area 52, a pack ID is recorded which shows the number of packs (which will be described in detail later) recorded on the sub data recording area 49. In an area 53, the program number information is recorded. In an area 54, block addresses of the sub code signal areas 34 and 38 are recorded. The area 55 is called a pack, constituted by 64 bits, in which pack time information and the like are recorded. A checking signal for error correction is recorded in an area 56. The positions of various sub code signals recorded in the areas 50 to 56 are determined as shown in FIG. 63, and the sub code signal areas 34 and 38 have the signal recording format completed in 2 blocks.

FIG. 64 shows a pack format of the sub code signals and FIG. 65 shows PACK ITEM and the contents thereof.

As shown in FIG. 64, the format of the pack 55 includes a PACK ITEM recording area 57 showing the contents of the data stored in the pack, a PACK DATA recording area 58, and an area 59 in which parity signals for detecting errors in the contents of the PACK ITEM recording area 57 and in the PACK DATA recording area 58 are recorded.

As shown in FIG. 65, the content of the data stored in the pack is determined corresponding to the PACK ITEM. One example of the information stored in the pack is shown in FIGS. 66 and 67. In FIG. 66, the PACK ITEM 57 is "0001", which content is Program Time. In the example shown in FIG. 67, the PACK ITEM 57 is "0011", which is the Running Time recording format, as is apparent from FIG. 65. B3 of PC=1 is set to 0. In the examples of the pack format shown in FIGS. 66 and 67, the program number, index number, hour, minutes, second and frame number are recorded as pack data. As shown in FIGS. 66 and 67, an area for recording the program number is also provided in the pack.

FIG. 68 shows timing relation between recording and reproducing of audio signals and sub code signals.

The operation of a conventional DAT will be described with reference to FIGS. 56 and 68. In FIG. 56, the analog audio signals of 2 channels, that is, the left and right channels, inputted to the analog signal input terminal 1 have their frequency bandwidth restricted by the low pass filter 2, and the audio signals are applied to the A/D converting circuit 3 to be converted into digital audio signals $WL_n$, $WR_n$ ($n=0, 1, 2 \ldots$). The reference character n shows the order of sampling. The signals of the left and right channels are sampled alternately to be successively outputted as $WL_0$, $WR_0$, $WL_1$, ... and temporarily stored in the memory circuit 4. The samples are read from memory circuit 4 in accordance with an order as needed to be applied to the coding circuit 5. The coding circuit 5 adds error correcting codes and error detecting codes to the read samples and writes the same in the memory circuit 4.

When the sub code is designated by the input key 24, the designated sub code signal is generated by the microcomputer 23 and is applied to the memory circuit 4 to be temporarily stored therein. The sub code signals are also read in accordance with a prescribed order to be applied to the coding circuit 5, to which the error correcting codes and error detecting codes are added, and the resulting signals are again written in the memory circuit 4. The microcomputer 23 applies the contents of the sub code signals to be recorded to the display apparatus 25 so as to display the same.

The data written in the memory circuit 4 are applied to the modulating circuit 6 which converts the data into a series of signals suitable for recording on the magnetic tape 12, and the signals are amplified by the recording amplifier 7. Thereafter, they are recorded on the magnetic tape 12 by means of the two rotary heads 9 and 10, through the switching circuit 8. In actual use, the memory circuit 4 is divided into two groups. While sampling of digital audio signals and writing of sub code signals are carried out in one group, coding and reading are carried out in the other group. The manner of operation is disclosed in the timing diagram of FIG. 68.

As described above, the magnetic tape 12 is wound around the rotary drum 11 through an arc of 90 deg, and the recording and reproducing are carried out by two rotary heads 9 and 10. Therefore, in the recording and reproducing waveforms, the signal recording and reproducing section of a 90 deg arc of rotation each and the interval sections of 90 deg arcs of rotation each exist alternately, as shown in FIG. 68 (62). The signal recording and reproducing section of a 90 deg arc of rotation corresponds to the recording and reproduction of 1 scanning. As shown in FIG. 68 (60), samples of the digital audio signals at the period Tn are written in one group of the memory circuit 4 in the period Tn WT, so that samples of two scannings are stored. Thereafter, in the first $\frac{1}{4}$ ($T_n$ EN$_1$ period of FIG. 68) at the beginning of the period Tn+a single, signals of 1 scanning are encoded, and they are read in the succeeding period $T_n$RD$_1$. The remaining signals of a single scanning are encoded in the period $T_n$EN$_2$ and read in the period $T_n$ RD$_2$. Namely, the digital audio signals sampled in the period $T_n$ are recorded on the magnetic tape 12 delayed by a 360 deg (corresponding to one rotation of the rotary drum 11).

As shown in FIG. 68 (61), the sub code signals outputted from the microcomputer 23 in the Period $T_m$ (former half of the period $T_n$) are written in the memory circuit 4 in the period $T_m$ WT, encoded in the succeeding period $T_m$ EN, and read in the period $T_m$ RD. Namely, the sub codes signals recorded on the magnetic tape 12 are delayed by 180 deg (corresponding to $\frac{1}{2}$ rotation of the rotary drum). Referring to the recording and reproducing signals shown in FIG. 68(62), the reference character Tn in the numerator part of the fraction shows that audio signals of the period $T_n$ are included, and the reference character $T_m$ in the denominator part shows that the sub code signals of the period $T_m$ are included.

In reproduction, the switching circuit 8 is switched to the reproducing side, and the signals are reproduced from the magnetic tape 12 by means of the rotary heads 9 and 10 and applied to the reproducing amplifier 13. The reproducing amplifier 13 amplifies the applied signals and applies the same to the servo circuit 20 and to the demodulating circuit 14. The servo circuit 20 generates a tracking error signal based on the servo controlling signal recorded on the servo signal areas 35 and 37 to control the speed of rotation of the capstan motor 22 so as to enable accurate tracking. The demodulating circuit 14 demodulates the reproduced signals to the original base band signals which are successively stored in the memory circuit 15.

The digital signals stored in the memory circuit 15 are read in an order as needed to be applied to the decoding circuit 16, in which correction, detection and compensation of errors are carried out by the decoding of the error correcting codes. Then the signals are again written in the memory circuit 15. The samples of the digital audio signals with error corrected and compensated are outputted to the D/A converting circuit 17 or to the digital interface circuit 28. The D/A converting circuit 17 converts the digital audio signals into the original analog audio signals. The analog audio signals have any unnecessary frequency components removed by the low pass filter 18, and the analog audio signals of the left and right channels are outputted from respective analog signal output terminals 19.

The digital interface circuit 28 converts the samples with errors corrected and compensated into prescribed formats to output the same from the digital output terminal 27.

The contents of the demodulated sub code signals are displayed on the displaying apparatus 25 by the microcomputer 23. As is the memory circuit 4, the memory circuit 15 is divided into two groups in actual use. Writing and decoding are carried out in one group, and reading is carried out in the other group. The manner of operation is shown in FIG. 68 (62) to (64). As shown in FIG. 68 (63), the samples of the first scanning of the audio signals in the period $T_{n-1}$ of the reproduced signals are written in the memory circuit 15 temporarily in the period $T_{n-1}$WT$_1$, and decoded in the pause interval period of a 90 deg arc of rotation represented as $T_{n-1}$DE$_1$ to be stored again in the memory circuit 15. Thereafter, in the period $T_{n-1}$WT$_2$, the remaining 1 scan samples are written in the memory circuit 15, and they are decoded in the next period $T_{n-1}$DE$_2$ to be stored in the memory circuit 15. The stored samples of 2 scannings are read from the memory circuit 15 in the succeeding period $T_{n-1}$RD to be applied to the D/A converting circuit 17 or to the digital interface circuit 28. The samples of the reproduced digital audio signals are outputted to extend devices with a delay of 360 deg arc of rotation.

As shown in FIG. 68 (64), the sub code signals in the period $T_{m-1}$ of the reproduced signals are written in the memory circuit 15 in the period $T_{m-1}$ WT, and decoded in the period $T_{m-1}$DE to be again stored in the memory circuit 15. Thereafter, the sub code signals are read from the memory circuit 15 in the period $T_{m-1}$RD to be applied to the microcomputer 23. Therefore, the contents of the reproduced sub code signals are displayed on the displaying apparatus 25 delayed by a 180 deg arc of rotation.

Now, the digital data inputted to the digital input terminal 26 shown in FIG. 56 are determined as the digital audio interface format by the standard CP-340 of the Electronic Industries Association of Japan or by the IEC (International Electrotechnical Commission) standard IEC958. Such a format will be described in the following.

FIG. 69 shows signal structure of a sub frame of the digital audio interface format, FIG. 70 shows a format for transmitting signals of 2 channels, and FIG. 71 shows a channel status data format for professional use.

Referring to FIG. 69, 1 word of audio signals is transmitted as a sub frame having 32 bits. The sub frame comprises a synchronizing preamble 101, a auxiliary signal 102, an audio signal 103, a validity flag (V) 104 indicative of the reliability of the audio signal 103, a user data bit (U) 105, a channel status bit (C) 106 and a parity bit (P) 107.

When the sub frame such as shown in FIG. 69 is to be transmitted as the signals of 2 channels, a single frame is formed by two sub frames, that is, the channel 1 and the channel 2, as shown in FIG. 70, and a single block is formed by 192 frames. In order to identify the starting point and the channels of each block, three different synchronizing preambles B, M and W are used. The synchronizing preamble B is used for the sub frame channel 1 at the head of the block. The synchronizing preamble M is used for the sub frame of the remaining channel 1. The synchronizing preamble W is used for all the sub frames of the channel 2. 1 block of the channel status data is formed of 192 channel status bits 106. The first bit of each block is transmitted in a frame which starts with the synchronizing preamble B.

The block format of the channel status data for professional use is structured as shown in FIG. 71. This format further includes information having close relation to the audio parameters such as emphasis, sampling frequency and the like, time information such as time-of-day code and local sample address code. Two pieces of different time information are the time information of the audio data transmitted by a frame starting with the synchronizing preamble "B" as shown in FIG. 70. Highly accurate editing sample basis by sample is enabled, as the information have the same level of accuracy as the sample.

The signals of the above described format are applied to the digital interface circuit 28 through the digital input terminal 26 shown in FIG. 56. The digital interface circuit 28 extracts the audio data and the channel status data from the inputted signals to output the same. The outputted audio data are applied to the memory circuit 4. The same processing as in the recording of the analog input signals described above are carried out, and the data are recorded on the magnetic tape 12. Important information such as emphasis of the channel status data, the sampling frequency and the like are applied to the microcomputer 23 to be stored in the PCM ID of the DAT. At the same time, the digital interface circuit 28 controls the clock generating circuit 29 to generate synchronized clock signals, in order to accurately input the external digital data.

The conventional DAT operates as described above to record and to reproduce digital audio signals. However, connections to other AV equipment such as video tape recorders other than the DAT have not been considered. It is especially difficult to operate the DAT for professional use in synchronization with other AV equipments for professional use such as VTRs.

Generally, in editing video tapes or the like, it is essential to recognize the position of the edited tape. Especially in electronic editing, handling of the edited tape position is the important problem in driving the system. For this purpose, recording and utilization of time codes such as second address or frame address on the cue track as position information on the tape have been proposed and determined as IEC standard: IEC 461.

FIG. 72 shows the frame format of the standard SMPTE/EBU/Film time code, and FIG. 73 shows frame frequencies of various time code signals and of the DAT.

The SMPTE/EBU/Film time code is described with reference to FIG. 72. The time code is mainly used for the television system, and hour, minutes, second and frame are assigned to the respective television frames. The time code comprises 80 bits per each frame, the value of each of the hour, minute, second and frame of the time code is represented in the decimal notation, the first digit and the 2nd digit of each value are separately converted into binary coded decimal code to be altered to the respective bits.

In the SMPTE time code, the frame value are numbered from 00 frame to 29 frame. The frame frequency is 30 Hz and 29.97 Hz as shown in FIG. 73. A drop frame mode and a non drop frame mode are prepared for respective frequencies. The frame frequencies of the EBU time code and of the Film time code are 25 Hz and 24 Hz, respectively, and the frame value are numbered from 00 frame to 24 frame and from 00 frame to 23 frame, respectively.

As shown in FIG. 73, the frame frequencies of the SMPTE/EBU/Film time code are different from the frame frequency of the DAT. Therefore, it is difficult to record the SMPTE/EBU/Film time code directly on the magnetic tape 12 by means of the rotary heads of the DAT.

In order to solve such a problem, direct recording and reproducing of the time code by using a stationary head on the linear track 32 or 33 shown in FIG. 57 has been proposed. However, if a stationary head is provided in the tape transport mechanism, the structure becomes complicated, and it becomes necessary to accurately maintain the positional relation between the rotary head 12 and the stationary head. The linear tracks 32 and 33 are positioned on both ends of the magnetic tape 12, so that they are easily damaged, reducing the reliability of the time code data. As described above, the tape running speed is as slow as 8.15 mm/sec, so that the recording and reproducing of the signals are difficult. Now, one of the features of DAT is a high speed searching function using the sub code signals, the speed of which is more than 200 times normal speed. However, when the tape running speed is increased, the time code recorded on the linear tracks 32 and 33 cannot provide the signals, and therefore high speed search by the time code becomes impossible.

In addition, as described above, information having close relation to the audio signals such as emphasis sampling frequency and the like as well as time information such as local sample address code and time-of-day code are included in the channel status data for professional use transmitted by the digital audio interface format. Synchronized operation with other AV equipment for professional use and electronic editing can be carried out by using that information. However, in the conventional DAT shown in FIG. 56, recording of alphanumeric data, local sample address code or the time-of-day code transmitted as part of the channel status data has not been taken into consideration.

SUMMARY OF THE INVENTION

Therefore, a first object of the present invention is to provide a magnetic recording and reproducing apparatus capable of readily carrying out recording and reproducing of time codes. This is accomplished by setting rules for conversion for recording and reproducing time codes on and from the sub code signal areas of the helical track by means of the rotary heads, even if the frame frequencies are different. A method of recording and reproducing thereof is also provided.

A second object of the present invention is to provide a magnetic recording and reproducing apparatus and method of recording and reproducing therefor, in which the channel status data transmitted in the digital audio interface format are recorded and reproduced to enable synchronized operation with other AV equipments for professional use and to enable electronic edition.

Briefly stated, the present invention is a magnetic tape recording and reproducing apparatus in which inputted main signals are divided at every unit time, the divided main signals are signal processed as a single frame data to be recorded on a prescribed area of a magnetic tape, sub signals are recorded on an area different from the area of the main signals on the magnetic tape, and the recorded main signals and sub signals are reproduced. When time code signals having a frame period different from that of the main signals are inputted, first time information included in the time code signals and information other than the time information are extracted. Phase difference between the point of change between frames of the main signals and the point of change between the frames of the time code signals is detected by clock signals having the same frequency as the sampling frequency of the main signals. In recording, a second time information having a unit time as a minimum unit is extracted in response to the extracted first time information and to the detected phase difference information. An initial phase difference information between the head of the frame serving as the reference for the time code signals and the head of the frame of the main signals, at which the frame serving as the reference for the time code signal is positioned, is calculated. The calculated second time information, the initial phase difference information, information other than the extracted time information and frequency identifying information indicative of the frequency of the clock signals used for detecting the phase difference information are recorded in the sub signal recording area. In reproduction, the second time information, the initial phase difference information, information other than the time information and the frequency identifying information recorded in the sub signal recording areas are reproduced. The first time information and the phase difference information are calculated in response to the second time information and the initial phase difference information. Series of data of a prescribed transmission format of the time code signals are composed in response to the calculated first time information and to the reproduced information other than the time information, and a series of data of the time code signals composed are outputted in response to the calculated phase difference information.

In accordance with the present invention, the time information included in the time code signals having different frame period from the main and sub signals may be recorded and reproduced, together with the phase difference information, on the sub signal recording areas of a magnetic tape. Therefore, when the present invention is applied to a digital audio tape recorder, for example, a high speed searching function can be fully utilized, and lock-in time for driving the digital audio tape recorder with audio and visual equipments for professional use can be reduced.

In another aspect, a sub frame including at least 1 word of second main signals and 1 bit of auxiliary data is treated as a unit of transmission, n sub frames form one block, the auxiliary data form at least one information block by block, and a series of digital signals are transmitted in a format including address information corresponding to the second main signals transmitted by the sub frames to which the head bit of the auxiliary data word is transmitted. The second main signals and the auxiliary data are extracted from the series of digital signals. A phase difference between the point of change of the first main signal frames and the point of change of the blocks of the series of digital signals positioned at the head of the frame of the main signal is detected. In recording, second address information corresponding to the first word of the frame is calculated based on the detected phase difference information and on the first address information transmitted in a block of the series of digital signals positioned at the head of the frame of the first main signal. Time information using the unit time as the minimum unit and the fraction smaller than a unit time are calculated from the second address information, and the calculated time information and the fraction number are recorded in a sub signal recording area. In reproduction, the time information and the fraction number recorded in the sub signal recording area are reproduced, the second address information is calculated based on the time information and the fraction number, and the calculated second address information and the first main signals are outputted as the series of digital signals.

Therefore, in accordance with this aspect of the present invention, second address information is calculated from the second main signals extracted from the series of digital signals, the detected phase difference information and on the first address information, and the time information and the fraction number can be calculated from the address information to be recorded o reproduced to and from the magnetic tape.

In accordance with a further aspect of the present invention, time code signals having frame period different from that of the main signals are inputted, and the first time information and other information included in the time code signals are extracted. A phase difference between the point of change of the frames of the main signals and the point of change of the frames of the time code signals is detected by clock signals having the same frequency as the sampling frequency of the main signals. In recording, second time information using the unit time as the minimum unit is calculated based on the extracted first time information and the detected phase difference information, and initial phase difference information between the head of the frame serving us a reference for the time code signals and the head of the frame of the main signal, at which the frame serving as the reference for the time code signal is positioned, is calculated. The calculated second time information, the initial phase difference information, extracted information other than the time information, and the frequency identifying information indicative of the frequency of the clock signals used for detecting the phase difference information are recorded in sub signal recording areas of the magnetic tape. In reproduction, such information is reproduced, the first time information and the phase difference information are calculated based on the reproduced second time information and on the initial phase difference information, a series of data of the prescribed transmission format of the time code signals are formed based on the information, and the series of data of the time code signals are outputted in response to the calculated phase difference information.

Therefore, in accordance with the present invention, since phase difference information is detected by using clock signals having the same frequency as the sampling frequency of the main signals, the phase difference information can be made equal to the number of samples, whereby accuracy in sample unit which is essential in recording time code can be assured, enabling synchronized operation and editing on a sample by sample basis.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4, 5 and 6 show examples of recording formats of sub code packs used in the first embodiment of the present invention.

FIGS. 8 and 9 show examples of recording formats of sub code packs used in the second embodiment of the present invention.

FIGS. 10 and 11 show examples of recording formats of the sub code packs used in the third embodiment of the present invention.

FIG. 13 shows an example of a recording format of a sub code pack used in the fourth embodiment of the present invention.

FIGS. 16 to 21 show examples of recording formats of sub code packs used in the fifth embodiment of the present invention.

FIGS. 22 to 25 show examples of recording formats of the sub code packs in which channel status data are further divided byte by byte.

FIG. 26 is a schematic block diagram of an apparatus for realizing a sixth embodiment.

FIGS. 28 and 29 show examples of recording formats of sub code packs used in the sixth embodiment.

FIGS. 30 and 31 show other examples of pack formats for recording the time-of-day code.

FIGS. 32 and 33 show other examples of pack formats for recording local sample address codes.

FIGS. 35 to 38 show examples of recording formats of packs for recording all alphanumeric channel origin data and alphanumeric channel destination data.

FIG. 39 shows an example of a pack format for recording information related to the time.

FIGS. 40 to 44 show examples of pack formats for recording information other than the time information.

FIG. 47 shows a relation between the frame frequency and the sampling frequency.

FIG. 48 shows number of samples in each frame of the SMPTE/EBU/Film time code frame at respective sampling frequency.

FIG. 55 shows a pack format in which PC3 to PC7 are used as user data recording areas.

FIG. 61 shows bit assignment of ID1 to ID7 shown in FIG. 60;.

FIG. 65 shows PACK ITEM and the contents therein.

FIGS. 66 and 67 show pack formats for recording program time and running time.

FIG. 72A and 72B show standardized SMPTE/EBU/Film Time code frame format.

FIG. 73 shows various time code signals and DAT frame frequency.

DESCRIPTION OF THE PREFERRED EMBODIMENTS

Figure 1:
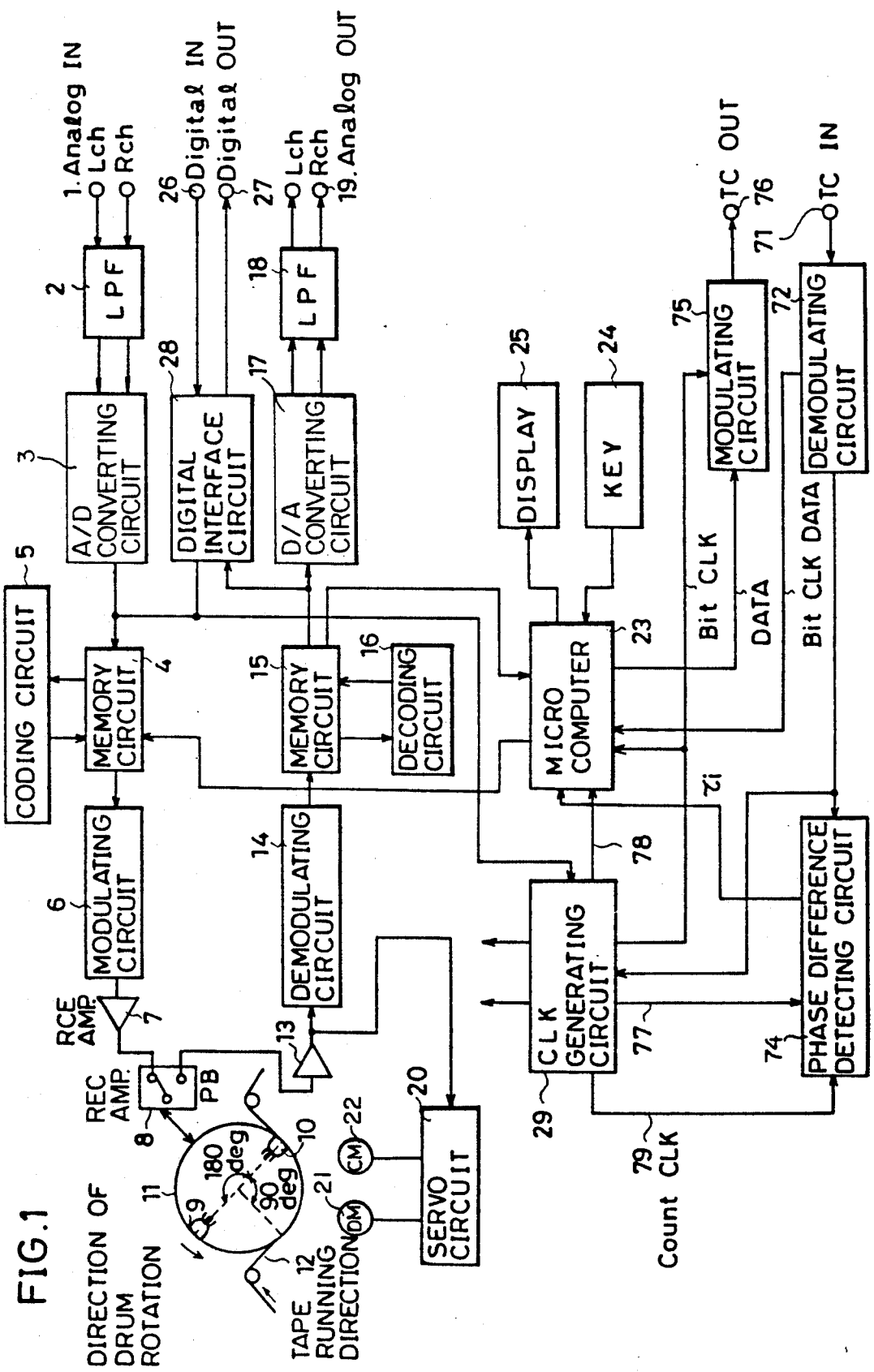
FIG. 1 is a schematic block diagram of a first embodiment of the present invention.
Figure 56:
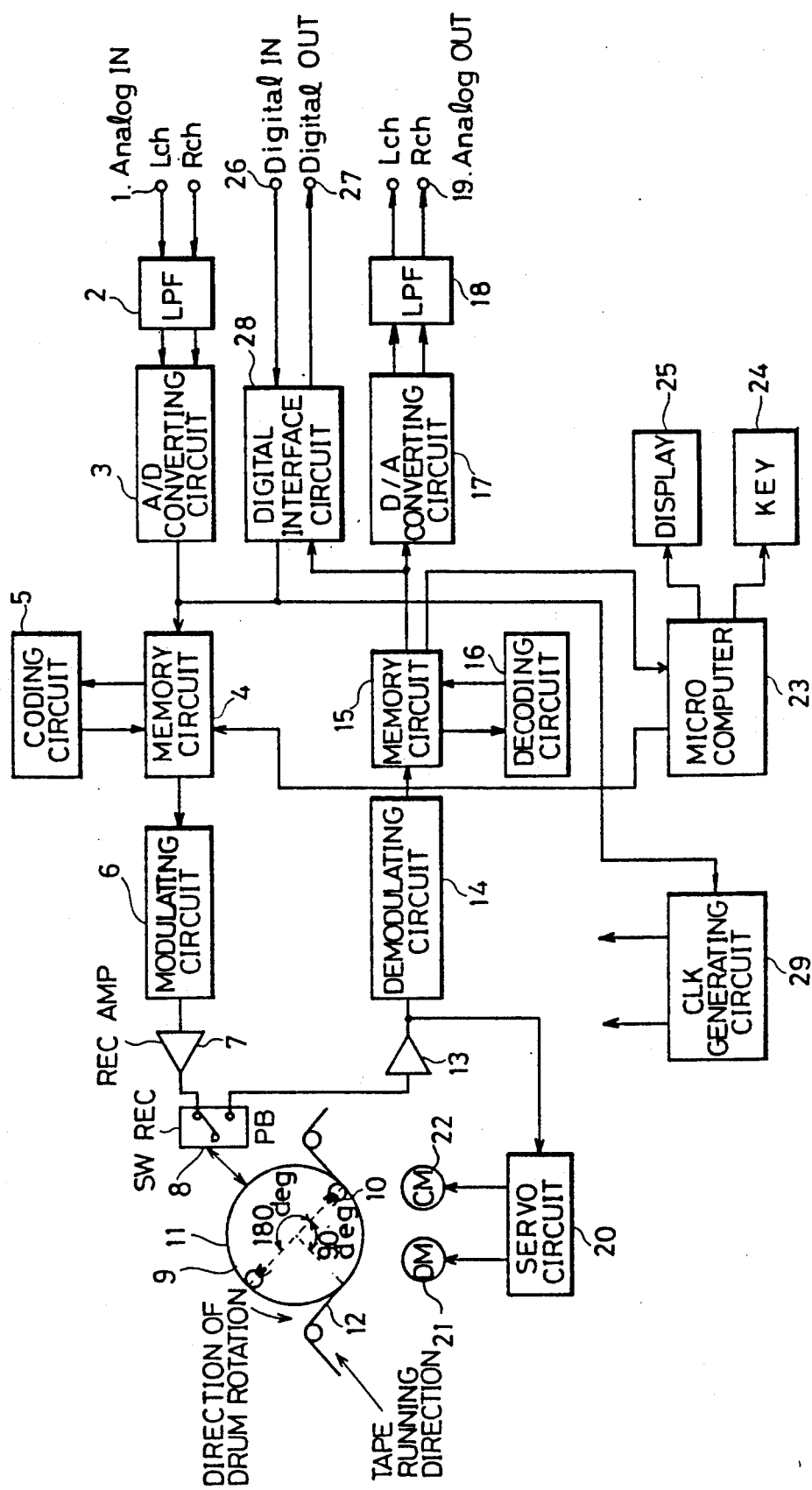
FIG. 56 is a schematic block diagram showing a whole structure of a conventional DAT.
Figure 57:
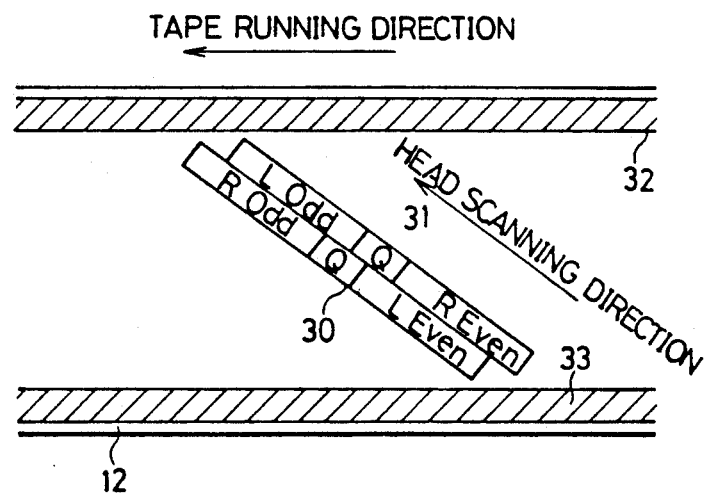
FIG. 57 schematically shows signals recorded on the magnetic tape.
Figure 58:
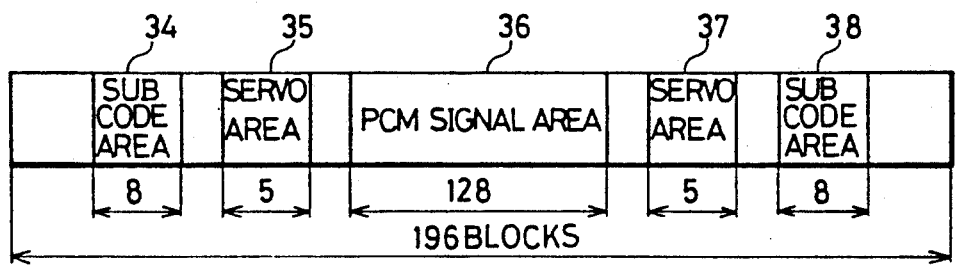
FIG. 58 schematically shows signals recorded on 1 track.
Figures 59, 60:
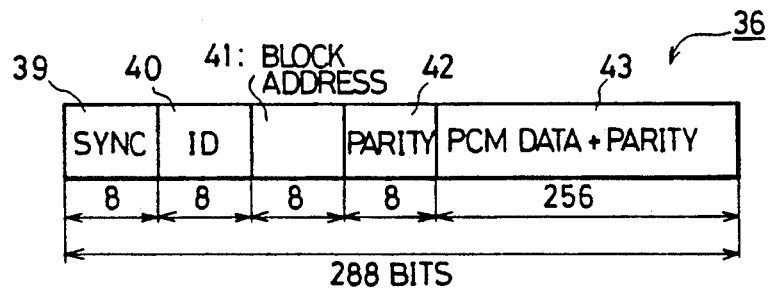
FIG. 59 shows a block format of the PCM signal area shown in FIG. 58.
FIG. 60 shows a structure of an ID code stored in the PCM signal block shown in FIG. 59.
Figure 62:
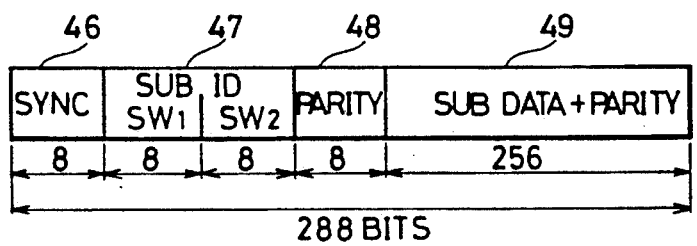
FIG. 62 shows a block format of the sub code area shown in FIG. 58.
Figure 63:
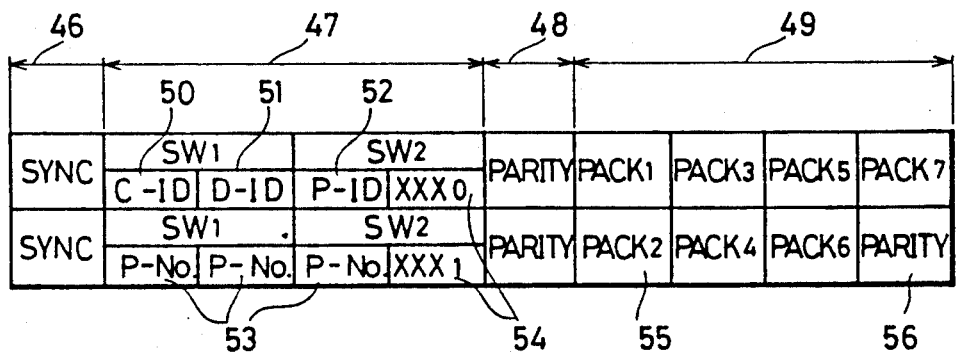
FIG. 63 shows a recording format of the sub code signals recorded in the sub code signal area.

FIG. 1 is a schematic block diagram of a first embodiment of the present invention. The DAT shown in FIG. 1 has the following components added to the conventional DAT shown in FIG. 56. Namely, a time code signal is inputted from outside to a TC signal input terminal 71. The time code signal is applied to the demodulating circuit 72 to be demodulated, and a frame clock signal 73, a bit clock signal and time code data are extracted therefrom. The extracted frame clock signal 73 are applied to a phase difference detecting circuit 74. The bit clock signal and the time code data extracted by the demodulating circuit 72 are applied to the microcomputer 23.

Although not shown, a phase difference detecting circuit 74 comprises a counter circuit and a latch circuit, receives a reference signal 77 for recording and a count clock outputted from the clock generating circuit 29, and detects phase difference between the reference signal 77 and the frame clock signal 73. The phase difference $\tau_i$ detected by the phase difference detecting circuit 74 is applied to the microcomputer 23. A base band time code signal is applied from the microcomputer 23 to the modulating circuit 75, so that the time code signal is modulated. The modulated time code signal is outputted to the outside from the TC signal output terminal 76.

Figure 2:
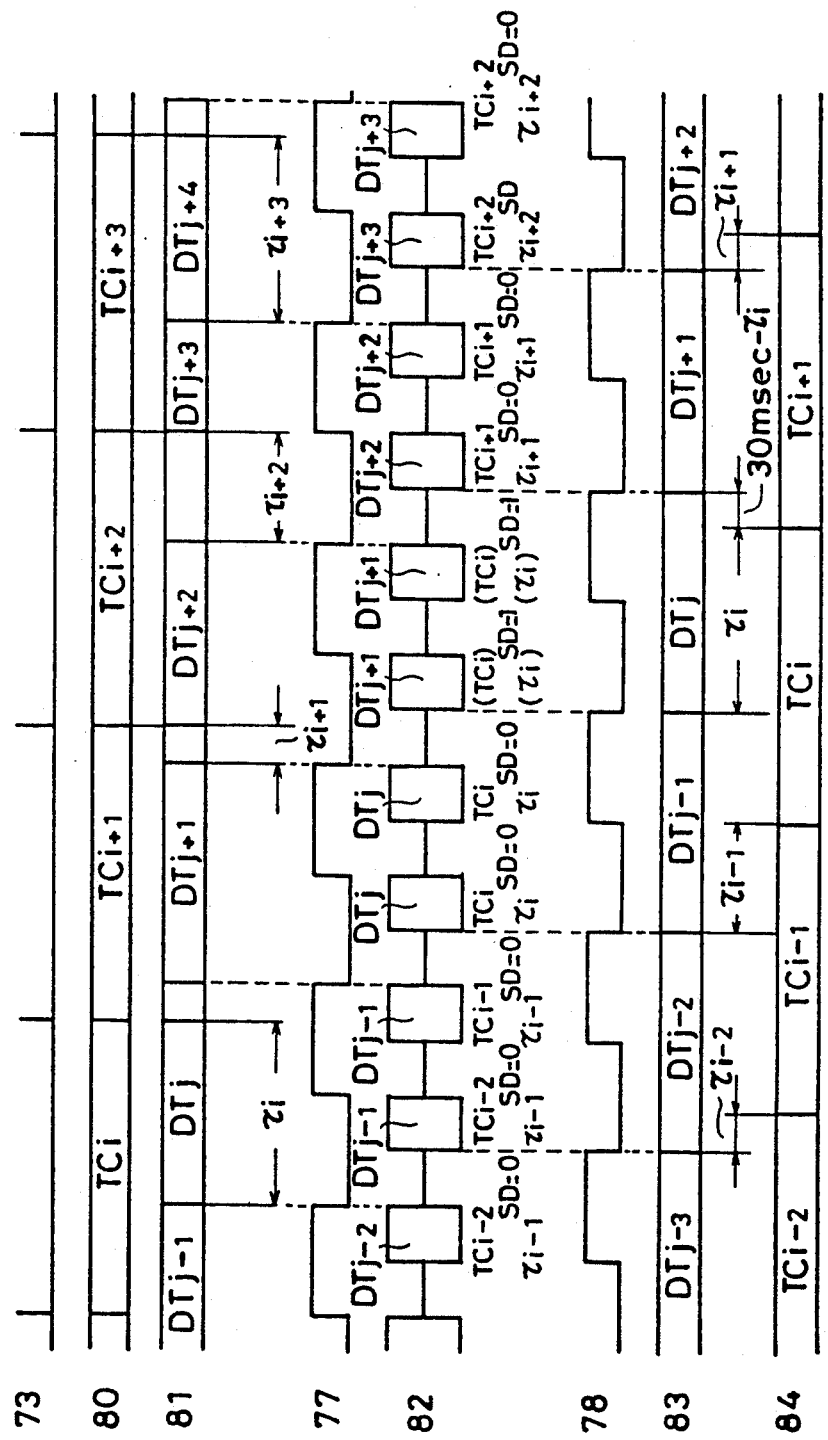
FIG. 2 is a timing diagram showing operation of the first embodiment of the present invention.
Figure 3B:
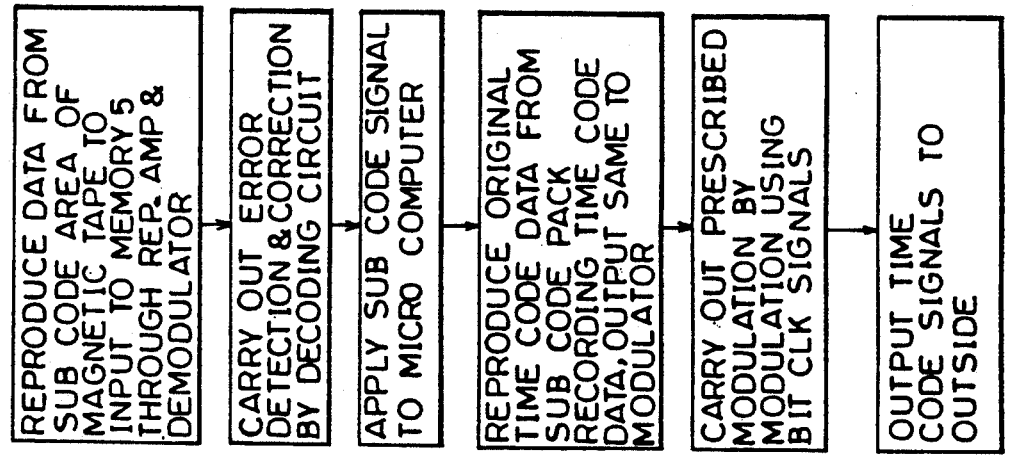
FIGS. 3A and 3B are flow charts showing the operation of the first embodiment of the present invention.
Figure 3A:
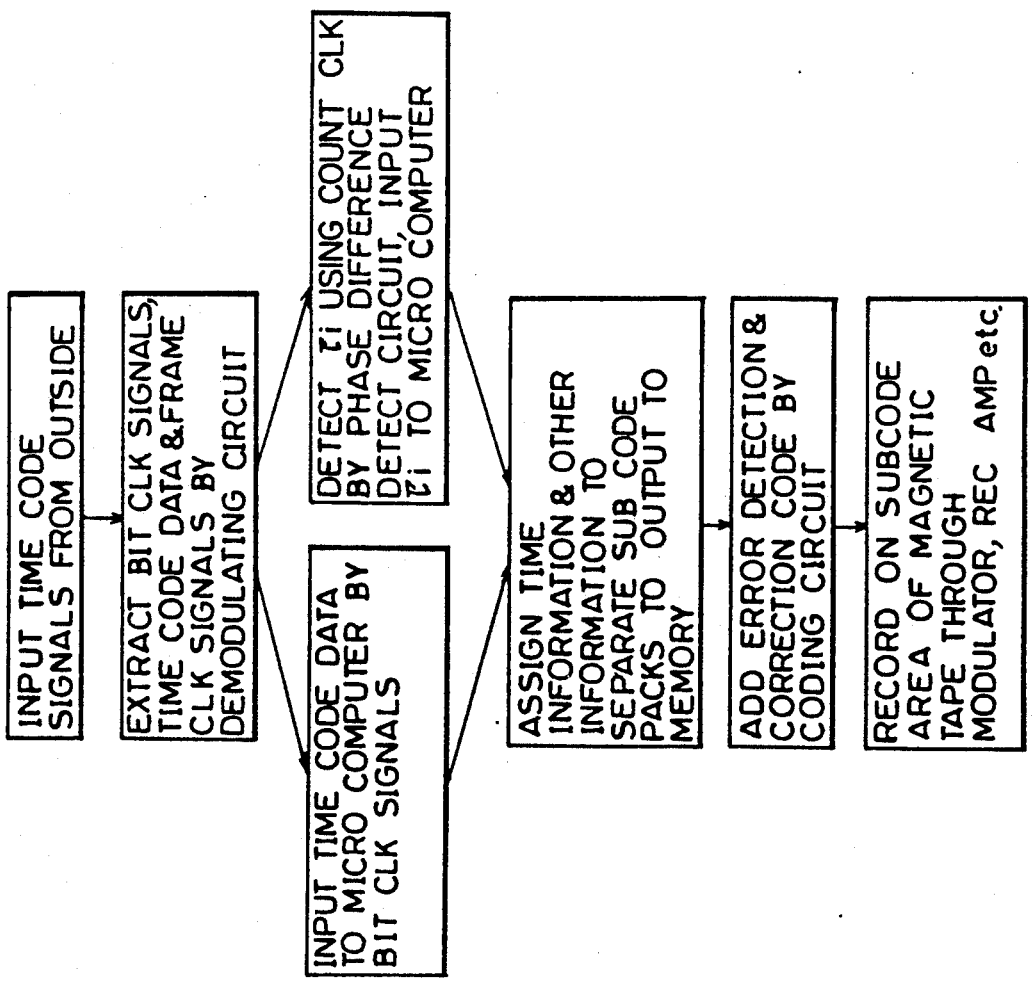

FIG. 2 is a timing diagram showing operation of the first embodiment of the present invention and FIGS. 3A and 3B are flow charts thereof.

Specific operation of the first embodiment of the present invention is described with reference to FIGS. 1 to 3B. Referring to FIG. 2, the time code signal 80 as shown in FIG. 2 is inputted from the TC signal input terminal 71. The reference characters $TC_i$, $TC_{i+1}$ ... of the time code signal 80 represent numbers of the time code signals 80 frame by frame. In recording, the inputted time code signal 80 is demodulated by the demodulating circuit 72, and the frame clock signal 73, the bit clock signal and time code data are extracted therefrom. The frame clock signal 73 is applied to the clock generating circuit 29 and to the phase difference detecting circuit 74. The bit clock signal and the time code data are applied to the microcomputer 23. The microcomputer 23 takes the time code data in response to the bit clock signal. The reference characters $DT_j$, $DT_{j+1}$ ... of the inputted audio signals 81 shown in FIG. 2 represent numbers of the DAT frames divided by the reference signals 77 for recording outputted from the clock generating circuit 29. The phase difference detecting circuit 74 resets a counter circuit contained therein at the falling edge of the reference signal 77 for recording, and immediately thereafter counts up the counter circuit by the count clock signal 79, and at the rise of the frame clock signal 73 of the succeeding time code signal, the counted value of the counter circuit is latched by a latch circuit contained therein. The counted value latched by the latch circuit is immediately applied to the microcomputer 23 as the phase difference information $\tau_i$ ... from the point of change of the DAT frame (falling edge of the reference signal 77 for recording) to the point of change of the time code frame (rising edge of the frame clock signal 73). The microcomputer 23 assigns the inputted time code data and the phase difference information $\tau_i$ to a sub code pack to apply the same to the memory circuit 4.

Figure 64:
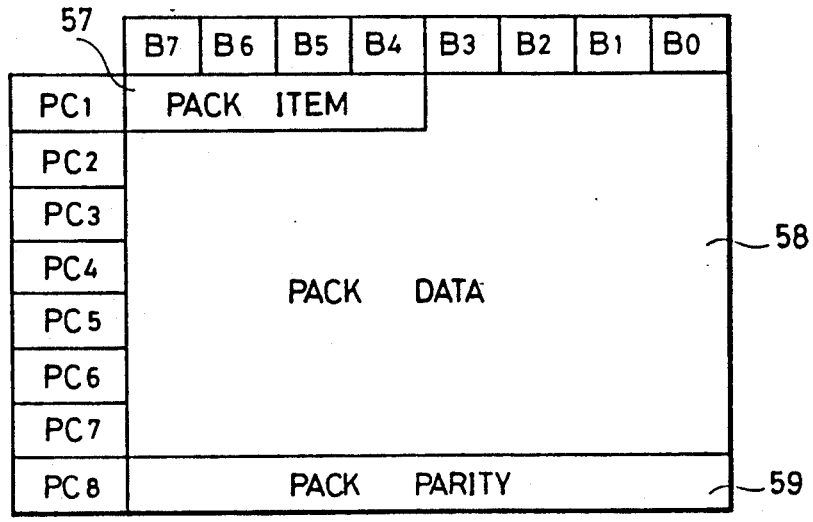
FIG. 64 shows a pack format of the sub code signals.
Figure 68:
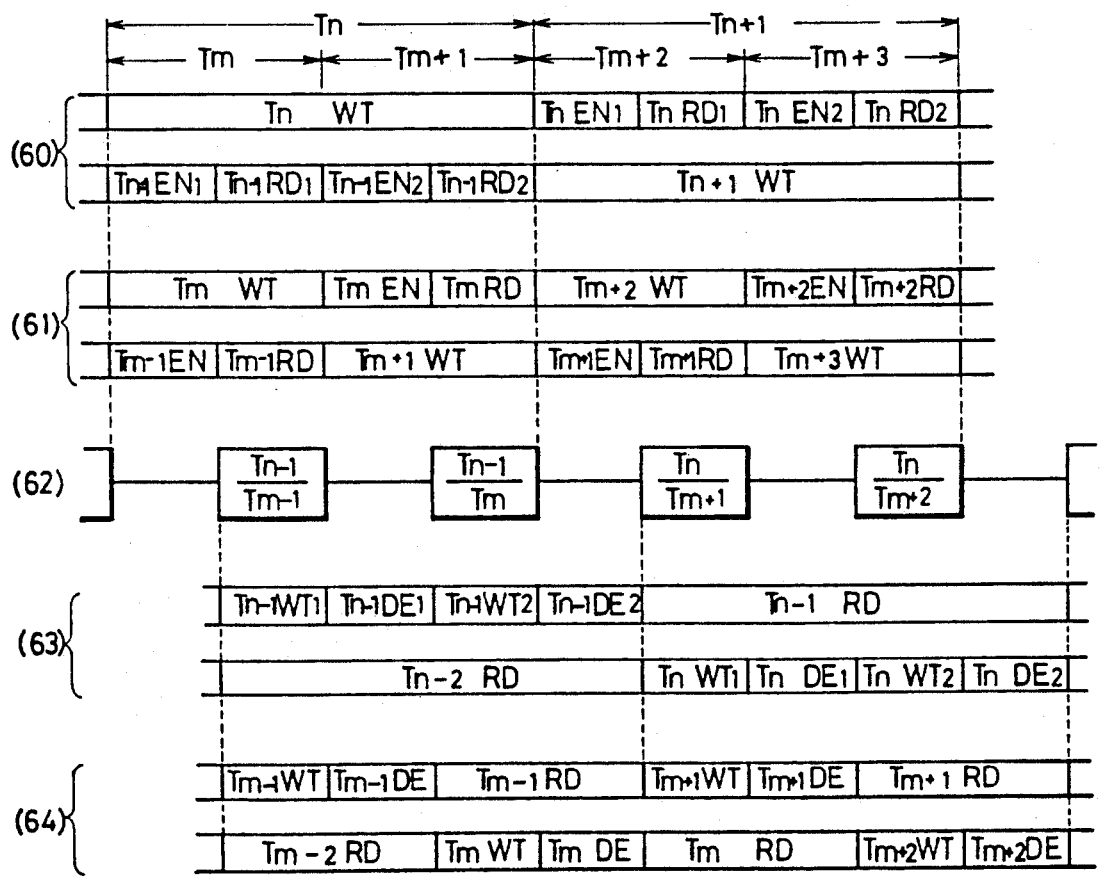
FIG. 68 shows timing relation between recording and reproducing of audio signals and the sub code signals.
Figure 69:
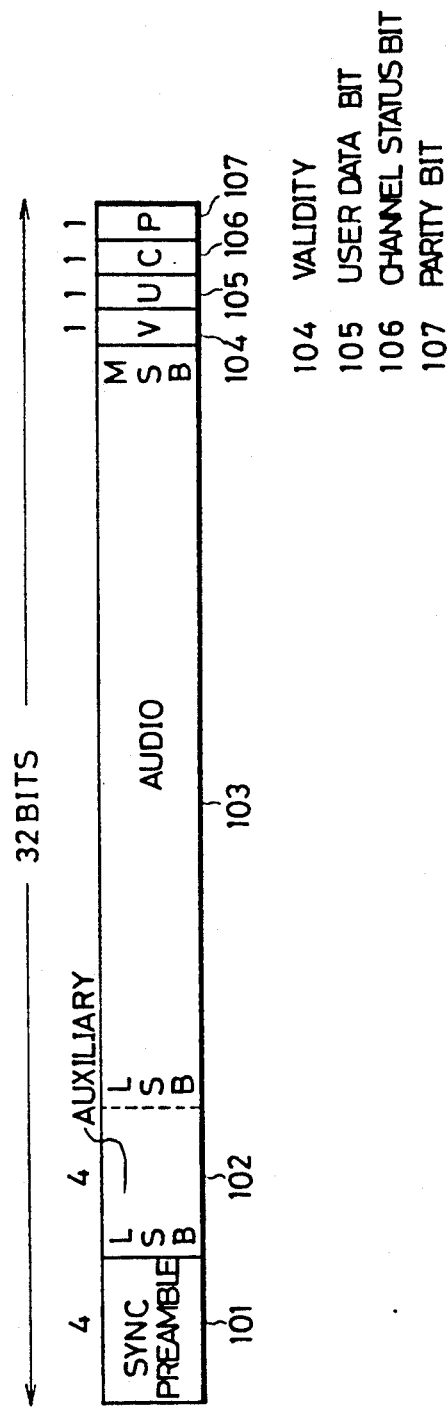
FIG. 69 shows signal structure of the sub frame of the digital audio interface format.
Figure 70:
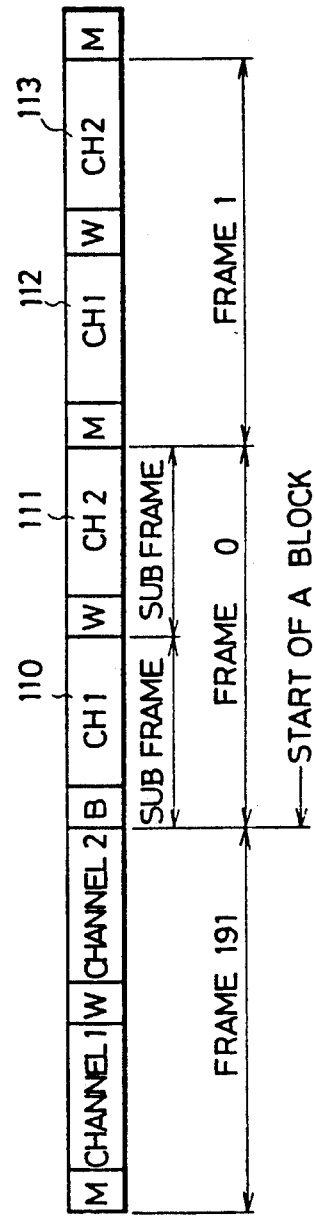
FIG. 70 shows a format for transmitting signals of 2 channels.
Figure 72A:
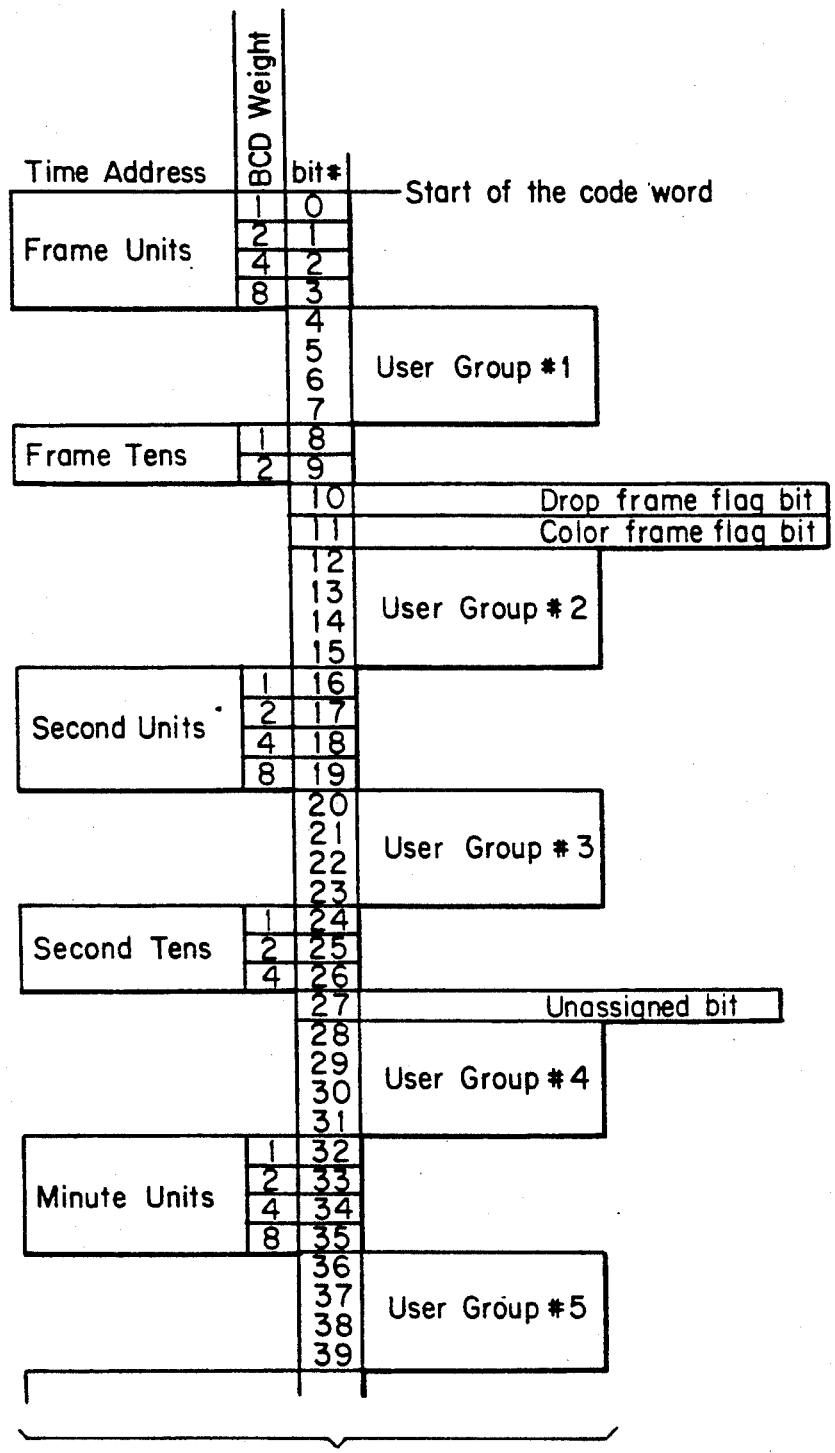

FIGS. 4 to 6 show examples of recording formats of the sub code packs used in the first embodiment. As shown in FIG. 72, the time code signal has 1 frame consisted by 80 bits, 16 bits of which are synchronization signals. Therefore, the information of the remaining 64 bits are to be recorded by assigning the same to packs. The sub code pack of the DAT comprise 64 bits as shown in FIG. 64, and the PACK DATA area 58 capable of recording data comprises 52 bits. Therefore, two packs are necessary for recording the contents of the time code signal. In assigning the 64 bit information of the time code signal to two packs, the information transmitted in 1 frame of the time code should preferably be divided into time information and other information to be assigned to separate packs, in view of the high speed search by the time code.

For this purpose, in this embodiment, the time information in the time code signal is assigned to the sub code pack defined by PACK ITEM "1001" as shown in FIG. 4, and various flag bits (TC5 to TC0) and USER Group data in the time code signal are assigned to the sub code pack defined as PACK ITEM "1010", as shown in FIG. 5. In addition to time information, identification flags (T5 to T1) indicative of the types of the time code, identification flag (SD) indicative of the attribute of TC FRAME recorded in PC7, and the phase difference information $\tau_i$ detected by the phase difference detecting circuit 74 are recorded in the PACK ITEM "1001". The SD flag indicates whether or not the same TC FRAME number as the preceding DAT frame is recorded.

In addition to the various flag bits (TC5 to TC0) and the USER Group data, the TC FRAME and the identification flag SD indicative of the attribute thereof are recorded in the sub code pack defined by the PACK ITEM "1010" shown in FIG. 5. The TC frame number is recorded in this manner in order to recognize to which frame the USER Group data written in the PACK ITEM "1010" correspond, since the contents of one time code frame are recorded in two separate packs.

In the foregoing, the contents of the one time code frame are divided into two packs by using two PACK ITEMs. When only one PACK ITEM is used for recording the time code signal, the combination of the pack is as shown in FIGS. 4 and 6. Referring to FIG. 6, the PACK ITEM is "1001", and identification of the recorded information is realized by B3 of the PC1. Namely, if B3=0, then time information and the like are recorded. If B3=1, then the USER Group data and the like are recorded.

Referring to FIG. 2, the reference characters $DT_j$, ... of the recording and reproducing signal waveform 82 represent the frame numbers of the audio signals at the time of input, and the characters $TC_i$, ... and ... $\tau_i$ ... represent the frame numbers of the time code signals at the time of input and the detected phase difference information, respectively. The audio signal 81 from $DT_j$ is recorded on the magnetic tape 12 delayed by 360 deg, as described above. In the period $DT_j$, the content of the TC 80 has been read and the phase difference information $\tau_i$ has been measured, so that $TC_i$ and $\tau_i$ are recorded on the sub code signal area of the same track as the audio signal $DT_j$. In the period $DT_{j+1}$, $TC_{i+1}$ and $\tau_{i+1}$ have not yet been known, so that the same $TC_i$, $\tau_i$ as the preceding DAT frame are continuously recorded in the sub code signal area on the track on which the audio signals of the period $DT_{j+1}$ are recorded. At that time, the SD flag in the pack is set to "1", indicating that $TC_i$ and $\tau_i$ are continuously recorded. In the period $DT_{j+2}$, $TC_{i+1}$ and $\tau_{i+1}$ are already known, so that $TC_{i+1}$ and $\tau_{i+1}$ are recorded on the sub code signal area of the track on which the audio signals of the period $DT_{j+2}$ are recorded. The same operation is repeated, and the audio signals and the time code signals are recorded.

In reproduction, the audio signals out of the signals reproduced from the magnetic track are outputted to the outside delayed by 360 deg, as shown by the relation between 82 and 83 of FIG. 2. The sub code signals are applied to the microcomputer 23 and reconstructed to be the original time code signals from two packs. The reference signal 78 for reproduction and the bit clock signal are inputted from the clock generating circuit 29 to the microcomputer 23, and the time code signal is applied to the modulating circuit 75 based on the phase difference information $\tau_i$ so that the same phase relation as in recording can be realized. When a pack in which the SD flag is set to "1" is inputted, the microcomputer 23 carries phase matching between the DAT frame and the time code frame by using the phase difference information (30 msec (DAT frame period) $-\tau_i$). The modulation circuit 75 carries out prescribed modulation in response to the bit clock signal applied from the clock generating circuit 29 to provide the output at the time code signal output terminal 76. By the above described operation, the audio signals and the time code signals are outputted to the outside having the same phase relation as that of the time of recording, as shown by 83 and 84 of FIG. 2.

A second embodiment of the present invention is described, in which the same apparatus as shown in FIG. 1 is used. In the first embodiment described above, the time information in the time code signal is directly assigned to the sub code pack, and the recording in the sub code signal area is carried out at prescribed timing. On the contrary, in the second embodiment, the DAT frame number is calculated based on the frame number of the inputted time code signal and the detected phase difference information $\tau_i$, the DAT time code is calculated by using the calculated DAT frame number, and the result of calculation is assigned to the sub code pack to be recorded on the sub code signal area.

Figure 7:
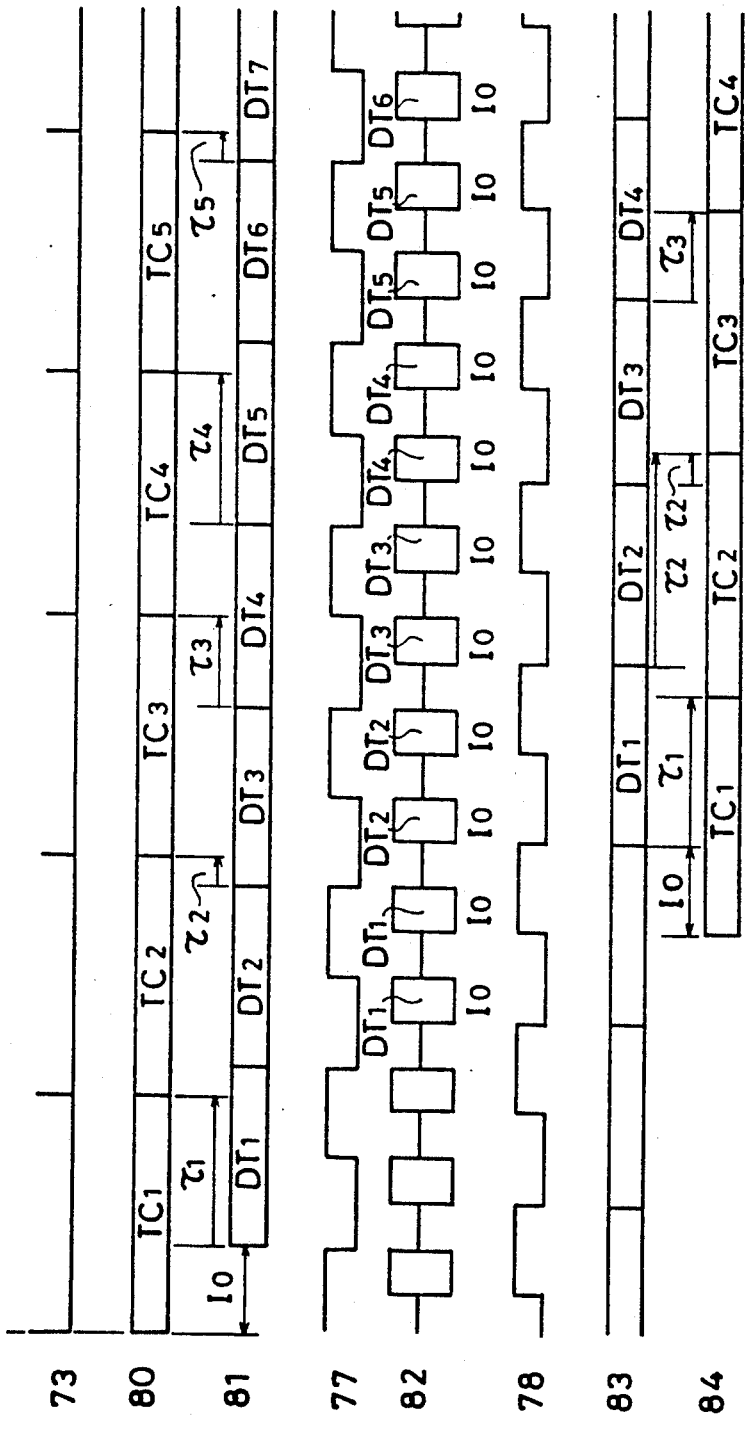
FIG. 7 is timing diagram showing the operation of a second embodiment of the present invention.

FIG. 7 is a timing diagram showing the operation of the second embodiment of the present invention. Referring to FIG. 7, the suffixes of the reference characters $TC_1$, $TC_2$, ... of the time code signals TC (80) inputted from the TC signal input terminal 71 represent order (number) of the frames, when the 00 hour 00 minute 00 second 00 frame of the time code signal is regarded as the reference (regarded as the first frame). In the similar manner as described with reference to the first embodiment, the time code data and phase difference information $\tau_i$ are inputted to the microcomputer 23. The suffixes of the reference characters $DT_1$, $DT_2$, ... of the inputted audio signals 81 in FIG. 7 represent the order (number) of the DAT frame divided by reference signal 77 for recording. The number of the DAT frame is defined by the following calculation.

More specifically, as shown in FIG. 7, when the start point of the reference time, i.e. 00 hour 00 minute 00 second 00 frame of the time code signal is regarded as the reference, the inputted time code frame and the DAT frame, including the initial phase difference information $I_0$, are in one to one correspondence without fail, although they are asynchronous with each other. By utilizing this relation, the relation represented by the following equation (1) can be applied, where the frame number of the inputted time code signal is represented by i, the phase difference information is represented by $\tau_i$ and the corresponding frame number of the DAT is represented by j.

$$j = INT[(iTC_u - \tau_i)/DT_u] + 1 \qquad (1)$$

In this equation, $TC_u$ represents the frame period of the time code signal and $DT_u$ represents the DAT frame period.

The calculation INT [] represents rounding of the decimal part (to provide an integer).

The number j of the DAT frame (for example $DT_2$ frame of FIG. 7) with the phase difference information $\tau_i$ not been detected can be calculated by adding 1 to the preceding result of calculation (that is, the preceding DAT frame number). The initial phase difference information $I_0$ can be calculated by the following equation.

$$I_0 = [iTC_u - \tau_i] \bmod DT_u \qquad (2)$$

The microcomputer 23 calculates the time code frame number i based on the inputted time code data, calculates based on the number i and the phase difference information $\tau_i$ the corresponding DAT frame number j and the initial phase difference information $I_0$, further calculates the DAT time code based on the DAT frame number, and assigns the same together with initial phase difference information $I_0$ to the sub code packs to apply the same to the memory circuit 4.

FIGS. 8 and 9 show examples of recording formats of the sub code packs used in the second embodiment of the present invention. As described above, the DAT frame number j is calculated based on the time code frame number i and the phase difference information $\tau_i$, so that the DAT time codes calculated based thereon, and they are recorded by using the PACK ITEM "0011" PC1, B3=0, Running Time PACK shown in FIG. 8. The various flag sets (TC5 to TC0) and the data of the User Groups 1 to 8 in the time code signals are recorded in respective designated areas in a pack which is newly provided, for example, the PACK ITEM "1001". TC ID DATA (T2 to T0 : 3 bits) indicative of the types of the inputted time code signals and the initial phase difference information $I_0$ (b10 to b0: 11 bits) found by calculation are recorded in the remaining areas.

Referring to FIG. 7, the suffixes of the reference characters $DT_1$, $DT_2$... of the recording and reproducing signal waveforms 82 represent the DAT frame numbers, and the reference character $I_0$ represents the initial phase difference information. As described above, the audio signals in the period $DT_j$ are recorded on the magnetic tape 12 delayed by 360 deg. The initial phase difference information $I_0$ is recorded in every sub code signal area.

The reproducing operation will be described in the following. The audio signals out of the signals reproduced from the helical tracks on the magnetic tape 12 are outputted to the outside delayed by 360 deg as shown by the relation between 82 and 83 of FIG. 7. The sub code signals are applied to the microcomputer 23 and converted and composed to the original time code signals by the two packs, that is, PACK ITEM "0011", (Running Time PACK) and PACK ITEM "1001". The microcomputer 23 calculates the DAT frame number j based on the DAT time code recorded in the Running Time PACK, and calculates the corresponding time code frame number; by using the number j and the initial phase difference information $I_0$ recorded in the PACK ITEM "1001" in accordance with the following equation (3).

$$i = INT[(I_0 + (j-1)DT_u)/TC_u] + 1 \qquad (3)$$

The phase difference information $\tau_i$ from the point of change of the DAT frame to the point of change of the time code frame can be calculated in accordance with the following equation (4) by using the number i calculated in accordance with equation (3).

$$\tau_i = iTC_u - [I_0 + (j-1)DT_u] \qquad (4)$$

The microcomputer 23 generates a time code signal of the base band (before modulation) to realize the same phase relation as at the time of recording to apply the same to the modulating circuit 75 in response to the reference signal 78 for reproduction and the bit clock signal outputted from the clock generating circuit 29, in accordance with the result of calculation of the equations (3) and (4). The modulating circuit 75 carries out prescribed modulation on the time code signal in response to the bit clock signal applied from the clock generating circuit 29 and outputs the result to TC signal output terminal 76.

By the above described operation, the audio signals and the time code signals are outputted to the outside having the same phase relation as at the time of recording, as shown by the relation between 83 and 84 shown in FIG. 7.

A third embodiment will be described in the following. In the first embodiment described above, the frame number which is the minimum unit of the time information is recorded in the sub code pack for recording the User Group data. Consequently, the pairing of the sub code pack and the sub code pack in which the time information is recorded can be done easily. In addition, since the identification flag SD indicative of the fact that the recorded content is the same as that of the preceding DAT frame is recorded, repeated reproduction of the time code signal information can be prevented in reproduction. In the second embodiment, the time information of the time code is converted into DAT time code to be recorded, which provides compatibility with the conventional DAT.

The third embodiment includes both advantages of the first and second embodiments. Since the apparatus and the recording and reproducing operations are the same as those in the second embodiment, the description thereof is not repeated, and only the format examples of the sub code pack will be described.

FIGS. 10 and 11 show examples of recording formats of the sub code packs used in the third embodiment of the present invention. By the same operation as described above, the time information converted into the DAT time code, the initial phase difference information $I_0$ and TC ID DATA (T3 to T0: 4 bits) distinguishing the types of the time code signals to be inputted are recorded in the pack shown in FIG. 10. The PACK ITEM is "0011", and in order to distinguish the pack from the conventional Running Time PACK (see FIG. 8 or FIG. 67), B3 of PC1 is used. Namely, if B3=1, it is used for recording time code signals.

In addition to the various flag bits (TC5 to TC0) in the time code signals and the User Group data, the FRAME No. which is the minimum unit of the DAT time code in the pack shown in FIG. 10 and the identification flag SD indicating whether or not the recorded content except the FRAME NO. is the same as that of the preceding DAT frame are recorded in the pack PACK ITEM "1001" shown in FIG. 11. By recording the FRAME NO. the pairing with the pack in which the time information is recorded shown in FIG. 10 can be surely carried out, and by recording the identification flag SD, repetitious reproduction of the information such as the User Group data in the time code signals other than the time information can be prevented at the time of reproduction.

Figure 12:
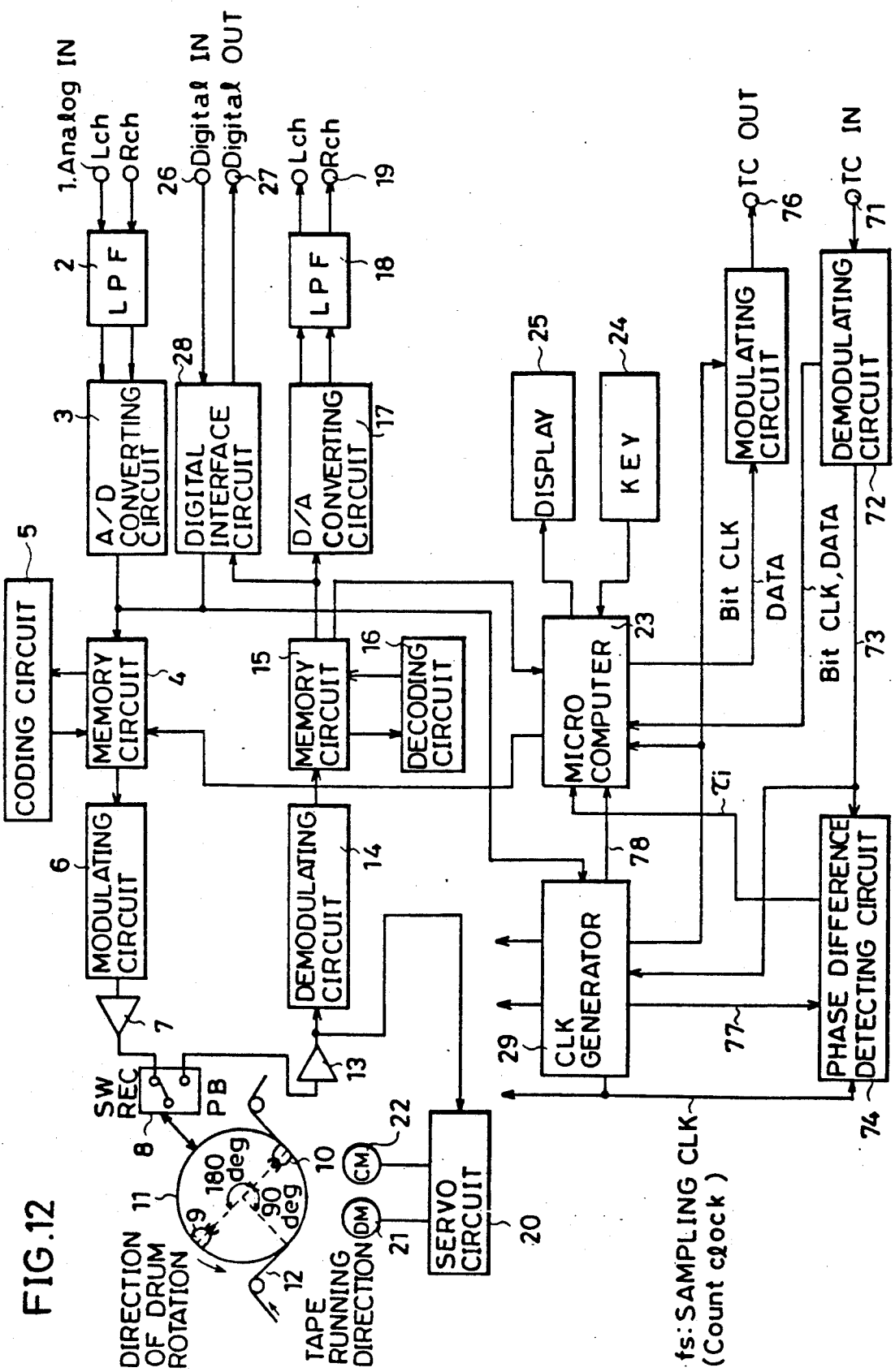
FIG. 12 is a schematic block diagram showing a fourth embodiment of the present invention.

FIG. 12 is a schematic block diagram showing a fourth embodiment of the present invention. The embodiment shown in FIG. 12 is the same as that of FIG. 1 except that a sampling clock signal for sampling the audio signal is used as the count clock signal applied to the phase difference detecting circuit 74. As mentioned in the foregoing, the DAT corresponds to three different sampling frequencies, that is, 48 kHz, 44.1 kHz and 32 kHz. By using the sampling clock signals, the representation of the phase difference information and of the time codes come to be the same as the total sample number, so that the accuracy can be ensured on a sample by sample basis, which enables synchronization and editing sample by sample.

FIG. 13 shows an example of a recording format of the sub code packs used in the fourth embodiment in the present invention. Referring to FIG. 13, in PC3 of the pack format recorded on the TC ID DATA (T3 to T0: 4 bits) distinguishing the types of the inputted time code signals, and information indicative of the three different frequencies of the sampling clock signals $f_s$: 48 kHz, 44.1 kHz and 32 kHz (F1, F0: 2 bits) as the count clock signals for detecting the phase difference are recorded.

Other information such as the DAT time code are recorded in the same manner as shown in FIG. 10. In the fourth embodiment, the data such as User Group are recorded in the sub code pack shown in FIG. 11 as in the third embodiment.

In the above described embodiment, the frame clock signal 73 of the time code signal extracted by the demodulating circuit 72 is also applied to the clock generating circuit 29, which is used in a vari pitch recording mode. In the vari pitch mode, all the clocks used in the DAT must be changed, and therefore, the clock generating circuit 29 changes the necessary clock frequency to output the same in accordance with the period of the frame clock signal 73. The reference signal 77 for recording, the count clock signal 79 for measuring the phase difference and the sampling clock signal $f_s$ are included therein.

Although the phase difference detecting circuit 74 is provided for detecting phase difference information $\tau_i$ in the above described embodiment, the phase difference information $\tau_i$ can be measured by inputting the frame clock signal 73, the reference signal 77 for recording and the count clock signal 79, provided that a microcomputer 23 capable of high speed arithmetic operation is used. The phase difference detecting circuit 74 can be omitted in that case.

In the above described first, third and fourth embodiments, the data such as User Group are recorded in one pack separately from the time information. However, since the contents of such data are not changed frame by frame unlike the time information, such data may be recorded as needed.

In the above described second, third and fourth embodiments, based on the inputted time code signal frame number i and on the phase difference information $\tau_i$, the corresponding DAT frame number j is calculated, and the initial phase difference information $I_0$ but not $\tau_i$ is recorded as the phase difference information. Therefore, by using a different TCu from that of recording is used for the equations (3) and (4), the time code signal which is different from that at the time of recording can be outputted. Namely, even if the time code signal of EBU25Hz system are inputted at the time of recording, the time code signals of the SMPTE30Hz system can be easily outputted at the time of reproduction.

A fifth embodiment in which channel status data transmitted from the digital audio interface can be recorded is described in the following.

Figure 14:
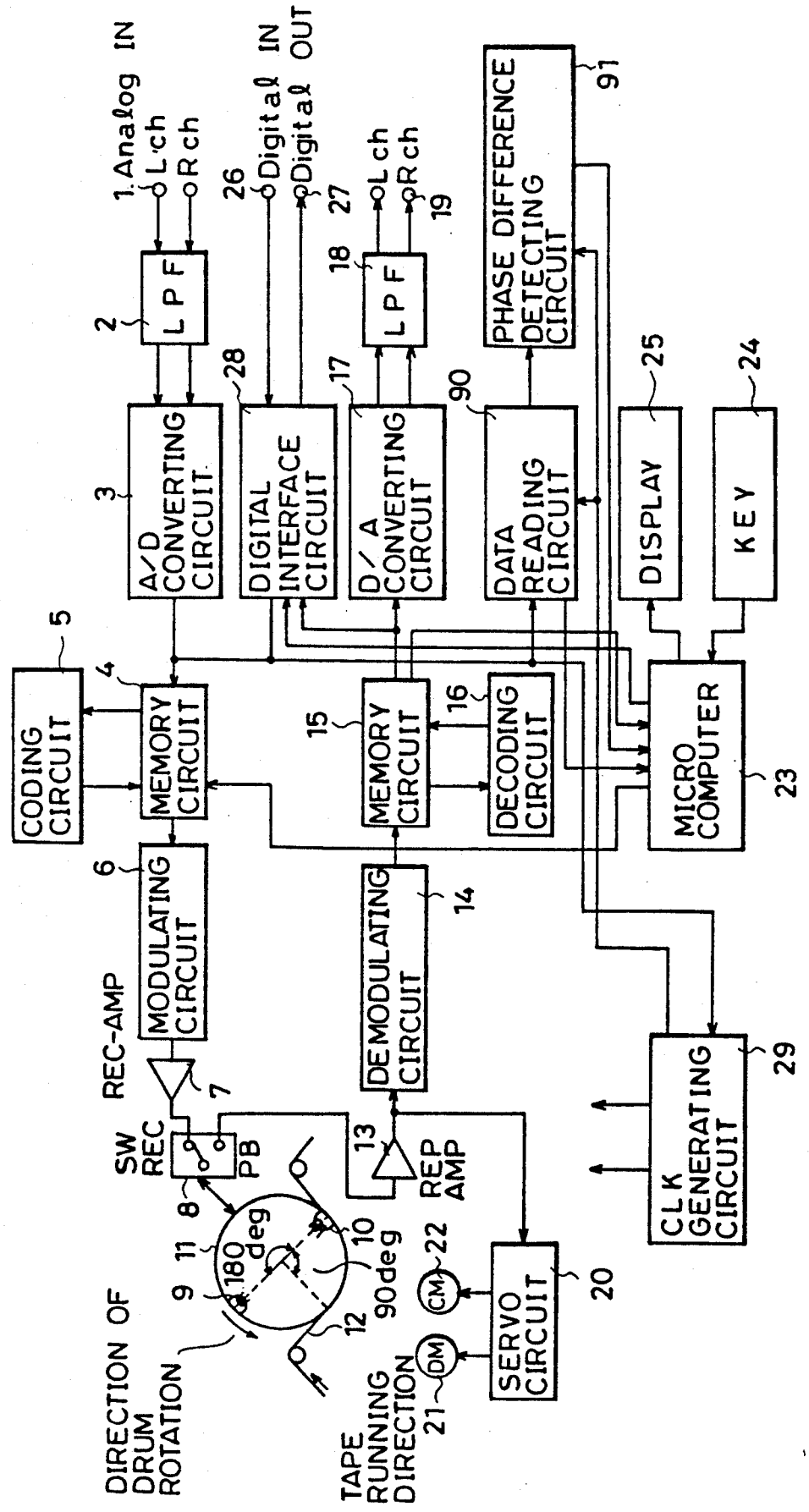
FIG. 14 is a schematic block diagram of a fifth embodiment of the present invention.

FIG. 14 is a schematic block diagram of the fifth embodiment of the present invention. The embodiment shown in FIG. 14 comprises a data reading circuit 90 and a phase difference detecting circuit 91. Except these newly added circuits, the structure is the same as that shown in FIG. 56. The microcomputer 23 and the clock generating circuit 29 have their functions improved in order to assign the channel status data to the sub code signal packs. The data reading circuit 90 is provided for reading the channel status data. The phase difference detecting circuit 91 is provided for detecting the phase difference between DAT frames and the blocks of the digital audio interface.

Figure 15:
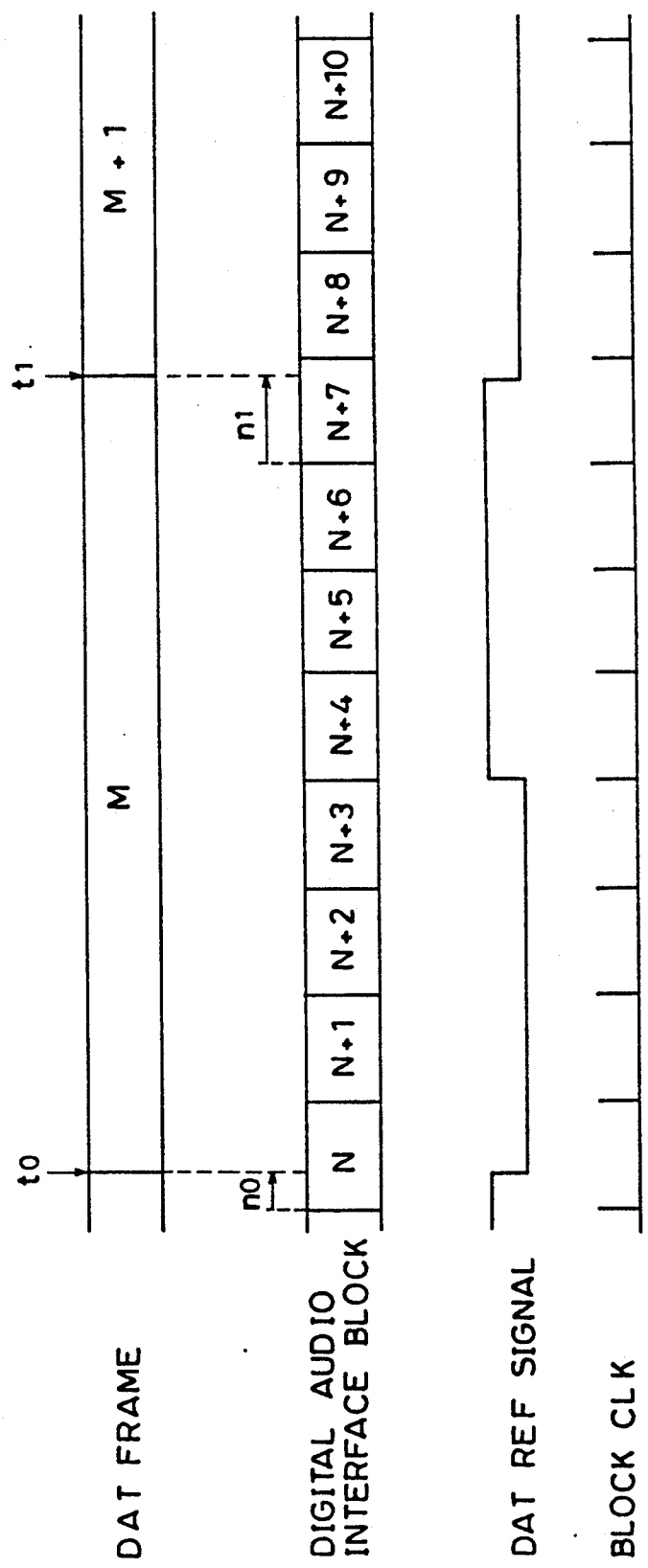
FIG. 15 shows a relation between inputted digital audio interface blocks and DAT frames in the fifth embodiment of the present invention.

FIG. 15 shows the blocks of the inputted digital audio interface and the DAT frames of the fifth embodiment of the present invention. Referring to FIG. 15, the reference characters N, N+1, N+2 ... represent block numbers of the inputted digital data and M, M+1 represent the DAT frame numbers. In this embodiment, the channel status data in the block (block number M) of the digital data at the time of change (time $t_0$) of the DAT frame are recorded as the sub code of the DAT frame M. In this case, ID code, alphanumeric channel origin data, alphanumeric channel destination data out of the channel status data are recorded as they are. The local sample address code and the time-of-day code are represented as the sample at the head of the inputted digital block. Therefore, by detecting phase difference between the DAT frame and the digital data block and by arithmetically processing the local sample address code and the time-of-day code by the detected phase difference and the channel status data block, the local sample address code and the time-of-day code for the first sample of the DAT frame are calculated to be recorded in the sub code.

The operation of recording the digital audio signals will be described in the following. The digital audio signals inputted to the digital input terminal 26 are applied to a digital interface circuit 28. The digital interface circuit 28 extracts and outputs audio data and the channel status data from the digital audio signals. The outputted audio data are subjected to the processes as described in relation to the prior art to be recorded on the magnetic tape 12.

The channel status data are applied to the data reading circuit 90 and 1 block of the channel status data at the point of change of the DAT frame are collectively applied to the microcomputer 23. The data reading circuit 90 extracts a block clock signal of the digital data to apply the same to the phase difference detecting circuit 91. The phase difference detecting circuit 91 has the same structure as the phase difference detecting circuit 74 shown in FIG. 1, which comprises a counter circuit and a latch circuit, not shown. A DAT reference signal and a sampling clock signal $f_s$, for example, as the count clock signal for detecting the phase difference are applied from the clock generating circuit 29 to the phase difference detecting circuit 91. The counter circuit is reset at the rising edge of the block clock signal and immediately thereafter, the counter circuit is counted up by the sampling clock signal $f_s$, and the counted value of the counter circuit is latched in the latch circuit at the fall of the DAT reference signal. The counted value latched in the latch circuit is directly applied to the microcomputer 23 as the phase difference information $n_i$ ($i=0, 1, 2, \ldots$) from the point of fall of the block clock signal to the point of change (falling edge of the DAT reference signal) of the DAT frame.

The microcomputer 23 assigns the inputted channel status data to separate sub code signal packs in accordance with the types thereof. The local sample address code and the time-of-day code are arithmetically processed in accordance with the phase difference information $n_i$ applied from the phase difference detecting circuit 91 so that they are converted into the local sample address code and the time-of-day code for the sample at the head of the DAT frame, to be assigned to and recorded in the sub code signal packs.

FIGS. 16 to 21 show examples of the recording format of the sub code packs used in the fifth embodiment of the present invention.

Figure 71:
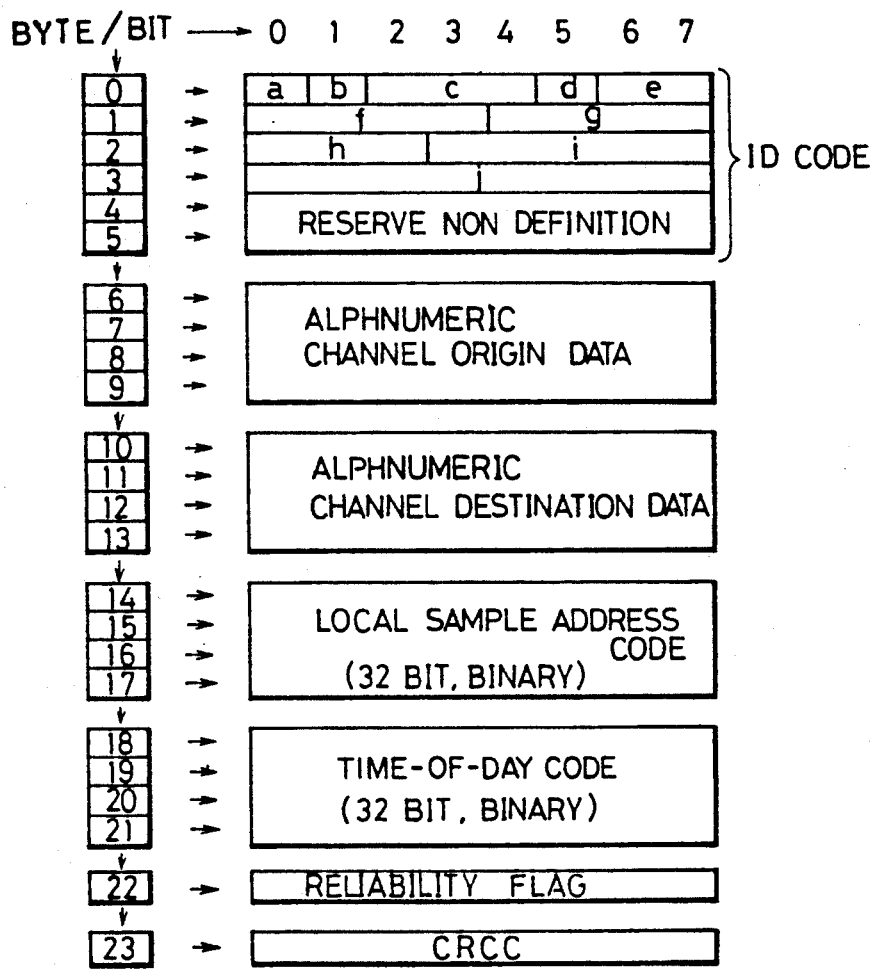
FIG. 71 shows a channel status data format for professional use.

As shown in FIG. 71, the channel status data comprises 192 bits (24 bytes) in each block and data of 23 bytes except CRCC may be assigned to the sub code packs. The channel status data can be divided into 6 types, dependent on the content of the transmitted information, that is, ID code, alphanumeric channel origin data, alphanumeric channel destination data, local sample address code, time-of-day code and a reliability flags. Five different channel status data except the reliability flags are assigned to separate sub code packs.

A format in each sub code pack will be described with reference to FIG. 16. In this embodiment, the sub code signal pack of PACK ITEM "1000" is used as the sub code signal pack for the channel status data signals and is distinguished from other packs. By using B2 to B0 of PC1 in the PACK DATA area as the SUB PACK ITEM, five different channel status data can be distinguished from each other.

As to the reliability flags of the byte 22 of the channel status data, the bit 4 corresponds to the ID code, the bit 5 corresponds to the alphanumeric channel origin data and the alphanumeric channel destination data, the bit 6 corresponds to the local sample address code, and the bit 7 shows the reliability of the time-of-day code, so that the flag information is allotted to the B3 area of PC1 of the respective packs.

The sub-code signal shown in FIG. 17 has the SUB PACK ITEM being "001", in which the ID code is recorded. In FIG. 18, the SUB PACK ITEM is "010", in which the alphanumeric channel origin data are recorded. In FIG. 19, the SUB PACK ITEM is "011" in which the alphanumeric channel destination data are recorded. In FIG. 20, the SUB PACK ITEM is "100", in which the local sample address code for the sample position at the head of the DAT frame is recorded.

In FIG. 21, the SUB PACK ITEM is "101", in which the time-of-day code for the sample position at the head of the DAT frame is recorded. Each of the four channel status data except the ID code comprise 4 bytes, so that the 4 bytes are assigned to PC4 to PC7 of the respective packs, and the vacant sections PC2 and PC3 are set to "0". The ID code is consisted of 6 bytes and the lower 4 bytes are assigned to PC4 to PC7 and the upper 2 bytes are assigned to PC2 and PC3. The bytes at the head of each of the five channel status data are all assigned to PC4.

The sub-code signal pack assigned in the above described manner is applied to the memory circuit 4 and processed in the same manner at described, to be recorded on the magnetic tape 12.

The reproducing operation of the data recorded in the above described manner will be described. The signals reproduced from the magnetic tape 12 are processed in the same manner as in the prior art and thereafter stored in the memory circuit 15 in which error correction and compensation are carried out. The digital audio signals having the errors corrected and compensated are outputted to the D/A converting circuit 17 and to the digital interface circuit 28. The sub-code data having the errors corrected and compensated are applied to the microcomputer 23. The microcomputer 23 determines the contents of the pack data from the PACK ITEM of respective sub code signal packs and displays the content on the displaying apparatus 25.

When the PACK ITEM is "1000", namely, when it is determined that it is the sub-code signal pack for the channel status data, the type of the channel status data is determined from SUB PACK ITEM to be applied to the digital interface circuit 28. The digital interface circuit 28 maintains the ID code, the alphanumeric channel origin data the alphanumeric channel destination data as they are out of the inputted channel status data. The value of the local sample address code is applied to a counter (not shown) counting the local sample addresses, and the time-of-day code is loaded to a counter circuit (not shown) counting the time, so that the address and the time are counted. When digital data are to be outputted, prescribed data are outputted based on the digital audio interface format.

As described above, in the DAT in accordance with the present embodiment, the data including the channel status data transmitted based on the digital audio interface format can be recorded and reproduced.

Although data are assigned to separate sub-code signal packs in accordance with the types of the channel status data in the above described embodiments, the channel status data may be further divided byte by byte. FIGS. 22 to 25 show examples of the recording formats of such sub code packs. More specifically, in the format examples shown in FIGS. 22 to 25, the channel status data are assigned byte by byte without any space therebetween, so as to reduce the number of packs used. The SUB PACK ITEM is defined in the similar manner, so as to distinguish the contents recorded in the packs.

In the B3 area of PC1 of the pack shown in FIGS. 16 to 21, the reliability flag F is set. The reliability flag transmitted by the byte 22 of the channel status data block is recorded as it is as the reliability flag. The microcomputer 23 reads the reliability flag recorded in the sub code signal pack and when it is determined that the reliability is low, then it compensates the data dependent on the reliable data having the same type of pack recorded on the preceding DAT frame, and outputs the compensated data to the interface circuit 28.

Instead of using the reliability flag transmitted by the byte 22 of the channel status data flag as the reliability flag, the following method may be applied. Namely, the CRCC transmitted by the byte 23 is checked and if it is determined that there is no error, the various reliability flags transmitted by the byte 22 are directly recorded in a back as they are, and when it is determined that there is an error, the reliability flags of respective sub code signal packs may be forced to indicate the unreliable state. The reliability of the data may be determined not dependent on the reliability flag transmitted from the byte 22 or dependent on the result of checking of the CRCC but dependent on integrity of various data transmitted in a plurality of continuous channel status data block, or dependent on the continuity of the time information, and the determination may be recorded as the reliability flag in respective sub-code signal packs.

In the fifth embodiment, the time information transmitted by the channel status of the digital audio interface is recorded in 32 bit binary code. In the following, a sixth embodiment is described in which the time information is divided into hour, minute, second, frame and sample number to be recorded in the sub code packs.

FIG. 26 is a schematic block diagram of an apparatus for realizing the sixth embodiment. The example shown in FIG. 26 comprises a channel status data signal processing circuit 120 and a phase difference detecting circuit 121. Except these circuits, the structure is the same as the conventional apparatus shown in FIG. 56. The channel status data signal processing circuit 120 is provided for extracting the block signal 122 of the channel status data block consisted of 192 frames of channel status bits and for extracting information having close relation to the audio signals such as emphasis and sampling frequency and two different time information. The phase difference detecting circuit 121 is provided for detecting the phase difference information $n_i$.

Figure 27A:
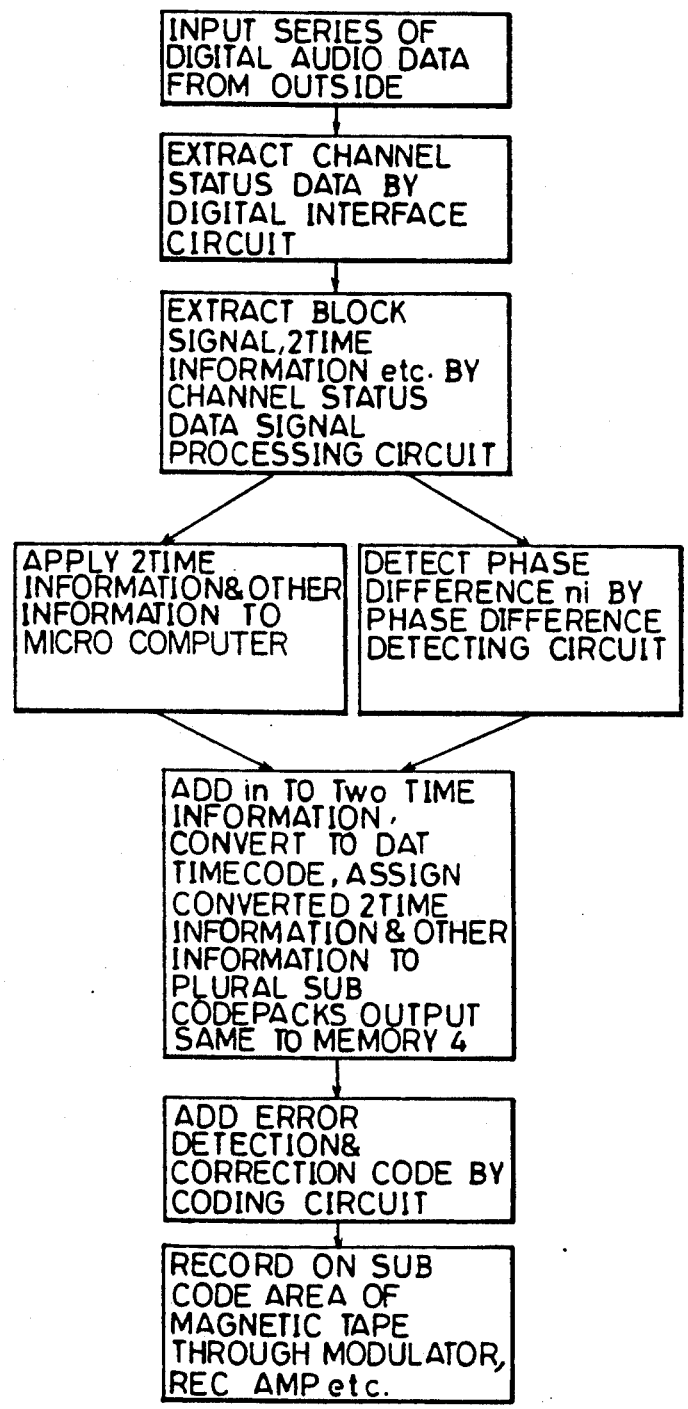
FIGS. 27A and 27B are flow charts showing the operation of the sixth embodiment shown in FIG. 26.
Figure 27B:
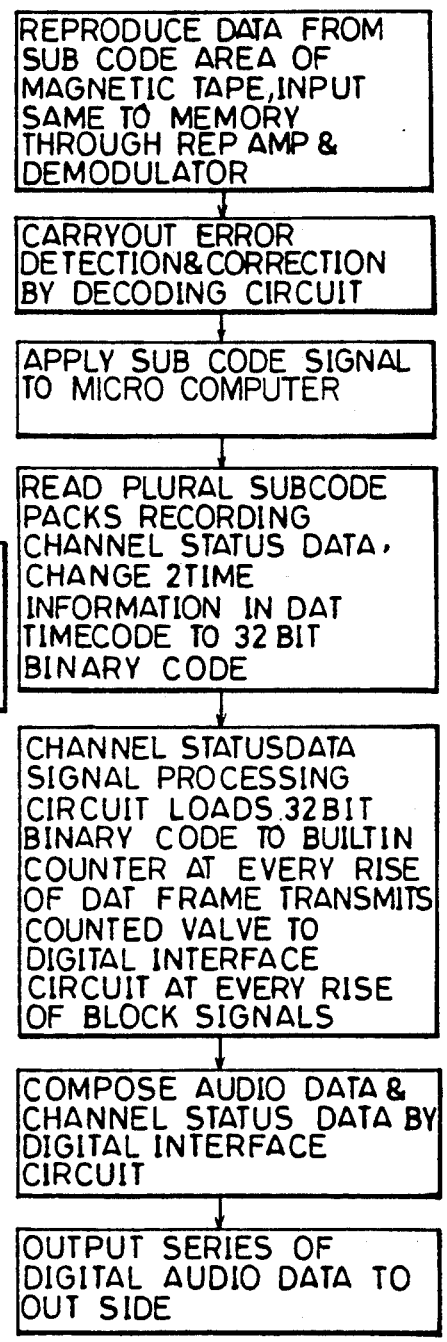

FIGS. 27A and 27B are flow charts for describing the operation of the sixth embodiment shown in FIG. 26.

The operation of the sixth embodiment is described with reference to Figs. 26, 27A and 27B. In recording, the digital audio data inputted to the digital input terminal 26 are signal processed by the digital interface circuit 28, and 16 bits of audio data are stored in the memory circuit 4. The digital interface circuit 28 extracts the channel status data out of the digital audio data to apply the same to the channel status data signal processing circuit 120. The channel status data signal processing circuit 120 extracts the block signal 122 of the channel status data block consisted of 192 frames of channel status bits, and extracts two different pieces of time information and information having close relation to the audio signal such as emphasis and sampling frequency to apply the same to the microcomputer 23. The phase difference detecting circuit 121 has the same structure as the phase difference detecting circuit 74 of FIG. 1 and detects the phase difference information $n_i$ from the head of the channel status data block to the head of the DAT frame and sends that to the microcomputer 23. The phase difference information $n_i$ represents the number of samples from the sample at the head of the DAT frame to the sample at the head of the block.

The microcomputer 23 adds the phase difference information $n_i$ detected by the phase difference detecting circuit 121 to the two different pieces of time information in the channel status data block, that is, the value of the local sample address code and the value of the time-of-day code. The result of addition is the time information corresponding to the sample at the head of the DAT frame. The microcomputer 23 further carries out an operation for converting the result of addition to the DAT time code, and the result is assigned to the sub code pack to be recorded. The operation for the conversion into the DAT time code is carried out in accordance with the equations (5) to (9) which will be described in the following.

When the time information corresponding to the sample at the head of the DAT frame is represented by Tc, and the number of samples in 1 frame of the DAT frame is represented as $T_s$, the fraction sample number SAMPLE NO. can be represented by the following equation (5)

$$SAMPLE\ NO. = t_C\ mod T_s \quad (5)$$

The frame number FRAME NO. of the DAT can be represented by the following equation (6).

$$FRAME\ NO. = (INT\ (T_c/T_s)mod100)mod33 + 33INT[(INT(T_c/T_s)mod100)/99] \quad (6)$$

The unit of second, SECOND can be represented by the following equation (7).

$$SECOND = 3\ [INT(T_c/100T_s)mod20] + INT[(INT(T_c/T_s)mod100)/33] - INT[(INT(T_c/T_s)mod100/99] \quad (7)$$

The unit of minute MINUTE can be represented by the following equation (8).

$$MINUTE = INT(T_c/2000T_s)mod60 \quad (8)$$

The unit of hour HOUR can be represented by the following equation (9)

$$HOUR = INT(T_c/120000T_s) \quad (9)$$

The number of samples $T_s$ in 1 DAT frame differs dependent on the sampling frequency. The number of samples are 1440, 1323 and 960 when the sampling frequencies are 48 kHz, 44.1 kHz and 32 kHz, respectively.

FIGS. 28 and 29 show examples of recording formats of the sub code packs used in the sixth embodiment. FIG. 28 shows an example of the format of a pack for recording the time-of-day code in which the time-of-day code corresponding to the sample at the head of the DAT frame is converted into the DAT time code to be recorded. The hour, minutes, second and the frame number calculated in accordance with the above described equations (6) to (9) are recorded in two digits of binary coded decimal code in the designated area of PC4 to PC7, and the fraction sample number calculated from the equation (5) is recorded in 11 bits binary code system of S10 to S0.

In this example, S10 is set as the MSB. Identification information in relation to the time are recorded by the B7 to B4 (T3 to T0: 4 bits) of the PC3, so as to enable recording of the time code other than the digital audio data series As to the PACK ITEM, one which has not yet been defined may be used out of those shown in FIG. 65. However, since the number of the remaining ones is small, it is set to "0011" in this embodiment, and B3 of PC1 is set to "1" in order to distinguish it from the conventional Running Time PACK.

In the format shown in FIG. 29, the local sample address code corresponding to the sample at the head of the DAT frame is converted into DAT time code to be recorded, in accordance with the equations (5) to (9). In the examples shown in FIG. 29, the identification information similar to the example of the time code pack shown in FIG. 28 is recorded by 4 bit codes of T3 to T0. The PACK ITEM is set to "0001" and B3 of PC1 is set to "1".

During reproduction, the audio signals reproduced from the helical track of the magnetic tape 12 are subjected to prescribed signal processing and applied to the digital interface circuit 28 through the memory circuit 15. Meanwhile, the time-of-day code and the local sample address code recorded in the sub-code pack and the PCM ID code recorded in the PCM signal area are read by the microcomputer 23, the information therefrom is applied to the channel status data signal processing circuit 120. At that time, as to the time information, the DAT time code is calculated to provide the original 32 bits binary code to be outputted. This calculation is carried out in accordance with the following equation (10).

$$T_c = [120000 \times HOUR + 2000 \times MINUTE + 33 \times SECOND + INT(SECOND3) + FRAME NO.] \times T_s + SAMPLE NO. \quad (10)$$

The channel status data signal processing circuit 120 loads the time-of-day code as the original binary 32 bits the local sample address code provided from the microcomputer 23, respectively, at every rise of the DAT frame clock signal. The channel status data signal processing circuit 120 comprises two types of 32 bit binary counters (not shown) counted up by the sampling clock signals $f_s$ and a clock generating counter (not shown) generating a clock signal 122 every time 192 sampling clock signals $f_s$ are counted. At the rise of the clock signal 122 generated from the channel status data signal processing circuit 120, information having close relation to the audio signals such as emphasis and the sampling frequency, which are the channel status data, and the counted value of the two 32 bit binary counters at that time, namely, the head address code of the block, are applied to the digital interface circuit 28. The digital interface circuit 28 outputs the audio signals and the channel status data respectively at prescribed positions to the outside, using the rising edge of the block signal 122 as a reference.

FIGS. 30 and 31 show examples of other pack formats for recording the time-of-day code. In the examples shown in FIGS. 30 and 31, the contents of the hour, minute, second and frame number and the contents in $T_3$ to $T_0$ are the same. However, in the example of FIG. 30, the fraction sample number is recorded by 11 bits binary code of S10 to S0, and in the example shown in FIG. 31, the phase difference information $n_i$ detected by the phase difference detecting circuit 121 is recorded by 8 bit binary code on M7 to M0. These are identified by MS flag at B0 of PC3. Namely, if MS is "0", it shows that the fraction sample number, and if MS is "1", it shows that the phase difference information $n_i$ is recorded, for instance.

By the pack shown in FIG. 30, the time-of-day code corresponding to the sample positioned at the head of the DAT frame is recorded. In reproduction, the phase difference information $n_i$ recorded in the pack shown in FIG. 31 is loaded to the above mentioned block signal generating counter, at every rise of the DAT frame clock signal. Accordingly, the phase relation between the DAT frame and the channel status data block at the time of recording is maintained to be reproduced.

FIGS. 32 and 33 show examples of other pack formats for recording the local sample address code. The contents recorded by the formats of FIGS. 32 and 33 are the same as those FIGS. 30 and 31 except the content of time information and the PACK ITEM.

The alphanumeric channel origin data, the alphanumeric channel destination data and the ID code of the channel status data are recorded in the sub code pack shown in FIGS. 17 to 19, described with reference to the fifth embodiment.

Figure 34:
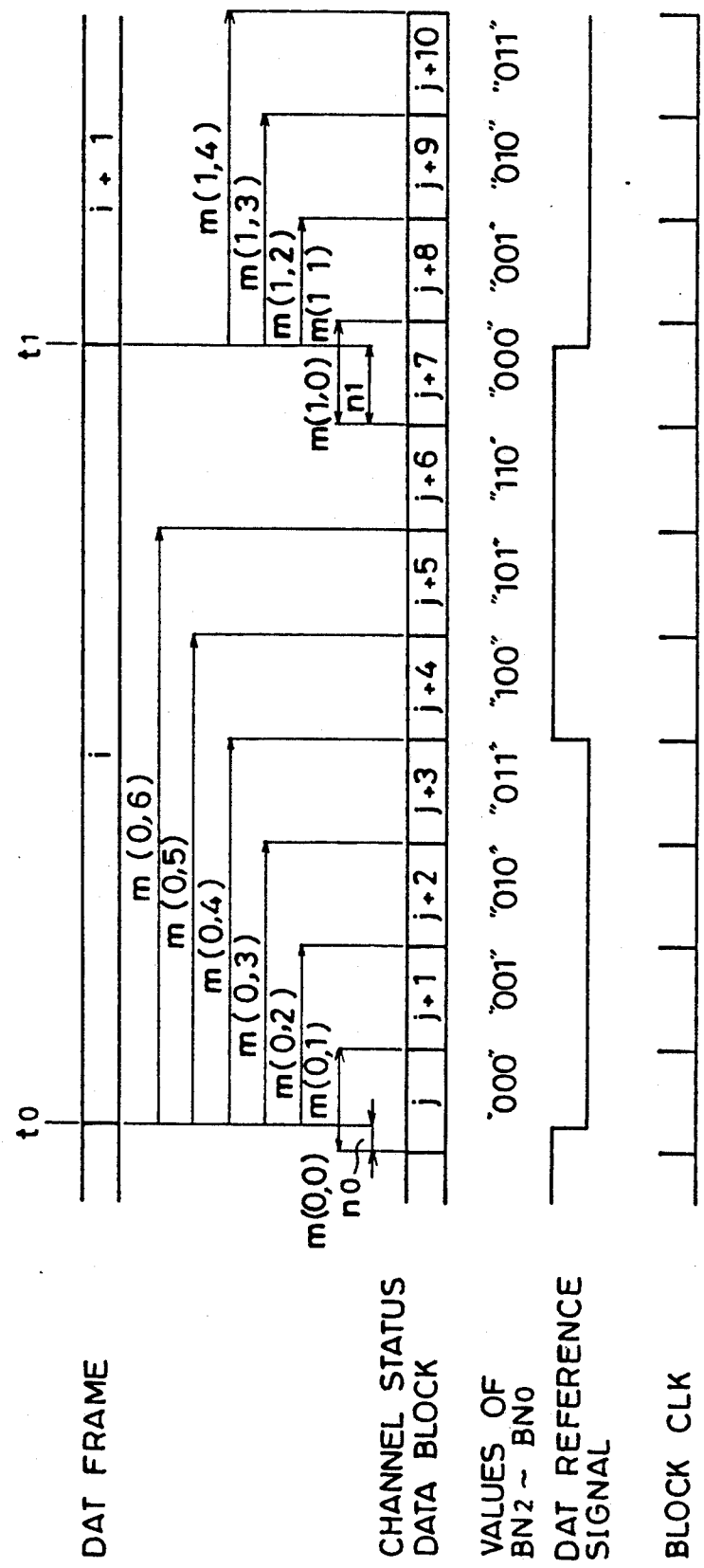
FIG. 34 is a timing diagram showing a relation between inputted channel status data blocks and DAT frames.

Now, in the above described fifth and sixth embodiments, method for recording only the channel status transmitted in the channel status data block positioned at the point of change of the DAT frame, that is, $t_0$, $t_1$ ... shown in FIG. 34 (blocks represented by j and j+7 in FIG. 34) has been described. As to the alphanumeric channel origin data and the alphanumeric channel destination data, a series of data are transmitted by the ASCCI code. Therefore, when a series of five or more letters is to be transmitted, a plurality of channel status data blocks are used. Namely, the alphanumeric channel origin data and the alphanumeric channel destination data transmitted by the channel status data blocks represented by the reference characters j+1 to j+6 positioned in the DAT frame in FIG. 34 must be recorded in the sub-code of the DAT.

FIGS. 35 to 38 show examples of recording formats of other packs for recording all the alphanumeric channel origin data and the alphanumeric channel destination data. Referring to FIG. 35, the data constituted by three bits, that is, BN2, BN1 and BN0 of the areas B5 to B3 of PC2 represent block number (the number of the block positioned at the point of change of the DAT frame is represented as "000" (0)) from the channel status data block positioned at the point of change of the DAT frame in FIG. 34. The necessity of calculating the phase information of the head of each block from that block is eliminated. Since the value of the phase information m uses the point of change of the DAT frame as a reference, the sign thereof is defined as negative when the block number is "000".

FIG. 38 shows the pack format example shown in FIG. 37 applied for the alphanumeric channel destination data. Since the phase information m of FIGS. 37 and 38 represents the absolute time (the unit is 1 sample time) to the head of each black with the point of change of the DAT frame being the reference, the information of the block numbers BN2 to BN0 may be omitted. However, in that case, the sign information of m must be recorded in B3 of PC2 so as to show whether the value m is positive or negative. It is not necessary to record the channel status data blocks to which the alphanumeric channel origin data and the alphanumeric channel destination data are not transmitted, so that recording may be carried out only for the blocks to which such data are transmitted, so as to reduce the number of packs.

Although the channel status data for professional use of the digital audio interface format have been described in the foregoing, channel status data for producing music software and for home use may be divided and assigned to sub code signal packs.

The first to fourth embodiment are related to the methods for recording and reproducing SMPTE/EBU/Film time code in DATs. The fifth and sixth embodiment are related t methods for recording and reproducing channel status data for professional use transmitted by the digital audio interface. The information included in the SMPTE/EBU/Film time code and in the channel status data for professional use are the information related to the time and other information. Therefore, the format of the sub code packs for recording such information can be made common. Such examples are shown in FIGS. 39 to 44. FIG. 39 shows a pack format example for recording information related to the time in which PACK ITEM is "0011" and B3 of PC1 is set to "1" in order to distinguish the same from the conventional Running Time pack. In order to identify the content of the data recorded in the pack, SPI1 and SPI0 are defined as the SUB PACK ITEM. When SPI1 and SPI0 are "00", it shows that the time information of the SMPTE/EBU/Film time code is recorded. When they are "01", the local sample address code of the channel status data for professional use is recorded. When they are "10", it is shown that the time-of-day code of the channel status data for professional use is recorded. 2 bits of F1 and F0 are used to distinguish the type of the sampling frequency at the time of recording, namely, when they are "00", the frequency is 48 kHz, when "01", then 44.1 kHz and when "10", the frequency is 32 kHz.

In this manner, the identification information of the sampling frequency at the time of recording usually recorded by using 2 bits of F1 and F0. When the PCM signals only are after recorded by using the sampling frequency different from that indicated by F1 and F0 recorded in the sub-code signal pack, such information will be very effective. In such cases, since the SMPTE/EBU/Film time code, the local sample address code, the time-of-day code, the initial phase difference information $I_0$ and the phase difference information $n_i$ are transmitted or detected based on the sampling frequency at the time of recording of the sub-code signal packs, when the sampling frequency of the PCM signals is different, they will be meaningless. However, if the sampling frequency at the time of recording the sub code signal pack is known, then reproduction can be carried out without any practical problem, by multiplying the value of the local sample address code or the like in the pack by $f_{sPCM}/f_s$, where $f_{sPCM}$ represent the sampling frequency of the PCM during reproduction, with maximum possible error being a single sample.

Three bits of T2 to T0 are used as a time code flag, and when SPI1 and SPI0 are "00", it distinguishes the transmission rate of the SMPTE/EBU/Film time code. When time information of the channel status data for professional use is to be recorded, "000" is recorded with no definition. In the area of B2 to B0 of PC2 and PC3, 11 bits binary data are recorded. When the content is the SMPTE/EBU/Film time code, the 11 bits binary data are the above described initial phase difference information $I_0$. When it is the channel status data for professional use, the data are the above described fraction sample number SAMPLE NO. Time information converted into the DAT time code is recorded in the area of PC4 to PC7.

FIGS. 40 to 44 are examples of the pack formats in which information other than the time information is recorded. The PACK ITEM is "1000" and 2 bits of SPI1 and SPI0 are defined as the SUB PACK ITEM to identify the recorded content, as shown in FIG. 40. The area of PC2 to PC7 is a sub data area, in which various information distinguished by the SUB PACK ITEM is recorded. FIG. 41 shows a format example in which SPI1 and SPI0 are "00" and binary group data (the above mentioned User Group data) of the SMPTE/EBU/Film time code and various flag sets (TB5 to TB0) are recorded. FIG. 42 shows a format example in which SPI1 and SPI0 are "01" and ID codes (byte 0 to byte 5) of the channel status data for professional use are recorded. FIG. 43 shows a format example in which SPI1 and SPI0 are "10" and alphanumeric channel origin data transmitted by the channel status data for professional use are recorded. FIG. 44 shows a format example in which SPI1 and SPI0 are "11" and the reliability flag and the alphanumeric channel destination data transmitted by the channel status data for professional use are recorded.

A seventh embodiment will be described in the following, which relates to a method of converting the SMPTE/EBU/Film time code and the time information transmitted by the channel status data for professional use (hereinafter referred to as digital audio interface time code). In the seventh embodiment, the head of the SMPTE/EBU/Film time code, that is, the sample at the head of the 0th frame and the head of the digital audio interface time code, that is, the sample at the head of 0th block are defined as being coincident with each other. At this time, the SMPTE/EBU/Film time code is 00 hour, 00 minute, 00 second, 00 frame, the digital audio interface time code is defined such that the 32 bits of binary code are all 0, which time is defined to be AM.0, whereby the time codes are converted to each other using the fact that the frame and the block are in proportion to each other.

Figure 45:
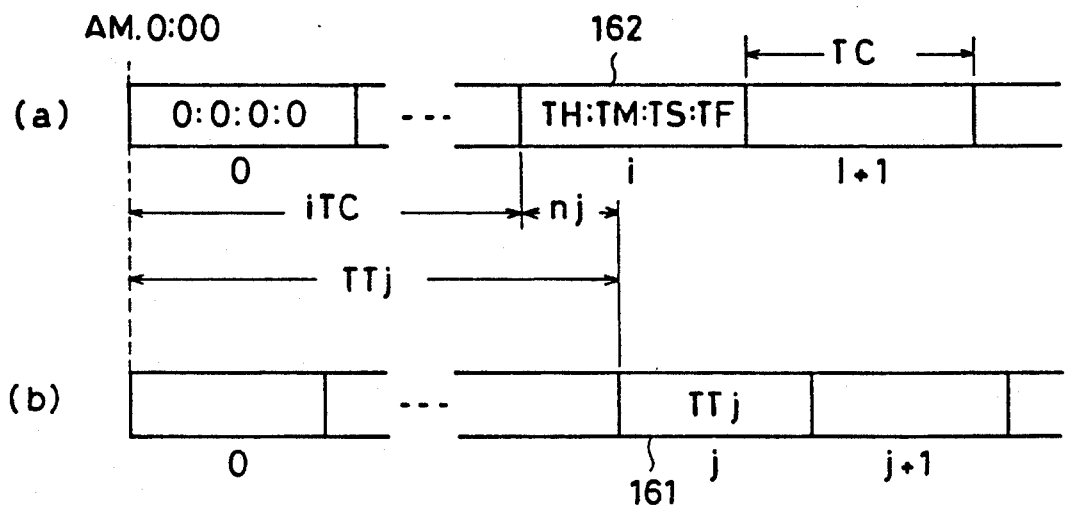
FIG. 45 shows a relation between the SMPTE/EBU/Film time code frames and the digital audio interface blocks when the SMPTE/EBU/Film time code is to be converted into the digital audio interface time code.

FIG. 45 shows a relation between SMPTE/EBU/Film time code frame and the digital audio interface block when the SMPTE/EBU/Film time code is to be converted into the digital audio interface time code. Referring to FIG. 45, (a) shows the SMPTE/EBU/Film time code frame, (b) shows the block of the digital audio interface. The reference characters 0, ..., i, i+1, ... are the frame numbers of the SMPTE/EBU/Film time code frames and the characters 0, ..., j, j+1 ... are the block numbers of the digital audio interface blocks. The reference character TC shows the number of sample in 1 frame of the SMPTE/EBU/Film time code. The reference character $n_j$ shows the number of samples from the head of the jth digital audio interface block 161 to the ith SMPTE/EBU/Film time code frame 162 prior to the digital audio interface block 161.

The reference character $TT_j$ shows the total sample number from A.M. 0:00 to the head of the jth digital audio interface block 161. The reference characters TH, TM, TS and TF show the values of hour, minute, second and frame of the time code of the ith SMPTE/EBU/Film time code frame 162.

When the SMPTE/EBU/Film time code is to be converted into the digital audio interface time code, the total sample number iTC from A.M. 0:00 to the head of the ith frame 162 is calculated in accordance with the inputted values of the TH, TM, TS and TF of the time code, and the number of samples $n_j$ from the head of the ith frame 162 to th head of the jth digital audio interface block 161 is added thereto to provide the total sample number $TT_j$ from A.M. 0:00 to the head of the jth digital audio interface block 161, whereby the time code TTj which is transmitted by the jth digital audio interface block 161 is provided. This is represented by the following equations (11) to (14).

$$i = Tf_r(3600TH + 60TM + TS) + TF \quad (11)$$
(When *SMPTE* non-drop frame $Tf_r$ = 30 Hz/EBU/Film)
$$i = 108000TH + 1800TM + 30TS + TF \quad (12)$$
(When *SMPTE* non-drop frame $Tf_r$ = 29.97 Hz)
$$i = 107892TH + 1798TM + 2INT(TM/10) + 30TS + TF \quad (13)$$
(When *SMPTE* drop frame)
$$TT_j = nj - INT(-iTC) \quad (14)$$

In the equations, $Tf_r$ represents the frame frequency which is 30 Hz or 29.97 Hz in SMPTE, 25 Hz in EBU and 24 Hz in Film.

Figure 46:
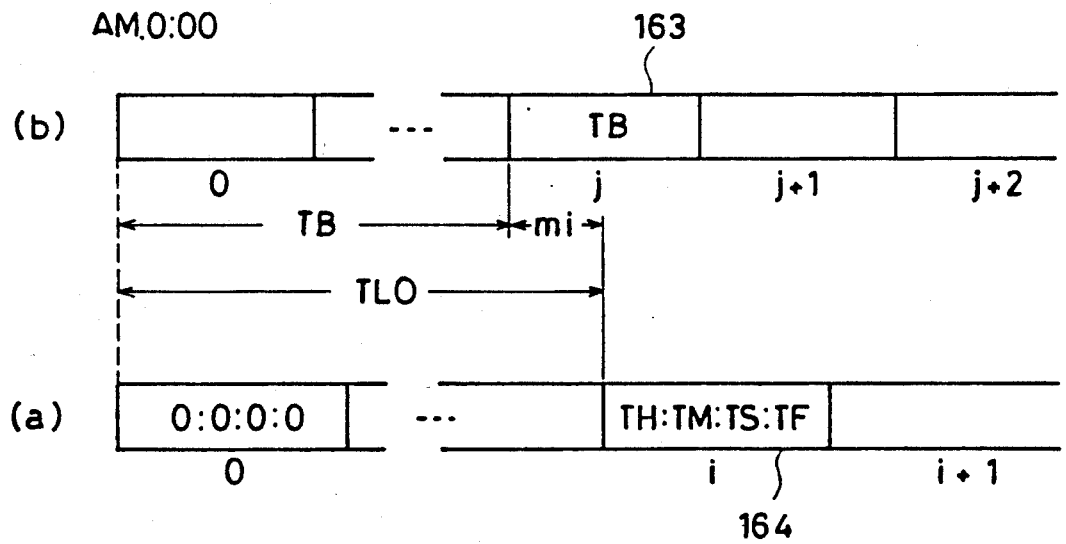
FIG. 46 shows a relation between the digital audio interface block and the SMPTE/EBU/Film time code frame, when the digital audio time code is to be converted into the SMPTE/EBU/Film time code.

FIG. 46 shows a relation between the digital audio interface block and the SMPTE/EBU/Film time code frame when the digital audio interface time code is to be converted into the SMPTE/EBU/Film time code. The method for converting the digital audio interface time code into the SMPTE/EBU/Film time code is described with reference to FIG. 46.

Referring to FIG. 46, the reference characters (a), (b), i and j are the same as those shown in FIG. 45. The reference character TB represents a time code transmitted by the digital audio interface, which represents the total sample number from A.M. 0:00 to the head of the jth digital audio interface block 163. The reference character TLO represents the total sample number from A.M. 0:00 to the head of the ith SMPTE/EBU/Film time code frame 164. The reference character $m_i$ shows the number of samples to the head of the jth digital audio interface block 163 prior to the ith SMPTE/EBU/Film time code frame 164, and the reference characters TH, TM, TS and TF show the values of hour, minute, second and frame of the time code of the ith SMPTE/EBU/Film time code frame 164.

When the digital audio interface time code is to be converted into the SMPTE/EBU/Film time code, the number of samples $m_i$ from the head of the jth digital audio interface block 163 to the head of the ith SMPTE/EBU/Film time code frame 164 is added to the inputted digital audio interface time code TB to provide the total sample number TLO from A.M. 0:00 to the head of the ith frame 164, and the values of hour, minute, second and frame of the time code of the ith frame 164 can be calculated from the total sample number TLO. This relation is represented by the following equations (15) to (37).

(I) When the frame frequency $Tf_r$ is 25 Hz or 24 Hz, or the frame frequency $Tf_r$ is 30 Hz and it is the non drop frame, then $$TLO = TB + m_i \quad (15)$$

$$TC_S = INT(F_s/Tf_r + 0.5) \quad (16)$$

$$TC_{sa} = x \cdot 2 \cdot F_s/Tf_r \quad (17)$$

$$X1 = TLO \bmod TC_{sa} \quad (18)$$

$$Sample = x1 \bmod TC_S + TC_S \cdot INT(x1/x2 \cdot TCS) \quad (19)$$

$$TF = x2 \{INT(TLO/TC_{sa}) \bmod (Tf_r/x2)\} + INT(x1/TC_s) - INT(x1/x2 \cdot TC_s) \quad (20)$$

$$TS = INT(TLO/F_s) \bmod 60 \quad (21)$$

$$TM = INT(TLO/60F_s) \bmod 60 \quad (22)$$

$$TH = INT(TLO/3600F_s) \quad (23)$$

where, the reference character $F_s$ is the sampling frequency, which is 48 kHz, 44.1 kHz or 32 kHz.

The reference character $TC_s$ is the number of samples in 1 frame with the decimal part rounded, the reference character x2 is a coefficient determined by $Tf_r$ and $F_s$, whose values are as shown in FIG. 47, respectively.

(II) In the case of drop frame $$TLO = TB + m_i \quad (15)$$

$$Sample = INT\{TLO \bmod (F_s/Tf_r)\} \quad (24)$$

$$i = INT\{(TLO - Sample) \cdot Tf_r/F_s\} \quad (25)$$

$$y1 = i \bmod 107892 \quad (26)$$

$$y2 = (y1 \bmod 17982) - 2 \quad (27)$$

$$TF = \{(y2 \bmod 1798) + 2\} \bmod 30 \quad (28)$$

$$y3 = INT[\{(y2 \bmod 1798) + 2\}/30] \quad (29)$$

$$TS = y3 - INT(y3/60) \quad (30)$$

$$TM = 10 * INT(y1/17982) + INT(y2/1798) - INT(y2/17982) \quad (31)$$

$$TH = INT(i/107892) \quad (32)$$

(III) When the frame frequency is 29.97 Hz and it is the non drop frame $$TLO = TB + m_i \quad (15)$$

$$Sample = INT\{TLO \bmod (Fs/TF_r)\} \quad (24)$$

$$i = INT\{(TLO - Sample) \cdot Tf_r/F_s\} \quad (25)$$

$$TF = i \bmod 30 \quad (33)$$

$$FS1 = 30F_s/29.97 \quad (34)$$

$$TS = INT\,(TLO/FS1)\,mod60 \quad (35)$$

$$TM = INT\,(TLO/60FS1)\,mod60 \quad (36)$$

$$TH = INT\,(TLO/3600FS1) \quad (37)$$

FIG. 48 shows the number of samples in 1 frame of the SMPTE/EBU/Film time code frame at respective sampling frequency. As shown in FIG. 48, when $Tf_r$ is 29.97 Hz, when $Tf_r=30$ Hz and $F_s=32$ Hz, when $Tf_r=24$ Hz and $F_s$ is 44.1 kHz or 32 kHz, the number of samples in 1 frame is not an integer. Therefore, in this embodiment, when $Tf_r$ is 29.97 Hz, the number of samples in each frame are combined based on the total sample number from A.M. 0:00 and on the point of change of the frame, such that when $F_s$48 kHz, 1601 and 1602 are combined, when $F_s=44.1$ kHz, 1471 and 1472 are combined, when $F_s=32$ kHz, 1067 and 1068 are combined so as to suppress the error in 1 sample or less.

When $Tf_r=30$ Hz and $F_s=32$ Hz, the changing point of the samples and the point of change of the frames coincide with each other at every three frames, so that the number of samples in 1 frame is adapted to be 1067, 1067 and 1066 repeatedly in every three frames. When $Tf_r$24 Hz and $F_s=44.1$ kHz, the number of sample is adjusted by repeating 1838 and 1837 in every two frames. If Fs is 32 kHz, 1333, 1333, and 1334 are repeated in every three frames to adjust the number of samples so as to suppress the error in 1 sample or less.

In the above described embodiment, the time code is converted into the number of samples so as to carry out the calculation by integers and the calculation is carried out sample by sample. However, the calculation may be carried out based on the time unit. The calculation based on the time unit will be described in the following where the unit of time is second.

Figure 49:
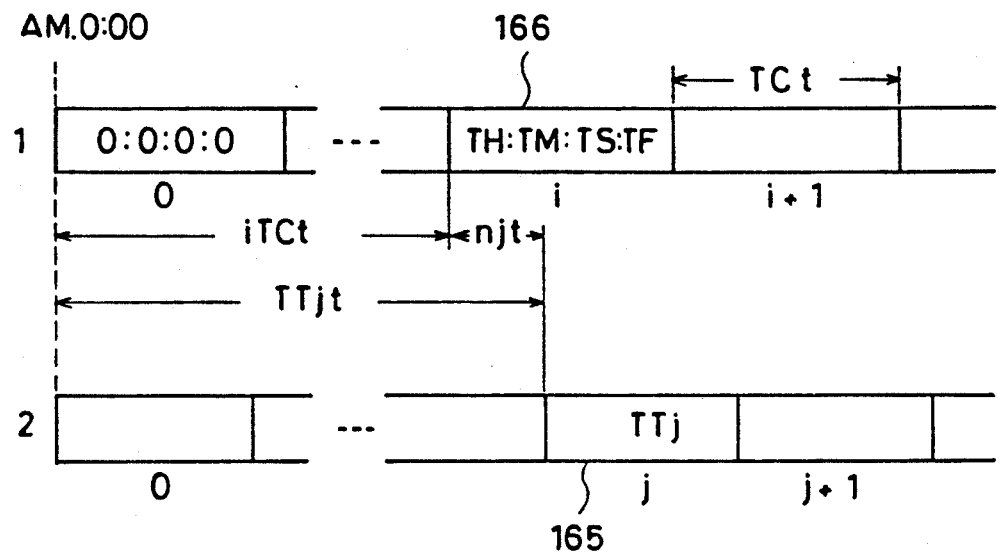
FIGS. 49 and 50 show, on time base, a relation between the SMPTE/EBU/Film time code frame and the digital audio interface block.
Figure 50:
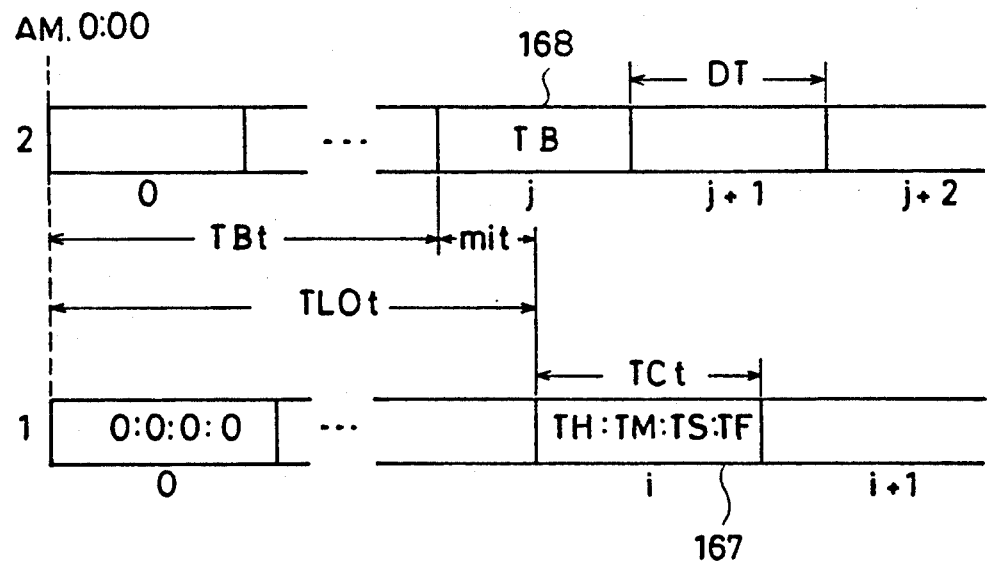

FIGS. 49 and 50 show the relation between the SMPTE/EBU/Film time code and the digital audio interface block on time base.

(1) When the SMPTE/EBU/Film time code is to be converted into the digital audio interface time code (see FIG. 49).

$$i = Tf_r\,(3600TH + 60TM + TS) + TF \quad (38)$$
(When SMPTE non-drop frame $Tf_r = 30$ Hz/EBU/Film)

$$i = 108000TH + 1800TM + 30TS + 30TF/29.97 \quad (39)$$
(When SMPTE non-drop frame $Tf_r = 29.97$ Hz)

$$i = 107892TH + 1798TM + 2INT(TM/10) + 30TS + TF \quad (40)$$
(SMPTE drop frame)

$$TT_{jt} = n_{jt} + iTC_t \quad (41)$$

$$TT_j = TT_{jt} \cdot F_s \quad (42)$$

Where $TT_{jt}$: time from A.M. 0:00 to the head of jth digital audio interface block 165.

$n_{jt}$: time from the head of the jth digital audio interface block 165 to the head of the ith SMPTE/EBU/Film time code frame 166 prior to the digital audio interface block 165.

$TC_t$: frame period of the SMPTE/EBU/Film time code.

(2) when the digital audio interface time code is to be converted into SMPTE/EBU/Film time code (see FIG. 50)

(I) When $Tf_r=25$ Hz, 24 Hz or $Tf_r=30$ Hz, non-drop frame $$TB_t = jDT \quad (43)$$

$$TLO_t = jDT + m_{it} \quad (44)$$

$$TF = (TLO_t/TC_t)\,modTF_r \quad (45)$$

$$TS = INT\,(TLO_t)\,mod60 \quad (46)$$

$$TM = INT\,(TLO_t/60)\,mod60 \quad (47)$$

$$TH = INT\,(TLO_t/3600) \quad (48)$$

Where $TB_t$: time from A.M. 0:00 to the jth digital audio interface block 168.

DT: period of the digital audio interface block $TLO_t$: time from A.M. 0:00 to the head of the ith SMPTE/EBU/Film time code frame 167

$m_{it}$: time from the head of the ith SMPTE/EBU/Film time code frame 167 to the head of jth digital audio interface block 168 preceding the frame, and TCt: frame period of the SMPTE/EBU/Film time code (II) drop frame $$TLO_t = jDT + m_{it} \quad (44)$$

$$i = TLO_t/TC_t \quad (49)$$

The calculation of the values TF, TS, TM and TH are the same as the above described equations (26) to (32), and therefore the description is not repeated.

(III) When $Tf_r=29.97$ Hz, non-drop frame $$TLO_t = jDT + m_{it} \quad (44)$$

$$i = TLO_t/TC_t \quad (49)$$

The calculation of the values TF, TS, TM and TH are the same as the equation (33) to (37), so that the description is not repeated.

Although conversion between the SMPTE/EBU/Film time code and the digital audio interface time code by sample by sample has been described in the foregoing, equations for conversion may be provided in the similar manner for other types of time codes.

Based on the idea of the seventh embodiment, the SMPTE/EBU/Film time code recorded in the DAT may be converted into the digital audio interface time code transmitted by the channel status data for professional use to be outputted, the reverse operation is also possible.

An eighth embodiment will be described in which user data of the digital audio interface are all recorded by using a plurality of packs and pack number indicating the order are added thereto.

Figure 51:
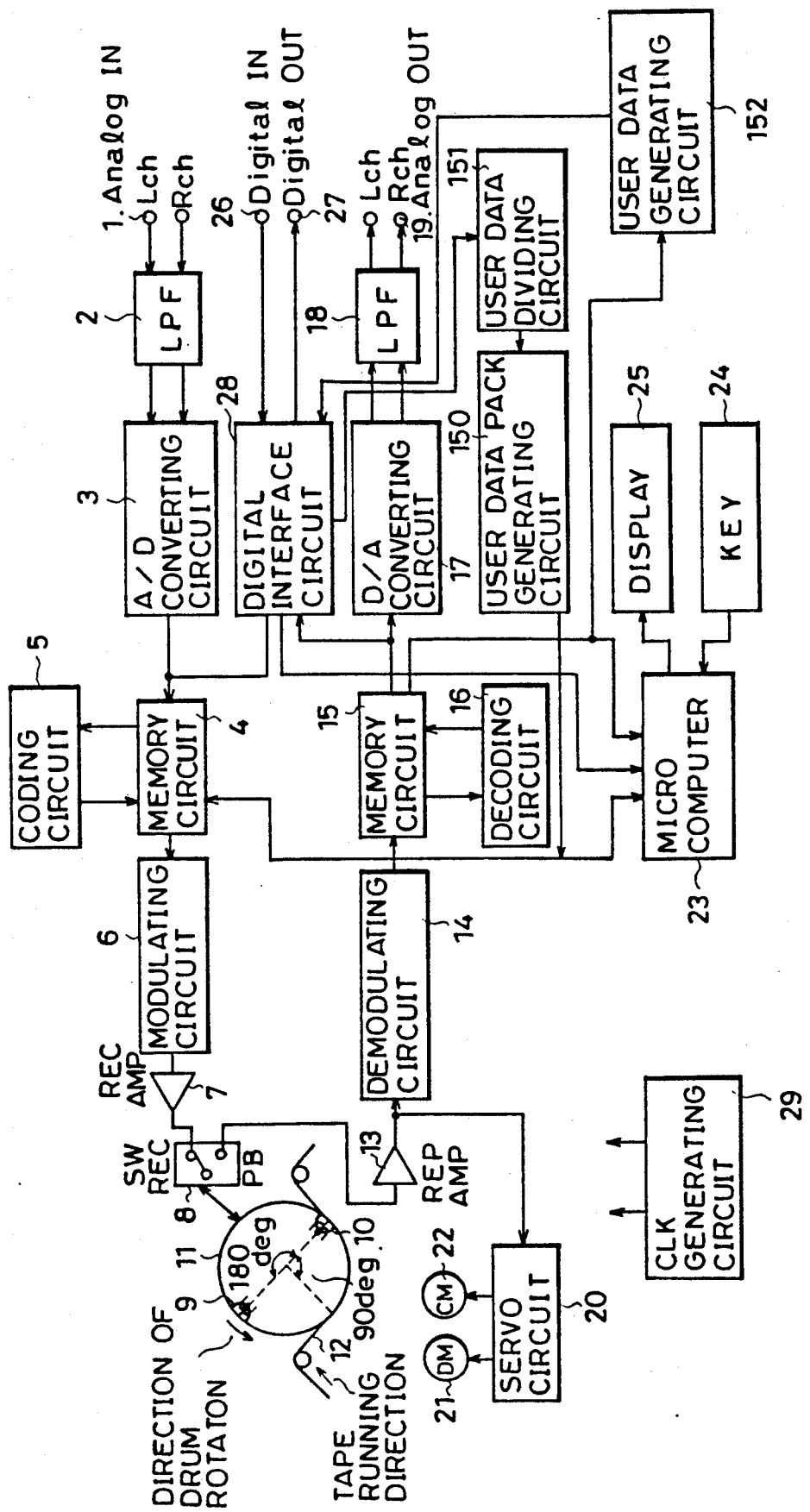
FIG. 51 is a schematic block diagram of an eighth embodiment.

FIG. 51 is a schematic block diagram of the eighth embodiment. The structure of the embodiment shown in FIG. 51 is the same as that of the prior art shown in FIG. 56 except a user data pack generating circuit 150, a user data dividing circuit 151 and a user data generating circuit 152 which are newly provided. The user data dividing circuit 151 is provided for receiving demodulated user data outputted from the digital interface circuit 28 and for dividing the same at every prescribed bits to be recorded in 1 pack. The user data pack generating circuit 150 receives the data divided by the user data dividing circuit 151 and when they are recognized as the user data, it generates the user data packs. The user data generating circuit 152 is provided for reproducing the original user data from the reproduced plurality of user data packs.

Figure 52A:
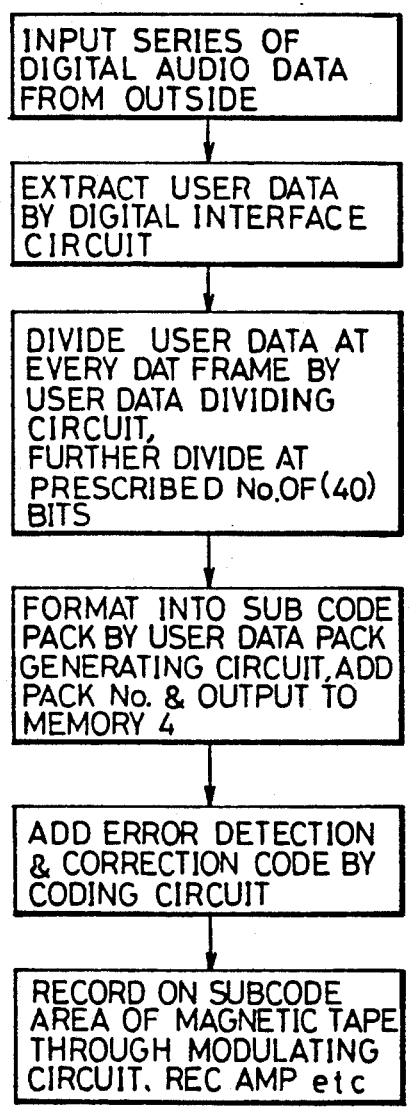
FIGS. 52A and 52B are flow charts showing specific operation of the eighth embodiment of the present invention.
Figure 52B:
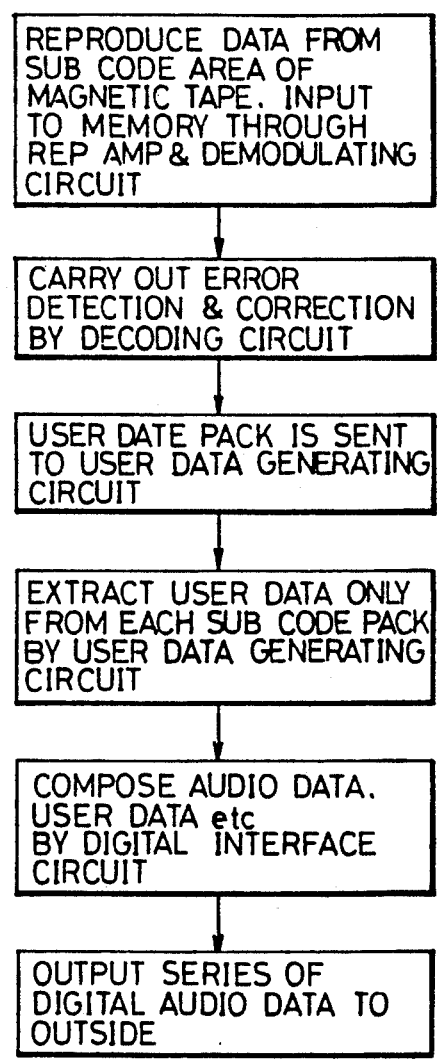
Figure 53:
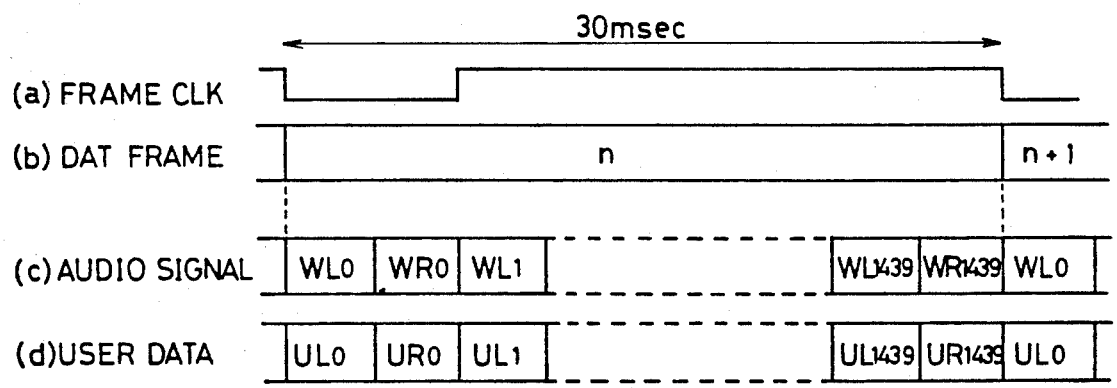
FIGS. 53 and 54 are timing diagrams showing the operation of the eighth embodiment.
Figure 54:
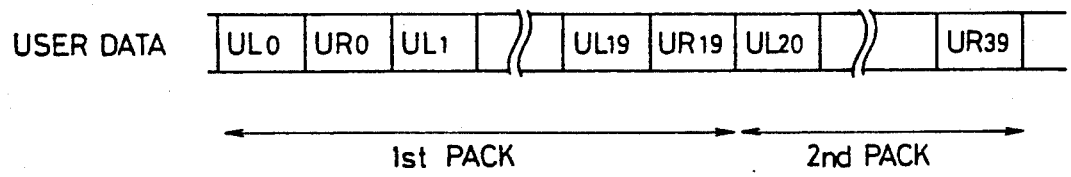

FIGS. 52A and 52B are flow chart showing specific operation of the eight embodiment, FIGS. 53 and 54 are timing diagrams showing the operation, and FIG. 55 shows one example of the user data pack employed in the eighth embodiment of the present invention.

The operation of the eighth embodiment of the present invention is described with reference to FIGS. 51 to 54. In recording, the user data separated by the digital interface circuit 28 are finally divided by the user data dividing circuit 151 at every prescribed number of data which number corresponds to 1 pack. FIG. 53 is a timing diagram showing the method of division of the first stage of the user data, in which the sampling frequency is 48 kHz. Referring to FIG. 53, the reference character (a) shows the DAT frame clock signal generated from the clock generating circuit 29 shown in FIG. 51, (b) shows the DAT frame, (c) shows audio signals outputted from the digital interface circuit 28, and (d) shows user data outputted from the digital interface circuit 28. The reference characters $WL_n$ and $UL_n$, and $WR_n$ and $UR_n$ show the audio data and the user data of the same sub frame, when n is the same.

As shown in FIG. 53, the user data are divided DAT frame by DAT frame, and the user data divided frame by frame are further divided at every prescribed number of bits by bits to be recorded in a first pack, as shown in FIG. 54. As shown in FIG. 54, the data are divided at every 40 bits (5 bytes). In this case, the user data recorded in 1 frame of the DAT are recorded on two tracks as data of 72 packs. Since there are 112 packs of recording areas in every 2 tracts, all user data can be recorded.

As described above, the user data divided by the user data dividing circuit 151 are arranged in a pack format such as shown in FIG. 55 by the user data pack generating circuit 150. In this example, "1110" is used as the PACK ITEM, and pack number from pack 0 to pack 71 are added to all of the 72 packs in order to identify the order of the user data in the DAT frame, which are assigned to the area PC2. In the areas PC3 to PC7, the user data are assigned and parities generated from PC1 to PC7 are assigned to the area PC8.

The user data packs generated by the user data pack generating circuit 150 are stored in the memory circuit 4 and the audio data and the user data of successive 2880 sub frames (1140 sub frames in each channel) are written in the memory circuit 4 so that they are recorded in the same DAT frame, as shown in FIG. 53.

The operation in reproduction will be described in the following with reference to FIG. 52B. The audio data stored in the memory circuit 15 are applied to the digital interface circuit 28. The user data generating circuit 152 reads 72 packs, that is, pack 0 to pack 71, of the user data packs referring to the item and the pack number, out of the packs stored in the memory circuit 15 and takes out only the user data portion of each pack, and outputs the same in the original order to the digital interface circuit 28. The digital interface circuit 28 changes the audio data and the user data to the digital audio interface format to output the same from the digital output terminal 27.

Since it is known in advance that the user data corresponding to the sample at the head of the DAT is the first bit of the pack number 0, the data can be outputted in the same combination as they are received.

In the pack format examples shown in FIG. 55, PC3 to PC7 are used as the recording area for the user data. However, B3 to B0 of PC1 and B7 and B6 of PC2 may be assigned to the pack number and the user data may be assigned to the areas following B5 of PC2 including PC8.

Although user bits of 2 channels are treated in combination as a group of user data in the foregoing, the user data may be divided into two channels and the channel code for identifying the channel and the pack number may be recorded in PC2 to provide the same effect.

Although the pack numbers are simultaneously recorded in the above described embodiments, by preparing recording areas corresponding to the pack numbers in advance, the pack numbers become unnecessary, improving the efficiency in recording.

Although description was given of user data in the foregoing, all channel status data can be recorded in the similar manner. The user data and the channel status data which are the additional information to the audio data as the main signals may be recorded in the sub code area in packs. The recording of channel status data may be carried out not in 2 channels but only 1 channel.

Signals of the digital interface format for professional use have been treated in the foregoing, signals for home use may be treated in the same manner. The same function as the user data pack generating circuit 150, the user data dividing circuit 151 and the user data generating circuit 152 may be realized by a microcomputer 23.

Although a specific PACK ITEM is used as a format example of the sub code packs in the above described first to eighth embodiments (except the seventh embodiment) have been described, it is not limited thereto, and the content to be recorded in the PACK DATA recording area need not be recorded at the above described designated positions but may be recorded at arbitrary positions.

In the above described first to fourth embodiment, the DAT for recording and reproducing SMPTE/EBU/Film time code has been described, in the fifth and sixth embodiments, DAT for recording and reproducing channel status data for professional use of the digital audio interface have been described, and in the eighth embodiment, a DAT for recording and reproducing user data of digital audio interface has been described. A DAT capable of recording and reproducing all of the above described information can be realized by providing all the circuits added in respective embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic recording and reproducing apparatus dividing inputted main signals at every prescribed frame period to process said divided main signals as 1 frame data to record the same on a prescribed area of a magnetic tape and recording sub signals in a different area of said magnetic tape, and reproducing the recorded main signals and sub signals, comprising:

information extracting means receiving time code signals having a frame period different from that of said main signals for extracting first time information included in said time code signals;

phase difference detecting means for detecting phase difference between a point of change of frames of said main signals and a point of change of frames of said time code signals by prescribed clock signals;

arithmetic means, in recording, responsive to the first time information extracted by said information extracting means and to the phase difference information detected by said phase difference detecting means for calculating second time information using said prescribed frame period as a minimum unit, and for calculating initial phase difference information between head of a frame as a reference of said time code signals and head of a frame of said main signals positioned at the frame as the reference of said time code signals, and in reproduction, for calculating said first time information and the phase difference information from said second time information and said initial phase difference information;

recording and reproducing means for recording, in recording, said second time information calculated by said arithmetic means, said initial phase difference information, and frequency identifying information indicative of the frequency of the said prescribed clock signals used for detecting said phase difference information in said sub signal recording area, and for reproducing, in reproduction, said second time information, said initial phase difference information, and said frequency identifying information from said sub signal recording area; and time code signal generating means for composing a series of data of a prescribed transmission format of said time code signal based on said first time information calculated by said arithmetic means and for outputting the series of data of said composed time code signals in response to said phase difference information calculated by said arithmetic means.

2. A method of magnetic recording and reproducing wherein inputted main signals are divided at every prescribed frame period, signal processing is carried out on the divided main signals as data of 1 frame to record the same on a prescribed area of a magnetic tape, sub signals are recorded in a different area on said magnetic tape, and the recorded main signals and sub signals are reproduced, comprising the steps of:

inputting time code signals having a frame period different from that of said main signals and extracting first time information transmitted by said time code signals;

detecting phase difference between a point of change of the frames of said main signals and a point of change of frames of said time code signals by prescribed clock signals;

calculating, in recording, second time information using said prescribed frame period as a minimum unit based on said extracted first time information and said detected phase difference information, calculating initial phase difference information between head of the frame as a reference of said time code signals and head of the frame of said main signals positioned at the frame as the reference of said time code signals, and recording calculated said second time information, and said initial phase difference information, and frequency identifying information indicative of the frequency of the said prescribed clock signals used for detecting said phase difference information, in said sub signal recording area;

in reproduction, reproducing said second time information, said initial phase difference information, and said frequency identifying information recorded in said sub signal recording area;

calculating said first time information and the phase difference information based on said reproduced second time information and said initial phase difference information; and composing a series of data of a prescribed transmission format of said time code signals from said calculated first time information, and outputting, in response to said calculated phase difference information, said composed series of data of the time code signals.

* * * * *